United States Patent
Furumura et al.

(10) Patent No.: US 9,729,788 B2
(45) Date of Patent: Aug. 8, 2017

(54) IMAGE GENERATION APPARATUS AND IMAGE GENERATION METHOD

(75) Inventors: Kyoko Furumura, Tokyo (JP); Shinichi Hirata, Kanagawa (JP); Takeshi Yamagishi, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 244 days.

(21) Appl. No.: 14/354,692

(22) PCT Filed: Nov. 7, 2011

(86) PCT No.: PCT/JP2011/006216
§ 371 (c)(1),
(2), (4) Date: Apr. 28, 2014

(87) PCT Pub. No.: WO2013/069050
PCT Pub. Date: May 16, 2013

(65) Prior Publication Data
US 2014/0267594 A1    Sep. 18, 2014

(51) Int. Cl.
*H04N 7/00*    (2011.01)
*H04N 5/232*    (2006.01)
(Continued)

(52) U.S. Cl.
CPC ......... *H04N 5/23238* (2013.01); *G03B 37/02* (2013.01); *G06T 3/4038* (2013.01);
(Continued)

(58) Field of Classification Search
CPC ........... H04N 5/23238; H04N 5/23293; H04N 13/0011; H04N 13/0207; H04N 13/0246;
(Continued)

(56) References Cited

U.S. PATENT DOCUMENTS 6,496,598 B1  12/2002 Harman
7,382,399 B1   6/2008 McCall
(Continued)

FOREIGN PATENT DOCUMENTS

CN    1278349 A    12/2000
CN    1985266 A    6/2007
(Continued)

OTHER PUBLICATIONS

International Preliminary Report on Patentability for corresponding PCT/JP2011/006216, dated May 22, 2014.
(Continued)

*Primary Examiner* — Nhon Diep
(74) *Attorney, Agent, or Firm* — Matthew B. Dernier, Esq.

(57) ABSTRACT

A characteristic point extraction unit extracts a characteristic point in an overlapping region of a plurality of component images picked up using a camera built in portable equipment and having pan angles or elevation angles different from each other. A self-position estimation unit estimates three-dimensional coordinate values of the characteristic point and three-dimensional coordinate values of a camera position, which are associated with each other, at the same time in two component images in which the camera positions are displaced from each other. A panoramic image generation unit adjusts, based on the estimated three-dimensional coordinate values of the camera position, the three-dimensional coordinate values of the characteristic point of the component image to correct the component image and combine a plurality of component images having pan angles or elevation angles different from each other to generate a synthesis image.

7 Claims, 40 Drawing Sheets

(51) Int. Cl.
| | |
|---|---|
| *G03B 37/02* | (2006.01) |
| *G06T 3/40* | (2006.01) |
| *H04N 13/00* | (2006.01) |
| *H04N 13/02* | (2006.01) |
| *G06T 7/33* | (2017.01) |
| *G06T 7/73* | (2017.01) |

(52) U.S. Cl.
CPC .............. *G06T 7/33* (2017.01); *G06T 7/73* (2017.01); *H04N 5/23293* (2013.01); *H04N 13/0011* (2013.01); *H04N 13/0207* (2013.01); *H04N 13/0246* (2013.01); *G06T 2200/32* (2013.01); *G06T 2207/10016* (2013.01); *G06T 2207/20021* (2013.01); *G06T 2207/30244* (2013.01)

(58) Field of Classification Search
CPC ..... G03B 37/02; G06T 3/4038; G06T 7/0028; G06T 7/0042
USPC .......................................................... 348/36
See application file for complete search history.

(56) References Cited

U.S. PATENT DOCUMENTS

| | | | |
|---|---|---|---|
| 7,405,725 B2 | 7/2008 | Mori | |
| 7,489,806 B2* | 2/2009 | Mohri | G06F 3/014 382/103 |
| 8,279,297 B2 | 10/2012 | Kotani | |
| 8,390,672 B2 | 3/2013 | Ryu | |
| 9,560,274 B2* | 1/2017 | Hirata | H04N 5/23232 |
| 2001/0010546 A1 | 8/2001 | Chen | |
| 2002/0191841 A1 | 12/2002 | Harman | |
| 2005/0192808 A1 | 9/2005 | Sugiyama | |
| 2006/0072020 A1 | 4/2006 | McCutchen | |
| 2007/0002015 A1 | 1/2007 | Mori | |
| 2008/0025558 A1 | 1/2008 | Nozawa | |
| 2010/0066810 A1* | 3/2010 | Ryu | H04N 5/232 348/36 |
| 2010/0157099 A1 | 6/2010 | Nakai | |
| 2010/0302347 A1 | 12/2010 | Shikata | |
| 2010/0321470 A1 | 12/2010 | Oshima | |
| 2011/0157396 A1 | 6/2011 | Kotani | |
| 2011/0187815 A1 | 8/2011 | Asami | |
| 2011/0214072 A1 | 9/2011 | Lindermann | |
| 2011/0228123 A1 | 9/2011 | Matsumoto | |
| 2012/0200665 A1 | 8/2012 | Furumura | |
| 2013/0002923 A1 | 1/2013 | Kanma | |

FOREIGN PATENT DOCUMENTS

| | | |
|---|---|---|
| CN | 101674409 A | 3/2010 |
| CN | 101930162 A | 12/2010 |
| CN | 102111549 A | 6/2011 |
| EP | 0462905 A2 | 12/1991 |
| EP | 0921376 A1 | 6/1999 |
| EP | 1596272 A1 | 11/2005 |
| EP | 1870854 A2 | 12/2007 |
| EP | 2031560 A1 | 3/2009 |
| JP | 05284448 A | 10/1993 |
| JP | 2000305207 A | 11/2000 |
| JP | 2001086451 A | 3/2001 |
| JP | 2002027312 A | 1/2002 |
| JP | 2003224819 A | 8/2003 |
| JP | 2004172879 A | 6/2004 |
| JP | 2004264892 A | 9/2004 |
| JP | 2005217785 A | 8/2005 |
| JP | 2006174105 A | 6/2006 |
| JP | 2008304269 A | 12/2008 |
| JP | 2009089331 A | 4/2009 |
| JP | 4277734 B2 | 6/2009 |
| JP | 2010148052 A | 7/2010 |
| JP | 2010178259 A | 8/2010 |
| JP | 2011076249 A | 4/2011 |
| JP | 2011135165 A | 7/2011 |
| JP | 2011139367 A | 7/2011 |
| JP | 2011199565 A | 10/2011 |
| WO | 2006022630 A1 | 3/2006 |
| WO | 2009097449 A1 | 8/2009 |

OTHER PUBLICATIONS

International Search Report for corresponding PCT/JP2011/006216, dated Dec. 13, 2011.
European Search Report for corresponding EP Application No. 11875569.3-1903, dated Jun. 15, 2015.
Office Action for corresponding CN Application No. 201180074555.5, 12 pages, dated Jul. 5, 2016.
International Preliminary Report on Patentability and Written Opinion for related PCT/JP2011/006212, 12 pages, dated Mar. 13, 2014.
International Search Report for related PCT/JP2011/006212, 2 pages, dated Dec. 13, 2011.
European Search Report for related EP Application 11875439.9-1902, 7 pages, dated May 28, 2015.
International Search Report for related PCT/JP2011/006214, 4 pages, dated Dec. 13, 2011.
Office Action for related Japanese Patent Application No. 2013-542681, 8 pages, dated Jun. 2, 2015.
International Search Report for related PCT/JP2011/006215, 4 pages, dated Dec. 13, 2011.
Office Action for related Japanese Patent Application 2013-542682, 7 pages dated Nov. 11, 2014.
International Preliminary Report on Patentability and Written Opinion for related PCT/JP2011/006215, 14 pages, dated Mar. 13, 2014.
Office Action for corresponding U.S. Appl. No. 14/354,680, 11 pages, dated Jul. 21, 2016.
Office Action for corresponding CN Application No. 201180074563, 10 pages, dated Aug. 30, 2016.
Office Action for related U.S. Appl. No. 14/354,683, 13 pages, dated Oct. 21, 2016.
Office Action for related U.S. Appl. No. 14/354,683, 7 pages, dated Feb. 10, 2017.
Office Action for related U.S. Appl. No. 14/354,680, 14 pages, dated Apr. 13, 2017.

* cited by examiner

FIG.1
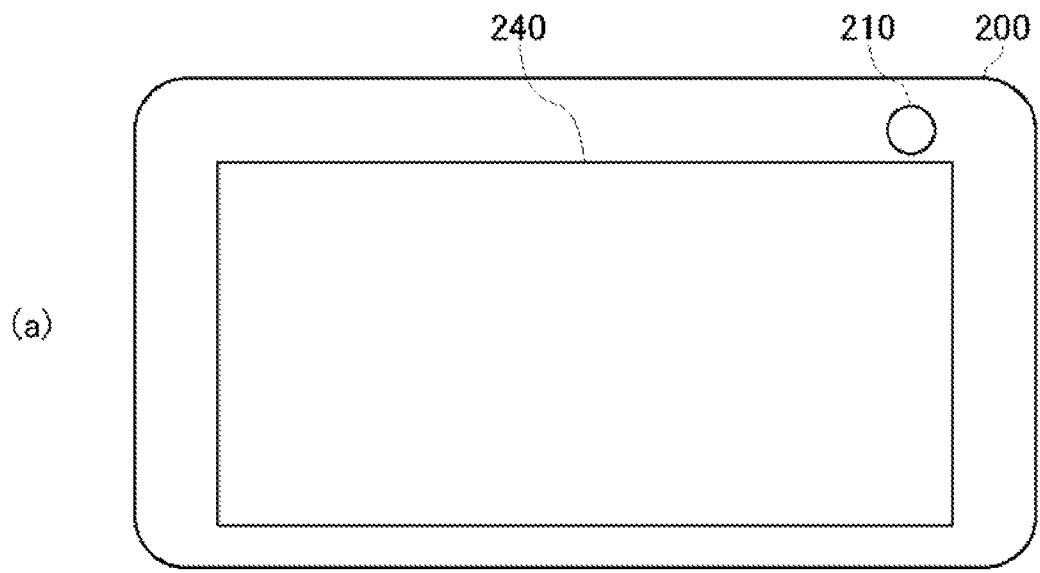
(a)
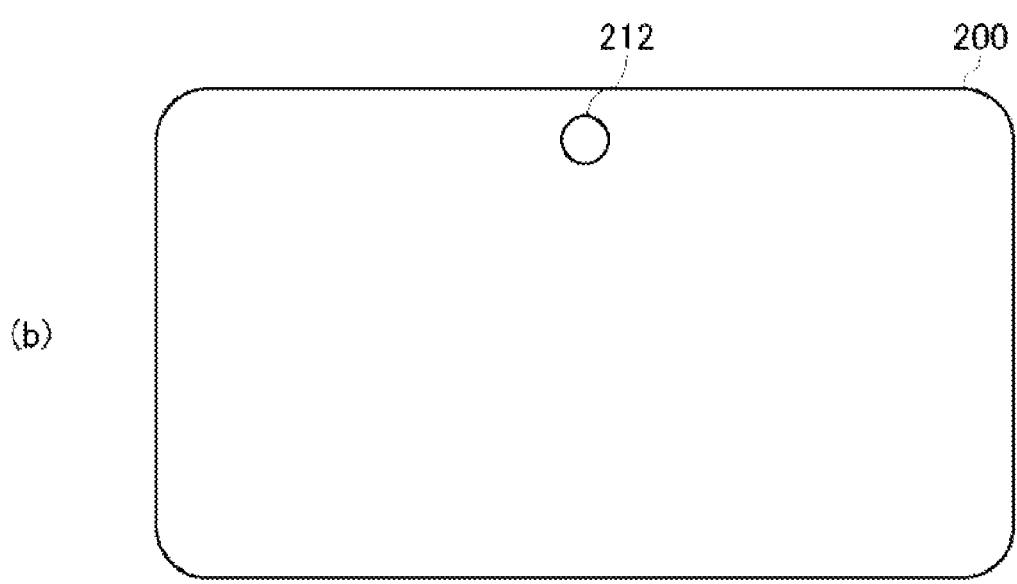
(b)

FIG.3
(a)
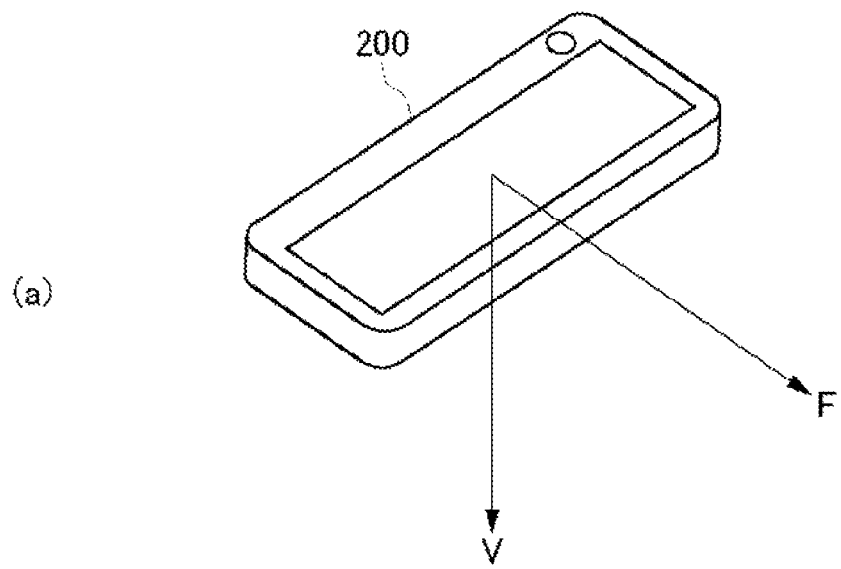
(b)
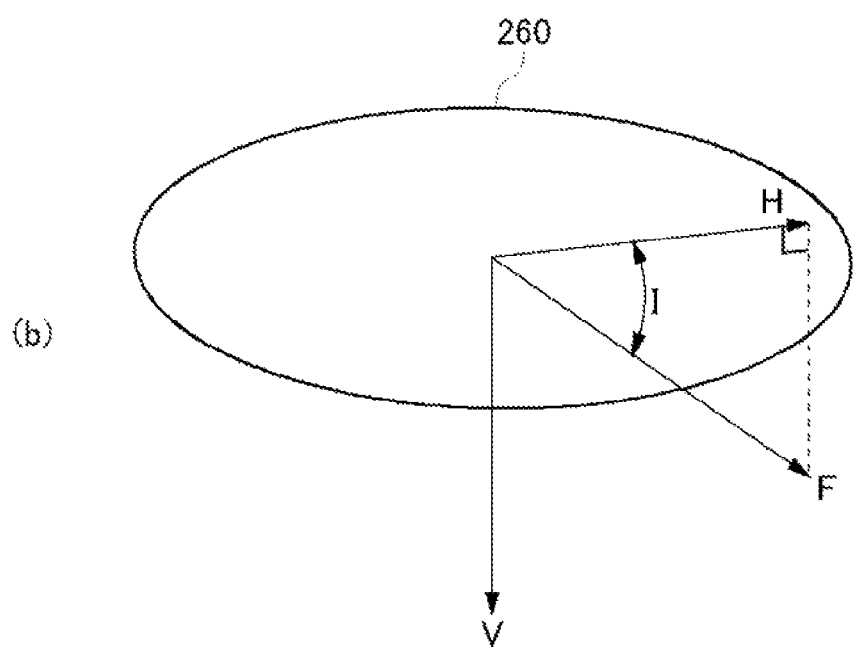

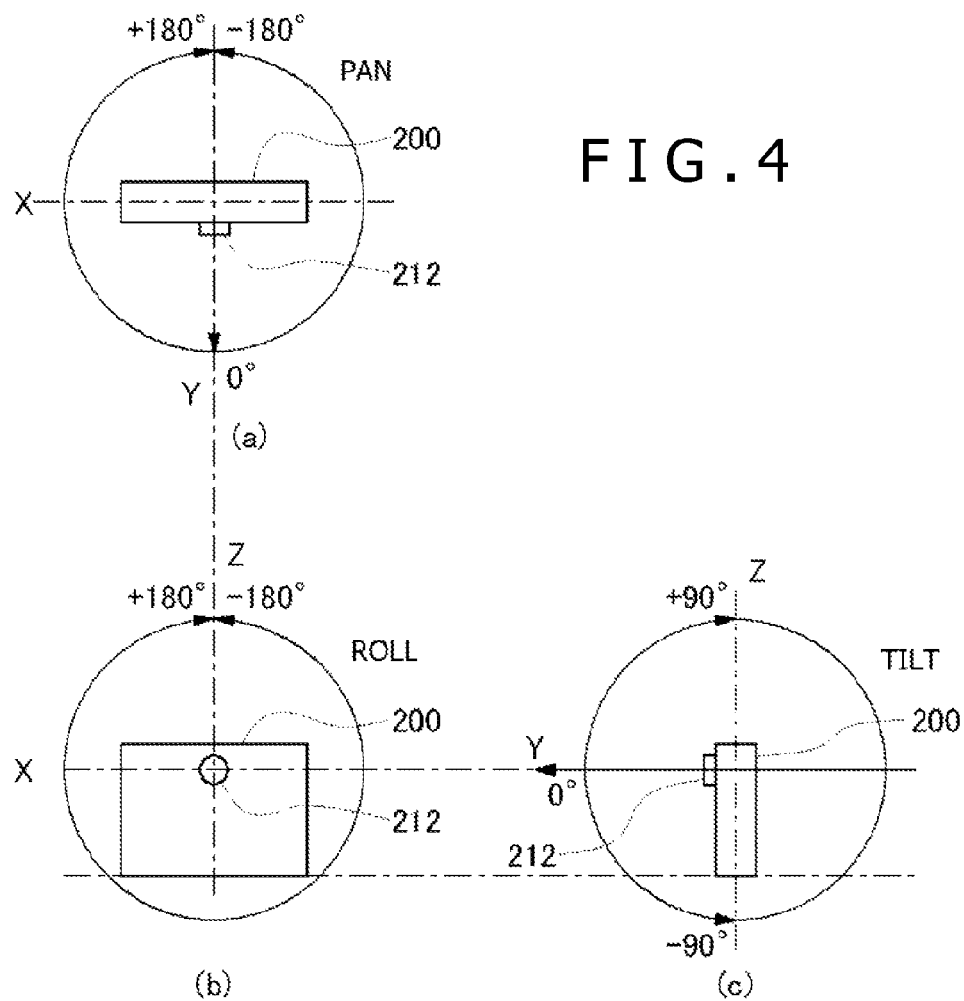
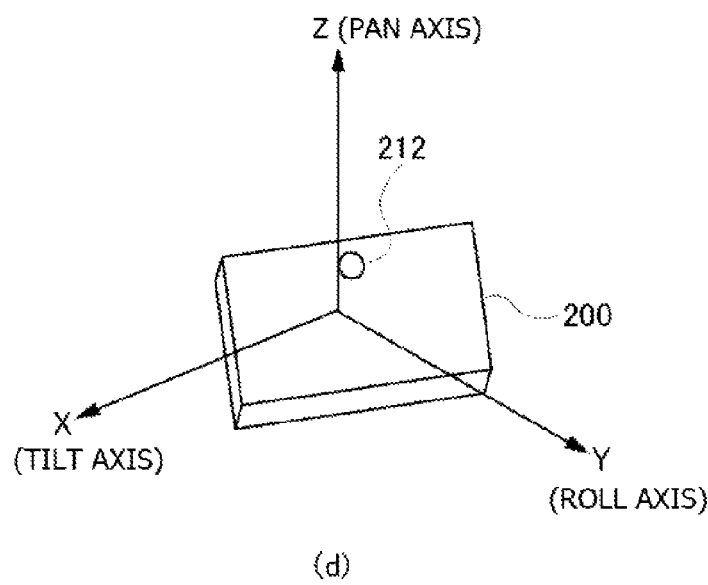
FIG. 4

FIG. 5
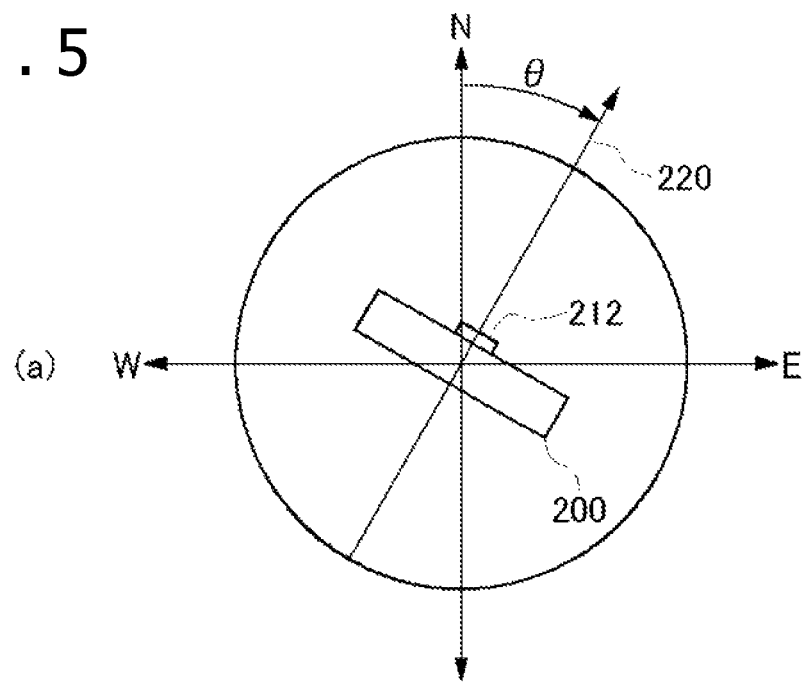
(a)
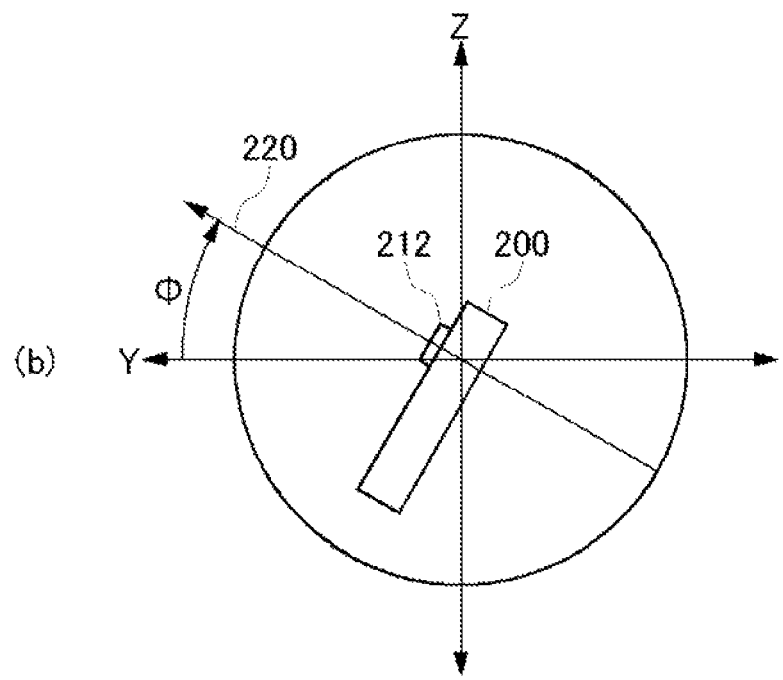
(b)

FIG.6
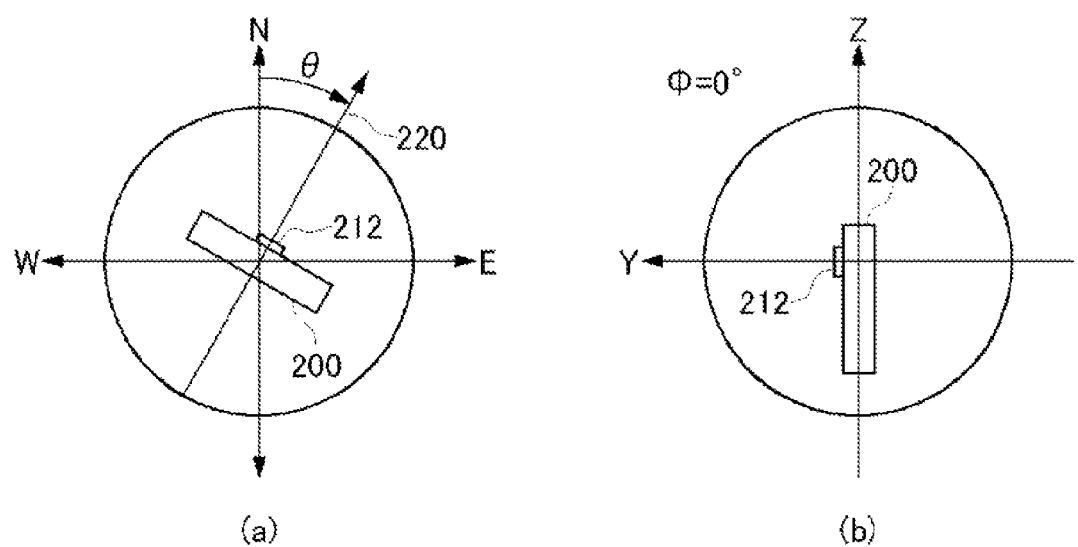
(a)  (b)
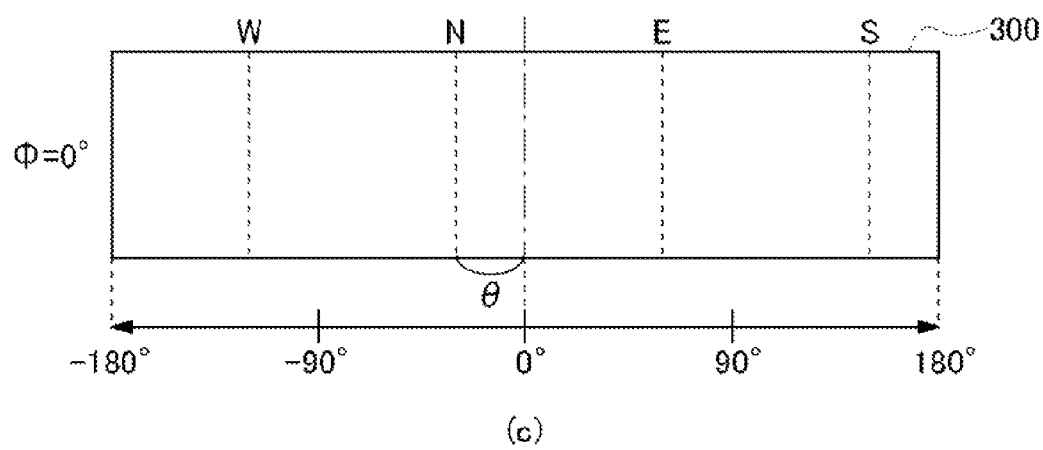
(c)

FIG.7
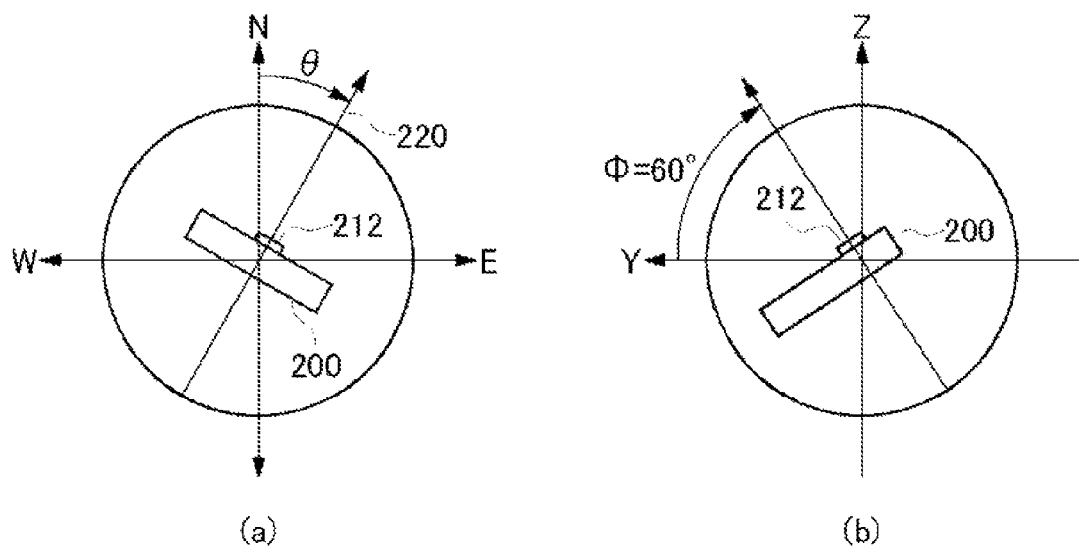
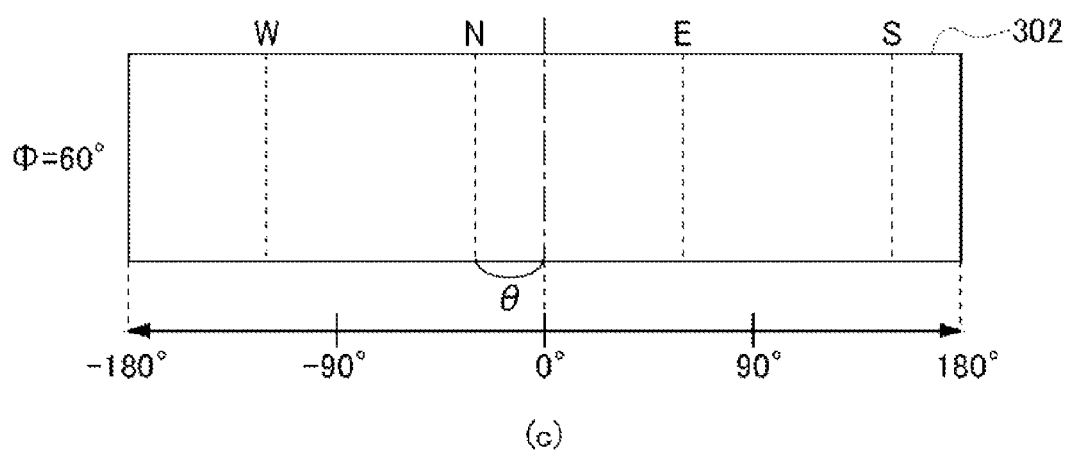

FIG. 13
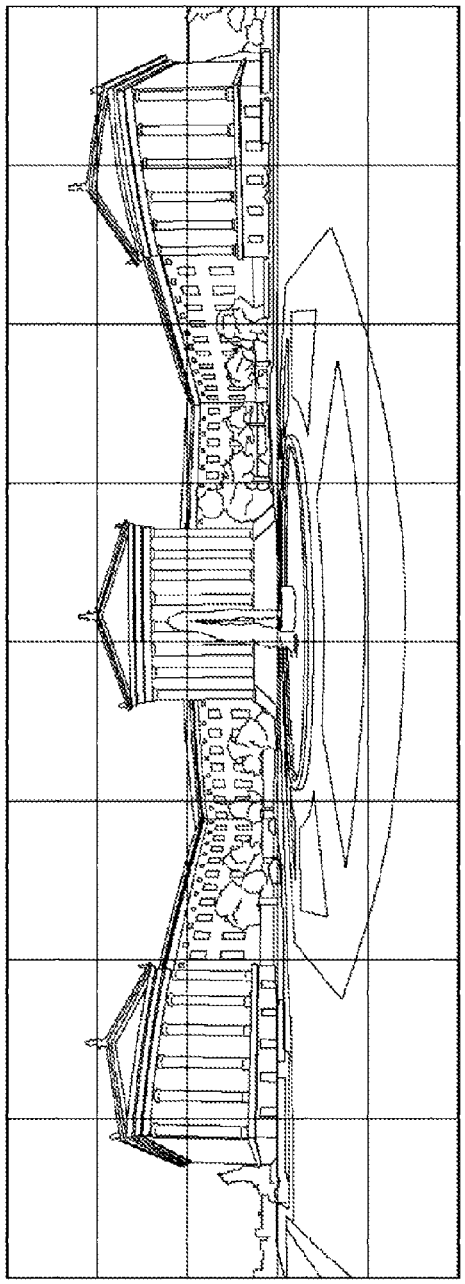
(a)
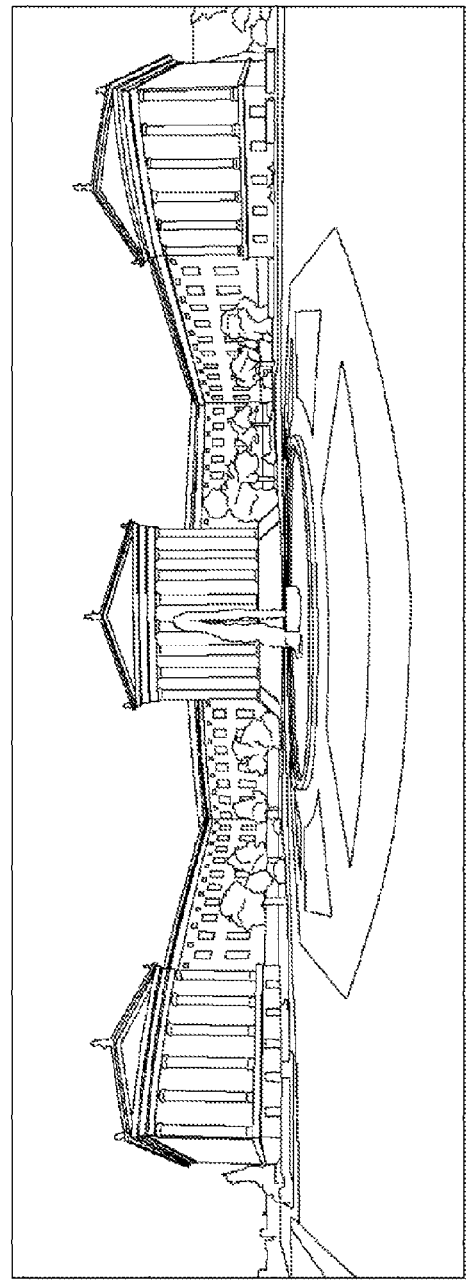
(b)

FIG.17
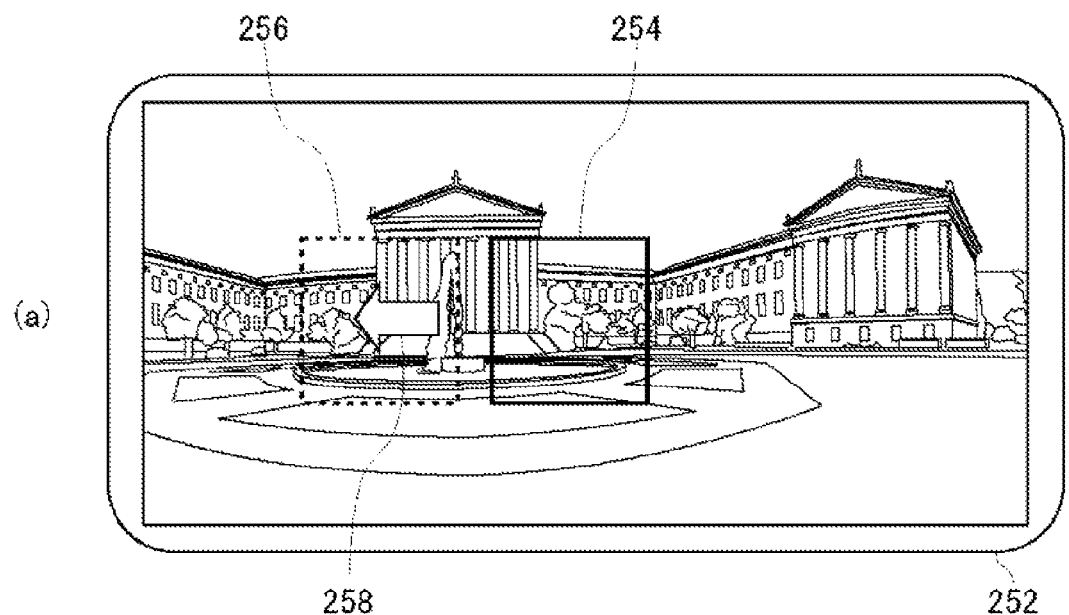
(a)
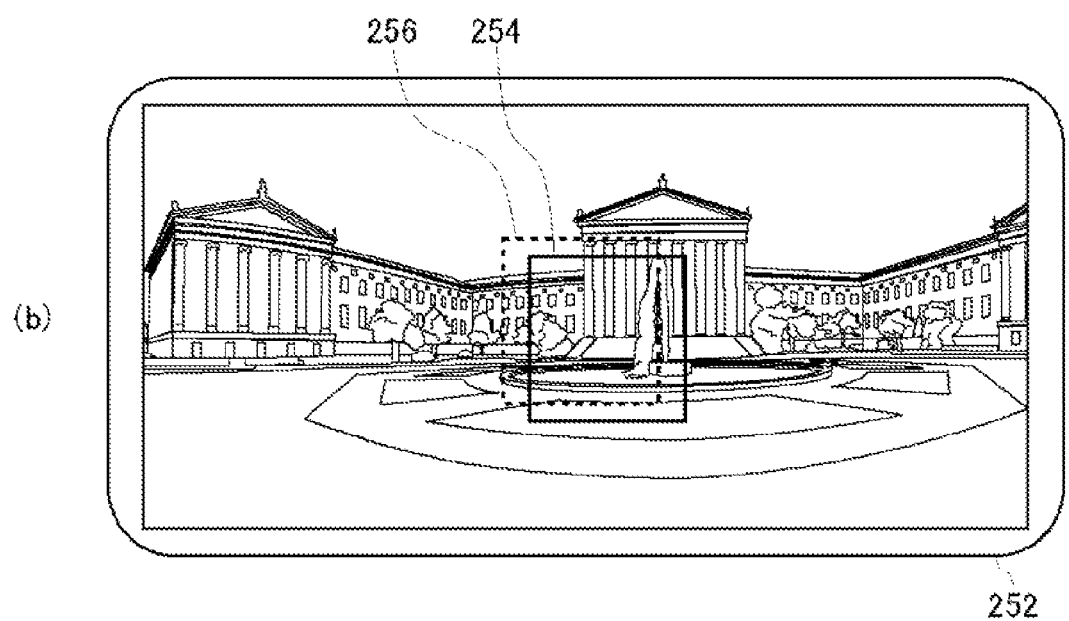
(b)

F I G . 2 7
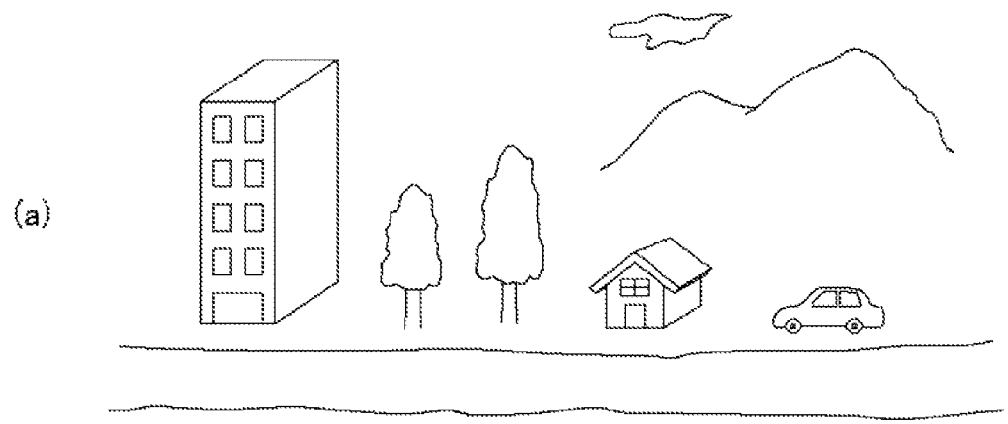
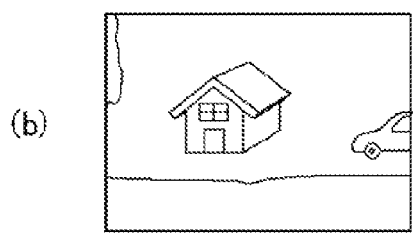
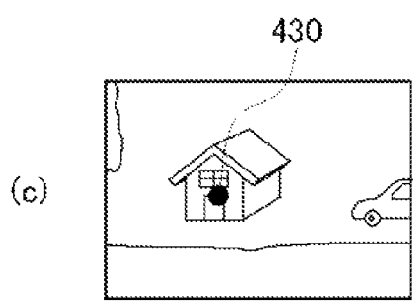
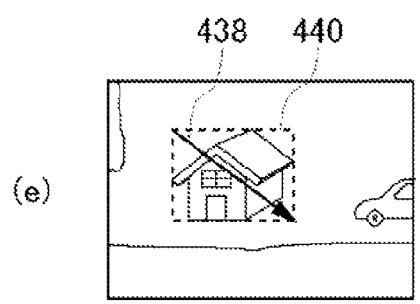
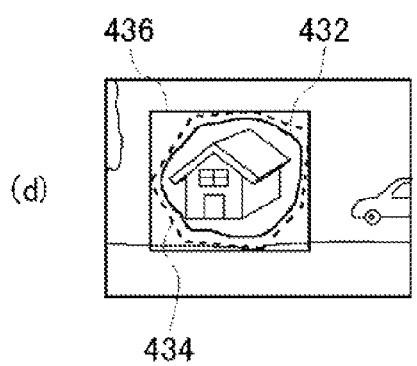
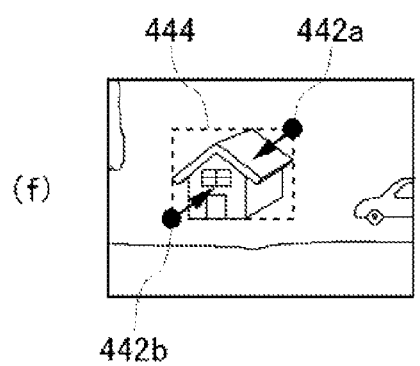

FIG. 30
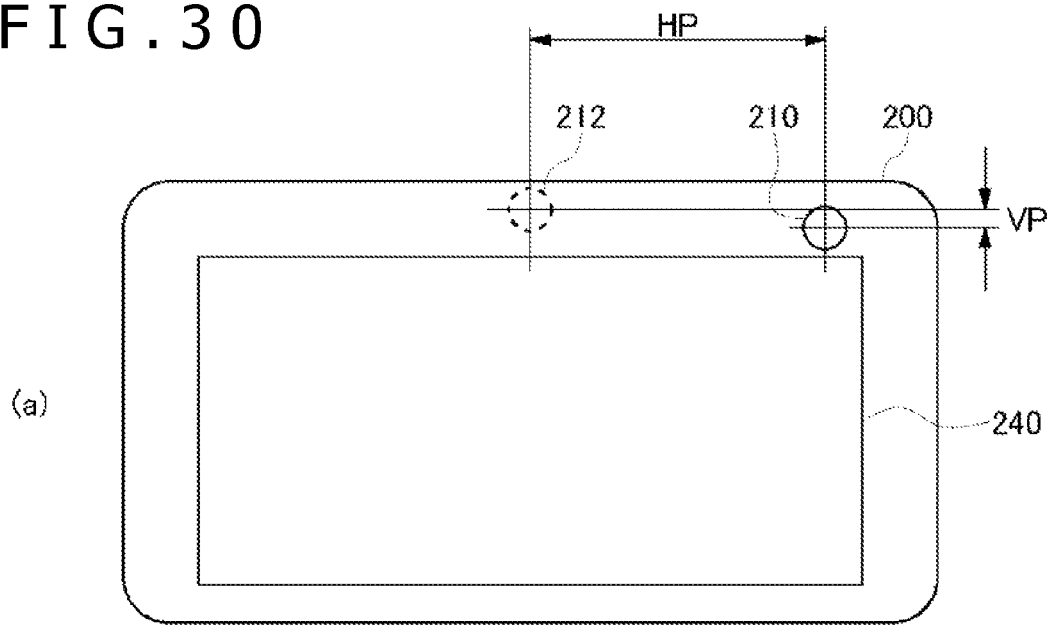
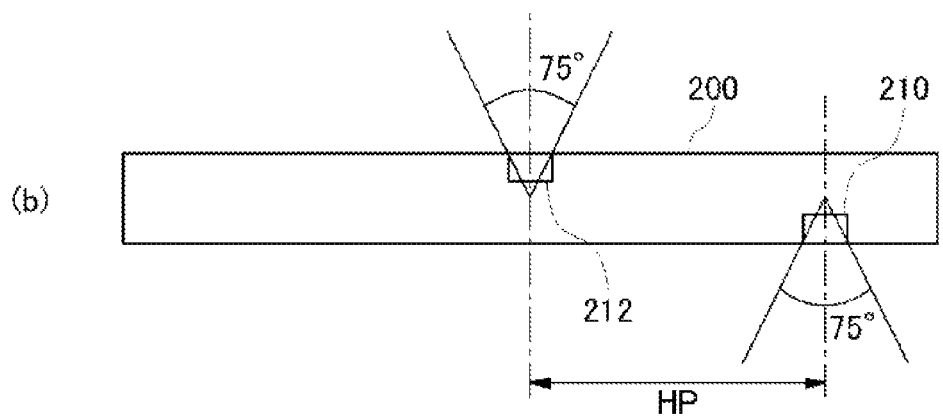
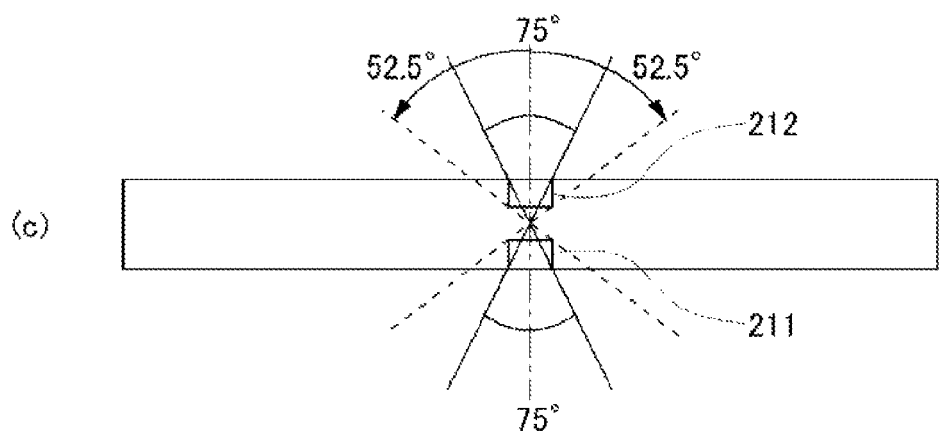

IMAGE GENERATION APPARATUS AND IMAGE GENERATION METHOD

TECHNICAL FIELD

The present invention relates to an image generation apparatus and method. Specifically, the present invention relates to an apparatus for and a method of generating a synthesized image.

BACKGROUND ART

A digital still camera and a digital video camera are spread, and an opportunity is increasing in which a picked up still picture or moving picture is stored into a computer and is read or worked or is displayed on a screen of a game machine or a television (TV) system. Also it is popular to upload a picked up moving picture to a posting site of the Internet and share the moving picture with different camera users.

Some digital cameras are capable of picking up a panoramic image, and it has become possible to readily pick up a panoramic image having a wide view angle. Also a software tool for generating a panoramic image by sticking a plurality of images picked up by a digital camera together while the image pickup direction is successively changed is utilized frequently.

Also a portable apparatus such as a portable telephone set with a camera is available in which a panoramic image pickup mode or an application for synthesizing a panoramic image is provided and, while the inclination of the portable apparatus is successively changed, images can be picked up and automatically synthesized into a panoramic image.

CITATION LIST

Patent Literature

[PTL 1]
JP 2011-76249A

SUMMARY

Technical Problem

However, if panoramic image pickup is carried out using a digital camera, portable equipment with a camera or like equipment, then an accurate panoramic image may not be able to be picked up due to camera shake, displacement of a rotational axis or the like and image matching may not be carried out successfully, resulting in occurrence of an error in a synthesized panoramic image.

The present invention has been made in view of such a subject as just described, and it is an object of the present invention to provide a technology by which a synthesis image can be generated accurately.

Solution to Problem

In order to solve the subject described above, an image generation apparatus of a mode of the present invention includes: a characteristic point extraction unit configured to extract a characteristic point in an overlapping region of a plurality of component images picked up using a camera built in portable equipment and having pan angles or elevation angles different from each other; a self-position estimation unit configured to estimate three-dimensional coordinate values of the characteristic point and three-dimensional coordinate values of a camera position, which are associated with each other, at the same time in two component images in which the camera positions are displaced from each other; and a synthesis image generation unit configured to adjust, based on the estimated three-dimensional coordinate values of the camera position, the three-dimensional coordinate values of the characteristic point of the component image to correct the component image and combine a plurality of component images having pan angles or elevation angles different from each other to generate a synthesis image.

Another mode of the present invention is an image generation method. This method includes: a characteristic point extraction step of extracting a characteristic point in an overlapping region of a plurality of component images picked up using a camera built in a portable equipment and having pan angles or elevation angles different from each other; a self-position estimation step of estimating three-dimensional coordinate values of the characteristic point and three-dimensional coordinate values of a camera position, which are associated with each other, at the same time in two component images in which the camera positions are displaced from each other; and a synthesis image generation step of adjusting, based on the estimated three-dimensional coordinate values of the camera position, the three-dimensional coordinate values of the characteristic point of the component image to correct the component image and combine a plurality of component images having pan angles or elevation angles different from each other to generate a synthesis image.

It is to be noted that also an arbitrary combination of the components described above and also representations of the present invention which are transformed between a method, an apparatus, a system, a computer program, a data structure, a recording medium and so forth are effective as modes of the present invention.

Advantageous Effect of Invention

With the present invention, a synthesis image can be generated accurately.

BRIEF DESCRIPTION OF DRAWINGS

FIGS. 1(a) and 1(b) are appearance views of a portable terminal used for panoramic image pickup.

FIGS. 3(a) and 3(b) are views illustrating an orientation of the portable terminal.

FIGS. 4(a) to 4(d) are views illustrating an image pickup direction when a panoramic image is picked up using a rear side camera of the portable terminal.

FIGS. 5(a) and 5(b) are views illustrating an azimuth angle $\theta$ of a camera and an elevation angle $\phi$ of a camera.

FIGS. 6(a) to 6(c) are views illustrating a panoramic image picked up when an initial position of the rear side camera of the portable terminal is in a direction of the azimuth angle $\theta$.

FIGS. 7(a) to 7(c) are views illustrating a panoramic image picked up when the elevation angle $\phi$ of the rear side camera=60 degrees.

FIGS. 13(a) and 13(b) are views illustrating an example of component images and a panoramic image.

FIGS. 17(a) and 17(b) are views illustrating examples of a display screen image of the see-through type HMD.

FIGS. 27(a) to 27(f) are views illustrating a method of setting an attention region on a touch panel by a user.

FIGS. 30(a) to 30(c) are views illustrating a disposition of and a parallax between a front side camera and a rear side camera of a portable terminal.

DESCRIPTION OF EMBODIMENTS

Embodiment 1

Figure 2:
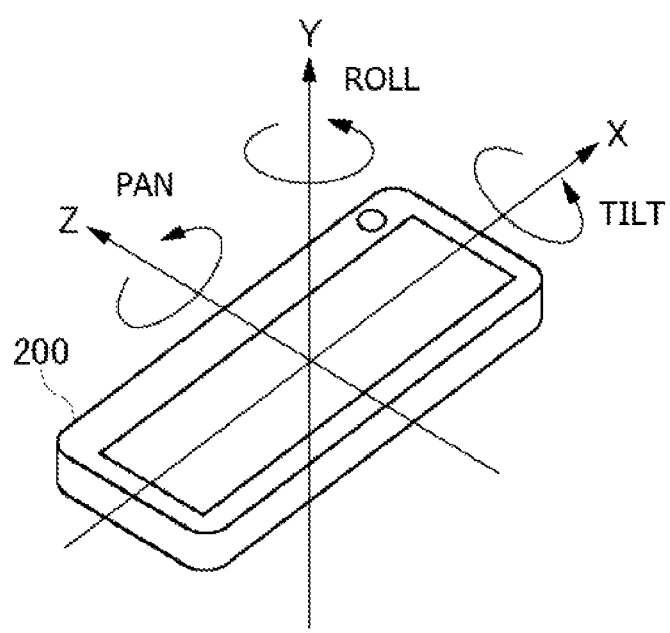
FIG. 2 is a view illustrating an inclination of the portable terminal.

FIGS. 1(a) and 1(b) are appearance views of a portable terminal 200 used for panoramic image pickup. The portable terminal 200 includes cameras 210 and 212 and a display 240 and can execute various types of applications. The portable terminal 200 may have a communication function.

FIG. 1(a) depicts a front face of the portable terminal 200. The front side (front) camera 210 and the display 240 are provided on the front face of the portable terminal 200. A user can pick up, for example, an image of the own face using the front side camera 210 and display the picked up image on the display 240 or transmit the picked up image as a moving picture or a still picture to a communication partner. The display 240 may include a touch panel. The user can directly touch the touch panel with a finger to input an operation to a screen of the display 240 while watching the screen image of the display 240.

FIG. 1(b) depicts a rear face of the portable terminal 200. The rear side (rear) camera 212 is provided on a rear face of the portable terminal 200. The user can pick up an image of, for example, a landscape or a friend using the rear side camera 212 and display the picked up image on the display 240 or transmit the picked up image as a moving picture or a still picture to the communication partner. A touch panel may be provided also on the rear face of the portable terminal 200. Consequently, the user can hold the portable terminal 200 and touch the touch panel on the rear face of the portable terminal 200 with a finger to input a predetermined operation while watching the display 240 on the front face of the portable terminal 200.

It is to be noted that the front side camera 210 of the portable terminal 200 is an option, and only the rear side camera 212 may be provided.

The portable terminal 200 includes at least one of a three-axis gyro (angular velocity) sensor, a three-axis acceleration sensor and a three-axis geomagnetic sensor and can detect an inclination of the portable terminal 200 with respect to three axes to acquire posture information. In addition, the three-axis geomagnetic sensor can detect a geomagnetism vector with respect to three axes to acquire orientation information. The portable terminal 200 may further include a GPS (Global Positioning System) receiver as an option so that it can acquire position information from the GPS. Further, the portable terminal 200 may include a transmitter-receiver for wireless communication to acquire position information from a wireless base station.

While, as an example of portable equipment used for panoramic image pickup, the portable terminal 200 is described here, the portable equipment used for panoramic image pickup may be a digital camera which includes at least one of a three-axis gyro sensor, a three-axis acceleration sensor and a three-axis geomagnetic sensor and can pick up a still picture or a moving picture. Alternatively, the portable equipment used for panoramic image pickup may be a game machine or a portable telephone set.

FIG. 2 is a view illustrating an inclination of the portable terminal 200. If the display face of the portable terminal 200 is placed on an XZ plane and a direction perpendicular to the display face is defined as a Y axis, then rotation of the portable terminal 200 around the X axis is tilting; rotation around the Y axis is rolling; and rotation around the Z axis is panning. The portable terminal 200 has incorporated therein at least one of a three-axis gyro sensor, a three-axis acceleration sensor and a three-axis geomagnetic sensor, and an inclination of the portable terminal 200 can be detected with respect to the three axes by detecting tilting, rolling and panning of the portable terminal 200. Therefore, posture information of the portable terminal 200 when the portable terminal 200 is held by the user can be acquired. Also it is possible to detect a moving direction or a moving speed of the portable terminal 200 by the gyro sensor and/or the acceleration sensor.

FIGS. 3(a) and 3(b) are views illustrating an orientation of the portable terminal 200. A three-axis geomagnetic sensor is incorporated in the portable terminal 200, and a geomagnetism vector F having three-axis components can be detected as depicted in FIG. 3(a). Since the three-axis gyro sensor and/or the three-axis acceleration sensor are incorporated in the portable terminal 200 as described hereinabove, also it is possible to detect a gravity vector V.

FIG. 3(b) is a view illustrating a method of determining an orientation vector H from the geomagnetism vector F and the gravity vector V. If the geomagnetism vector F is projected to a horizontal plane 260 perpendicular to the gravity vector V, then the orientation vector H can be obtained. The orientation vector H is a horizontal component of the geomagnetism and provides an absolute orientation. In this manner, whichever inclination the portable terminal 200 has, an absolute orientation of north, south, east and west can be detected using the gravity vector V detected by the three-axis gyro sensor and/or three-axis acceleration sensor and the geomagnetism vector F detected by the three-axis geomagnetic sensor.

Further, if a GPS sensor is incorporated in the portable terminal 200, then also it is possible to acquire such position information as a latitude and a longitude.

If posture information and orientation information of the portable terminal 200 are used, then images picked up by the camera of the portable terminal 200 while the inclination of the portable terminal 200 is successively changed can be stitched (sewed up) to each other to generate a celestial sphere panoramic image. The stitching method may be similar to a generation method of a celestial sphere panoramic image by a pan-tilt camera. If posture information from the three-axis gyro sensor and/or three-axis acceleration sensor is used, then a pan angle and a tilt angle of the camera can be obtained. Further, if orientation information from the three-axis geomagnetic sensor is used, then the pan angle of the camera can be associated with an absolute orientation angle. This makes it possible to carry out panoramic image pickup by the camera of the portable terminal 200 even if such expensive equipment as a pan-tilt camera is not available.

FIGS. 4(a) to 4(d) are views illustrating an image pickup direction when the rear side camera 212 of the portable terminal 200 is used to pick up a panoramic image. Also it is possible to pick up a panoramic image using the front side camera 210 of the portable terminal 200, and as occasion demands, also it is possible to pick up a panoramic image using both of the front side camera 210 and the rear side camera 212. However, in order to simplify the description, a case in which the rear side camera 212 is used to pick up a panoramic image is described here.

As depicted in FIG. 4(d), the user would incline the portable terminal 200 freely to pick up an image by the rear side camera 212. If the portable terminal 200 is rotated around the Z axis, then the pan angle of the camera changes; if the portable terminal 200 is rotated around the X axis, then the tilt angle of the camera changes; and if the portable terminal 200 is rotated around the Y axis, then the roll angle of the camera changes. Here, the Z axis is a vertical axis (axis in the direction of gravitational force).

FIG. 4(a) is a top plan view of the portable terminal 200. An initial direction (Y-axis direction) of the rear side camera 212 of the portable terminal 200 is defined as a pan angle of 0 degrees. The pan angle of the rear side camera 212 can be changed arbitrarily (as an example, within a range from −180 degrees to +180 degrees) around the Z axis.

FIG. 4(b) is a front elevational view of the portable terminal 200. A state in which a horizontally elongated side face of the portable terminal 200 is held horizontally by the user is defined as a roll angle of 0 degrees. The roll angle of the rear side camera 212 can be changed arbitrarily (as an example, within a range from −180 degrees to +180 degrees) around the Y axis.

FIG. 4(c) is a side elevational view of the portable terminal 200. A state in which the rear face of the portable terminal 200 is held perpendicularly to the ground is defined as a tilt angle of 0 degrees. The tilt angle of the rear side camera 212 can be changed arbitrarily (as an example, within a range from −90 degrees to +90 degrees) around the X axis.

In order to provide information relating to an image pickup orientation to a panoramic image picked up by the rear side camera 212 of the portable terminal 200 of FIG. 4(d), it is necessary to record in which orientation the rear side camera 212 of the portable terminal 200 is directed upon image pickup. To this end, the three-axis gyro sensor and/or three-axis acceleration sensor and the three-axis geomagnetic sensor incorporated in the portable terminal 200 are used.

FIG. 5(a) is a view illustrating the orientation angle θ of the rear side camera 212 of the portable terminal 200, and FIG. 5(b) is a view illustrating the elevation angle φ of the rear side camera 212 of the portable terminal 200. FIG. 5(a) is a top plan view of the portable terminal 200, and the rear side camera 212 is directed, at an initial position of image pickup, to a direction 220 displaced by the orientation angle θ toward the east from the true north. This angle corresponds to the pan angle of 0 degrees. In other words, the orientation angle of the reference direction 220 of the pan angle is θ. When a panoramic image is picked up, a panoramic image of a subject is picked up while the pan angle is successively changed, as an example, over the range from −180 degrees to +180 degrees with respect to the reference direction 220 of the orientation angle θ.

FIG. 5(b) is a side elevational view of the portable terminal 200, and the elevation angle φ is an angle where the direction of a tilt of 0 degrees, namely, an upward direction with respect to the Y axis direction, when the rear side camera 212 is rotated around the X axis is defined as a positive direction. Since image pickup is carried out usually setting the rear side camera 212 to a horizontal position, the elevation angle φ is 0 degrees. However, in order to pick up a panoramic image of the celestial sphere, it is necessary to successively pick up an image of a subject by successively tilting the camera to change the elevation angle φ.

FIGS. 6(a) to 6(c) are views illustrating a panoramic image picked up when the initial position of the rear side camera 212 of the portable terminal 200 is in the direction of the orientation angle θ.

As depicted in a top plan view of FIG. 6(a), the rear side camera 212 at the initial position is directed to the direction 220 of the orientation angle θ, and the elevation angle φ of the rear side camera 212 is 0 degrees as depicted in a side elevational view of FIG. 6(b). An omnidirectional panoramic image at the elevation angle φ=0 degrees is picked up while the pan angle of the rear side camera 212 is successively changed within the range from −180 degrees to +180 degrees with respect to the reference direction 220 with the elevation angle φ kept to 0 degrees. FIG. 6(c) depicts a panoramic image 300 picked up in this manner. The center of the panoramic image 300 is at the pan angle of 0 degrees, and the left half of the panoramic image 300 is an image picked up while the pan angle is successively changed from 0 degrees to −180 degrees, and the right half of the panoramic image 300 is an image picked up while the pan angle is successively changed from 0 degrees to +180 degrees.

Since the position of the center of the pan angle of 0 degrees of the panoramic image 300 is displaced by the orientation angle θ to the east from the true north, the position of the north (N), south (S), east (E) and west (W) are such as those indicated by broken lines. Only if the panoramic image 300 has, as information relating to the image pickup orientation, the orientation angle θ of the position of the center of the pan angle of 0 degrees, pixel positions of the north (N), south (S), east (E) and west (W) can be determined by calculation taking the displacement of the orientation angle θ into consideration. Alternatively, in place of the orientation angle θ, coordinate values of the pixel positions of the north (N), south (S), east (E) and west (W) may be used as information relating to the image pickup direction.

In order to obtain a panoramic image of the celestial sphere, it is necessary to carry out image pickup by successively changing the elevation angle of the rear side camera 212. For example, if it is assumed that the angle of view of the rear side camera 212 is 60 degrees, then a panoramic image of the celestial sphere can be obtained in principle if the rear side camera 212 is tilted by ±60 degrees upwardly and downwardly and, in this state, similar image pickup is carried out successively changing the pan angle within the range from −180 degrees to +180 degrees.

FIGS. 7(a) to 7(c) are views illustrating a panoramic image picked up when the elevation angle φ of the rear side camera 212 is 60 degrees. As depicted in a top plan view of FIG. 7(a), the rear side camera 212 at the initial position is directed to the direction 220 of the orientation angle θ, and the elevation angle φ of the rear side camera 212 is 60 degrees as depicted in a side elevational view of FIG. 7(b). Such a panoramic image 302 at the elevation angle φ=60 degrees as depicted in FIG. 7(c) is picked up while the pan angle of the rear side camera 212 is successively changed within the range from −180 degrees to +180 degrees with respect to the reference direction 220 with the elevation angle φ of the rear side camera 212 kept to 60 degrees.

Similarly, a panoramic image at the elevation angle φ=−60 degrees is picked up while the pan angle is successively changed within the range from −180 degrees to +180 degrees with the elevation angle φ of the rear side camera 212 kept to −60 degrees. If the panoramic images at the elevation angle φ=0 degrees, 60 degrees and −60 degrees are combined, then a panoramic image of the celestial sphere can be obtained. However, in actual incorporation, in order to correct non-alignment originating from distortion of the lens when images are stuck together in a boundary region of the angle of view, a method of picking up images such that portions thereof in the proximity of the boundary are overlapped with each other is adopted frequently.

The celestial sphere panoramic image obtained in this manner has information of an orientation angle and an elevation angle added thereto, and the orientation and the elevation angle can be specified with regard to an arbitrary pixel of the panoramic image based on the information. Further, latitude and longitude information measured by the GPS may be added as position information of the image pickup place to the panoramic image. The additional information to be added to the panorama information may be recorded in conformity with a standard for an image file called Exif (Exchangeable Image File Format) as an example. It is possible to record the place name of the image pickup place into part of a file name and record the image pickup date and time, latitude and longitude, height, orientation angle of the image pickup place and so forth may be recorded as data of the Exif format. It is to be noted that, since the elevation angle is not defined in the Exif format at present, it is recorded as extended data.

Figure 8A:
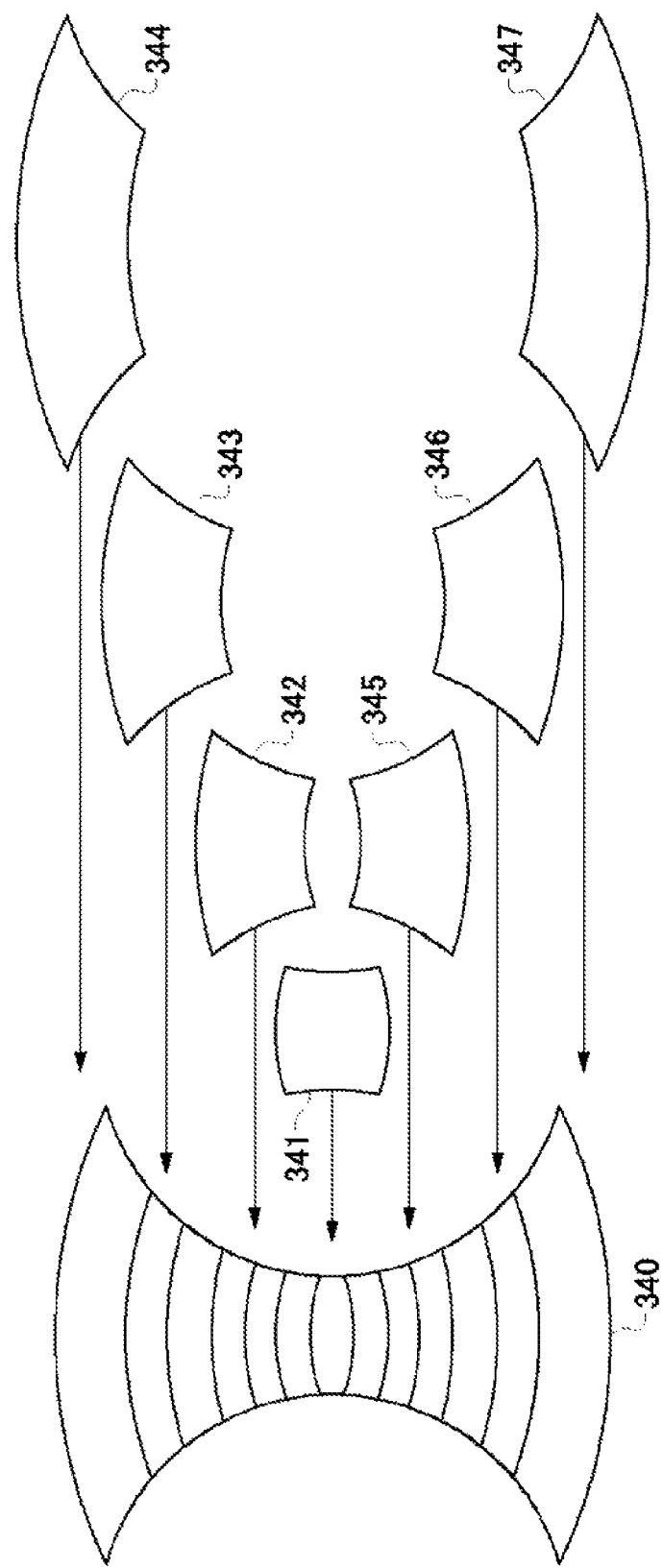
FIG. 8A is a view illustrating a method of connecting a plurality of images to each other to generate a panoramic image.
Figure 8B:
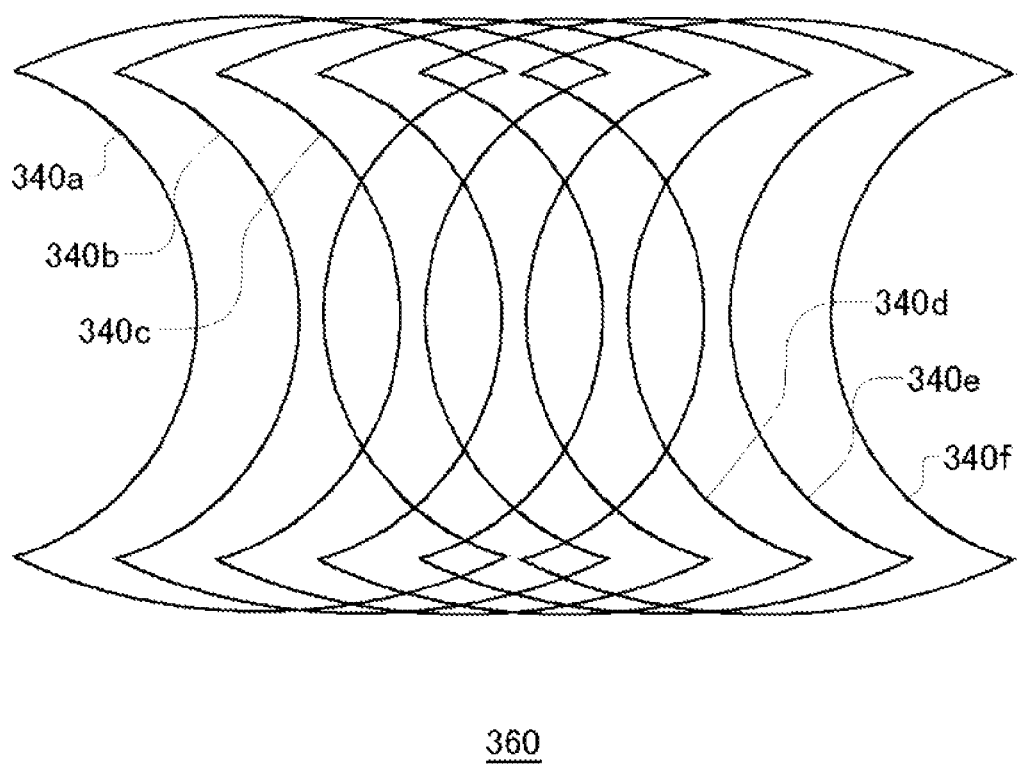
FIG. 8B is a view illustrating another method of connecting a plurality of images to each other to generate a panoramic image.

FIGS. 8A and 8B are views illustrating methods of generating a panoramic image by connecting a plurality of images.

In the example of FIG. 8A, seven images 341 to 347 picked up while the rear side camera 212 is successively tilted (or panned) are first mapped cylindrically and then are connected to each other to generate a cylindrical image 340. When the images are connected to each other, portions of the images in the proximity of the boundaries of the images are overlapped with each other.

If the rear side camera 212 is successively panned (or tilted) to pick up images, then a plurality of cylindrical images depicted in FIG. 8A are obtained in the panning direction (or tilting direction) as depicted in FIG. 8B. If the cylindrical images 340a to 340f are synthesized such that portions thereof in the proximity of the boundaries thereof are overlapped with each other, then an omnidirectional panoramic image 360 is obtained finally.

Figure 9:
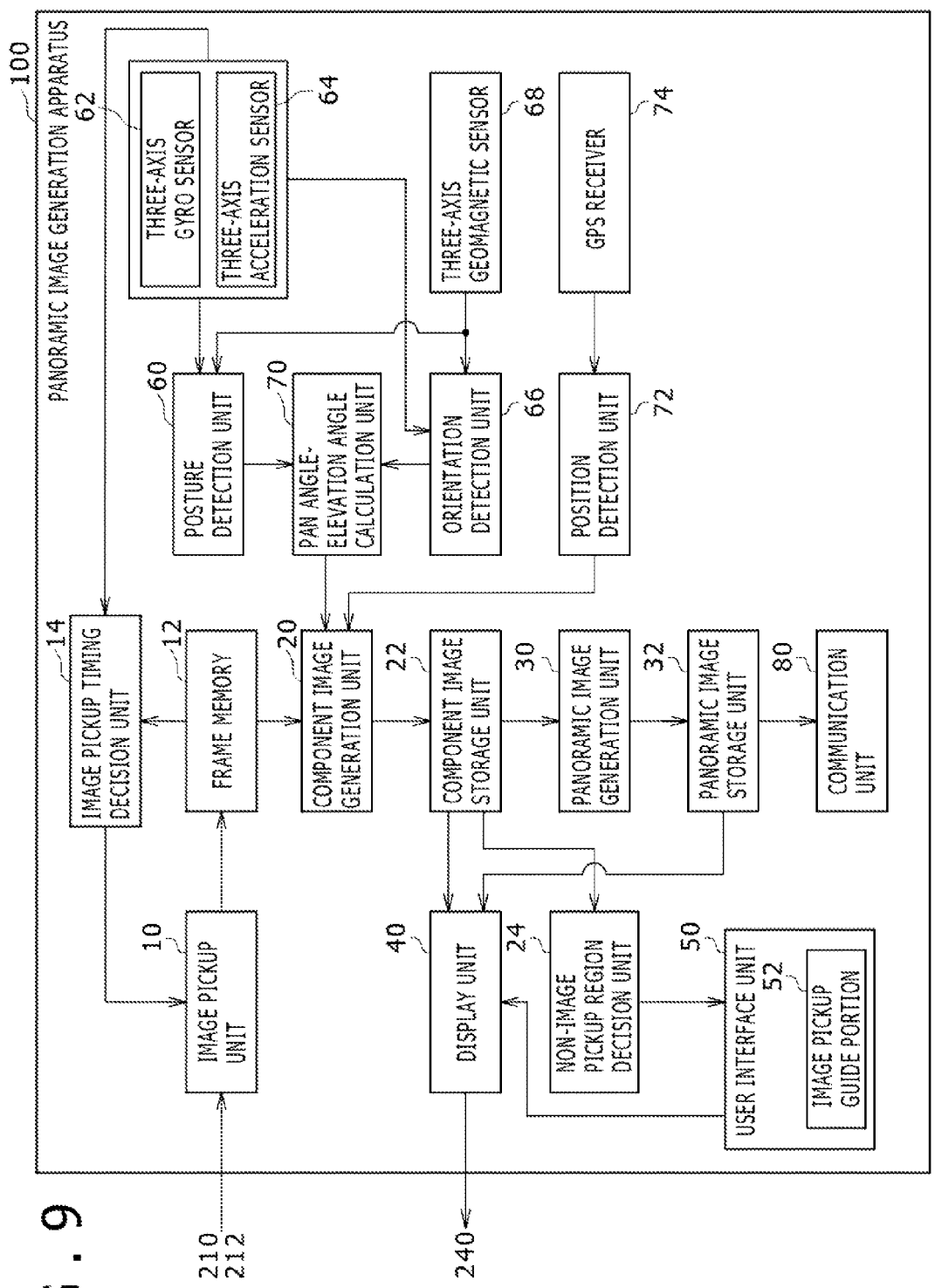
FIG. 9 is a functional block diagram of a panoramic image generation apparatus.

FIG. 9 is a functional block diagram of the panoramic image generation apparatus 100. Some or all of the functional components of the panoramic image generation apparatus 100 can be incorporated by hardware, software or a combination of hardware and software of the portable terminal 200. Some of the functional components may be incorporated in a server while some of the functional components are incorporated in a client such that they are incorporated as a server-client system with a network interposed therebetween.

A three-axis gyro sensor 62 detects an angular velocity of the portable terminal 200 in the three directions of the X axis, Y axis and Z axis and supplies the detected angular velocities to a posture detection unit 60. A three-axis acceleration sensor 64 detects an acceleration of the portable terminal 200 in the three directions of the X axis, Y axis and Z axis and supplies the detected accelerations to the posture detection unit 60. The posture detection unit 60 uses a result of the detection by the three-axis gyro sensor 62 and/or the three-axis acceleration sensor 64 to detect three-axis components of an inclination of the portable terminal 200, namely, a tilt angle, a roll angle and a pan angle. The posture detection unit 60 supplies the detected tilt angle, roll angle and pan angle of the portable terminal 200 as posture information to a pan angle-elevation angle calculation unit 70.

Although the portable terminal 200 may incorporate only one of the three-axis gyro sensor 62 and the three-axis acceleration sensor 64, if both of them are incorporated, then the detection accuracy of the posture information can be improved because they make up for shortcomings. Although the three-axis gyro sensor 62 can measure also during movement, it has a shortcoming that a drift error is successively accumulated. Although the three-axis acceleration sensor 64 can detect a posture angle from the gravitational acceleration when it is in a stationary state, an error appears therewith during movement thereof.

Therefore, the posture detection unit 60 carries out, for example, weighted averaging of outputs of the three-axis gyro sensor 62 and the three-axis acceleration sensor 64 to improve the detection accuracy. When a weighted average is calculated, during movement, the weight to the detection component of the three-axis gyro sensor 62 is increased with respect to the detection component of the three-axis acceleration sensor 64. On the other hand, when it is regarded that the three-axis gyro sensor 62 and the three-axis acceleration sensor 64 are substantially in a stationary state, the weight to the detection component of the three-axis acceleration sensor 64 is increased with respect to the weight to the detection component of the three-axis gyro sensor 62. Consequently, in a stationary state, a yaw drift by the three-axis gyro sensor 62 is corrected by an output of the three-axis acceleration sensor 64, but during movement, the output of the three-axis gyro sensor 62 is relied upon rather than the output of the three-axis acceleration sensor 64, whereby posture information of a higher degree of accuracy can be detected.

As another method, also it is possible for the posture detection unit 60 to use a result of detection by a three-axis geomagnetic sensor 68 to detect three-axis components of an inclination of the portable terminal 200. If the geomagnetic vector is tracked by the three-axis geomagnetic sensor 68 to detect rotation of the portable terminal 200 around the X axis, Y axis and Z axis, then three-axis components of an inclination of the portable terminal 200, namely, a tilt angle, a roll angle and a pan angle, can be detected. If the three-axis geomagnetic sensor 68 incorporated in the portable terminal 200 is inclined, then the detected direction of the geomagnetic vector changes. If the observation spot does not vary by a great amount, then since the geomagnetic vector is directed to a fixed direction, a variation of the posture of the portable terminal 200 from its initial position can be detected. If the three-axis acceleration sensor 64 is used additionally, then since the vertical direction can be detected, also the initial posture can be detected.

if the angle of rotation of the three-dimensional geomagnetic vector detected by the three-axis geomagnetic sensor 68 per unit time is measured, then an angular velocity can be determined. Therefore, the three-axis geomagnetic sensor 68 can be used in place of the gyro sensor. This is called magnetic gyro function. Further, if the variation angle from the initial position is determined, then since the inclination can be detected, the three-axis geomagnetic sensor 68 can be used as a three-axis posture sensor. However, when the geomagnetic vector coincides with the pan axis or the tilt axis, an angle of rotation around the axis cannot be determined.

If the three-axis gyro sensor 62 or the three-axis acceleration sensor 64 is used in combination with the three-axis geomagnetic sensor 68, then both of an orientation and a posture can be measured with a high degree of accuracy.

As described above, the posture detection unit 60 can determine three-axis components of an inclination of the portable terminal 200 by any of the three-axis gyro sensor 62 by itself, the three-axis acceleration sensor 64 by itself, the three-axis geomagnetic sensor 68 by itself, a combination of the three-axis gyro sensor 62 and the three-axis acceleration sensor 64, a combination of the three-axis geomagnetic sensor 68 and the three-axis gyro sensor 62, a combination of the three-axis geomagnetic sensor 68 and the three-axis acceleration sensor 64, and a combination of the three-axis gyro sensor 62, three-axis acceleration sensor 64 and three-axis geomagnetic sensor 68.

The three-axis geomagnetic sensor 68 detects components of the geomagnetic vector in the X-axis, Y-axis and Z-axis directions and supplies the detected components to an orientation detection unit 66. The orientation detection unit 66 determines an orientation vector, which is a horizontal component of the geomagnetic vector, based on the gravity vector detected by the three-axis gyro sensor 62 or the three-axis acceleration sensor 64 and the geomagnetic vector detected by the three-axis geomagnetic sensor 68. Then, the orientation detection unit 66 supplies the components of the orientation vector as orientation information to the pan angle-elevation angle calculation unit 70.

The pan angle-elevation angle calculation unit 70 determines, based on the posture information of the portable terminal 200 supplied thereto from the posture detection unit 60, a pan angle and an elevation angle which indicate the image pickup direction of the camera of the portable terminal 200, and supplies the determined pan angle and elevation angle to a component image generation unit 20. If orientation information is supplied from the orientation detection unit 66, then the pan angle-elevation angle calculation unit 70 can associate the pan angle of the camera with the absolute orientation.

A GPS receiver 74 receives latitude and longitude, height and time information from the GPS and supplies the received information to a position detection unit 72. The position detection unit 72 supplies the latitude and longitude information to the component image generation unit 20. The incorporation of the GPS receiver 74 is optional.

An image pickup unit 10 controls the front side camera 210 and/or the rear side camera 212 to pick up an image of a subject and records the picked up images into a frame memory 12.

An image pickup timing decision unit 14 decides an appropriate image pickup timing by the image pickup unit 10 and instructs the image pickup unit 10 of a timing at which the shutter is to be released. The image pickup timing decision unit 14 decides based on a sensor output of the three-axis gyro sensor 62 and/or the three-axis acceleration sensor 64 whether or not there is a movement of the camera. Further, the image pickup timing decision unit 14 detects an inter-frame difference of a moving picture picked up by the image pickup unit 10 and decides whether or not a subject which is moving exists.

The image pickup timing decision unit 14 instructs, in the case of an automatic image pickup mode, the image pickup unit 10 to pick up an image at a timing at which it is decided that the camera exhibits no movement and a subject which is moving does not exist. In the case of a semiautomatic image pickup mode, the image pickup timing decision unit 14 omits the detection of a moving body and instructs the image pickup unit 10 to pick up an image at a timing at which it is decided that the camera exhibits no movement. In the case of a manual image pickup mode, the image pickup timing decision unit 14 allows the user to release the shutter without instructing the image pickup unit 10 of an image pickup timing.

The component image generation unit 20 stores a pan angle (or an absolute orientation angle) and an elevation angle of the camera supplied thereto from the pan angle-elevation angle calculation unit 70 as a component image into a component image storage unit 22 in an associated relationship with a picked up image stored in the frame memory 12. If position information is supplied from the position detection unit 72, then the component image generation unit 20 further associates the position information with the picked up image.

A panoramic image generation unit 30 stitches a plurality of component images stored in the component image storage unit 22 to synthesize a panoramic image and stores the panoramic image into a panoramic image storage unit 32.

A display unit 40 reads out, upon panoramic image pickup, a plurality of picked up component images before synthesis into a panoramic image from the component image storage unit 22 and displays the read out component images on a display 240. Consequently, the user can confirm on the display 240 that there remains a region in which no image is picked up as yet in order to complete a panoramic image.

On the other hand, the display unit 40 reads out a synthesized panoramic image from the panoramic image storage unit 32 and displays the panoramic image on the display 240. A communication unit 80 transmits the completed panoramic image to a communication partner or uploads the completed panoramic image to a server.

A non-image pickup region decision unit 24 decides, based on information of the pan angle and the elevation angle of picked up component images stored in the component image storage unit 22, a region for a component image which is not enough to complete a panoramic image. The non-image pickup region decision unit 24 supplies information which specifies a region for a component image not picked up as yet which is adjacent a component image picked up most recently to an image pickup guide portion 52 of a user interface unit 50.

The image pickup guide portion 52 of the user interface unit 50 generates a guide for guiding the user to subsequently pick up an image in a region for a non-picked up component image which is designated by the non-image pickup region decision unit 24 and causes the display unit 40 to display the guide.

Figure 10:
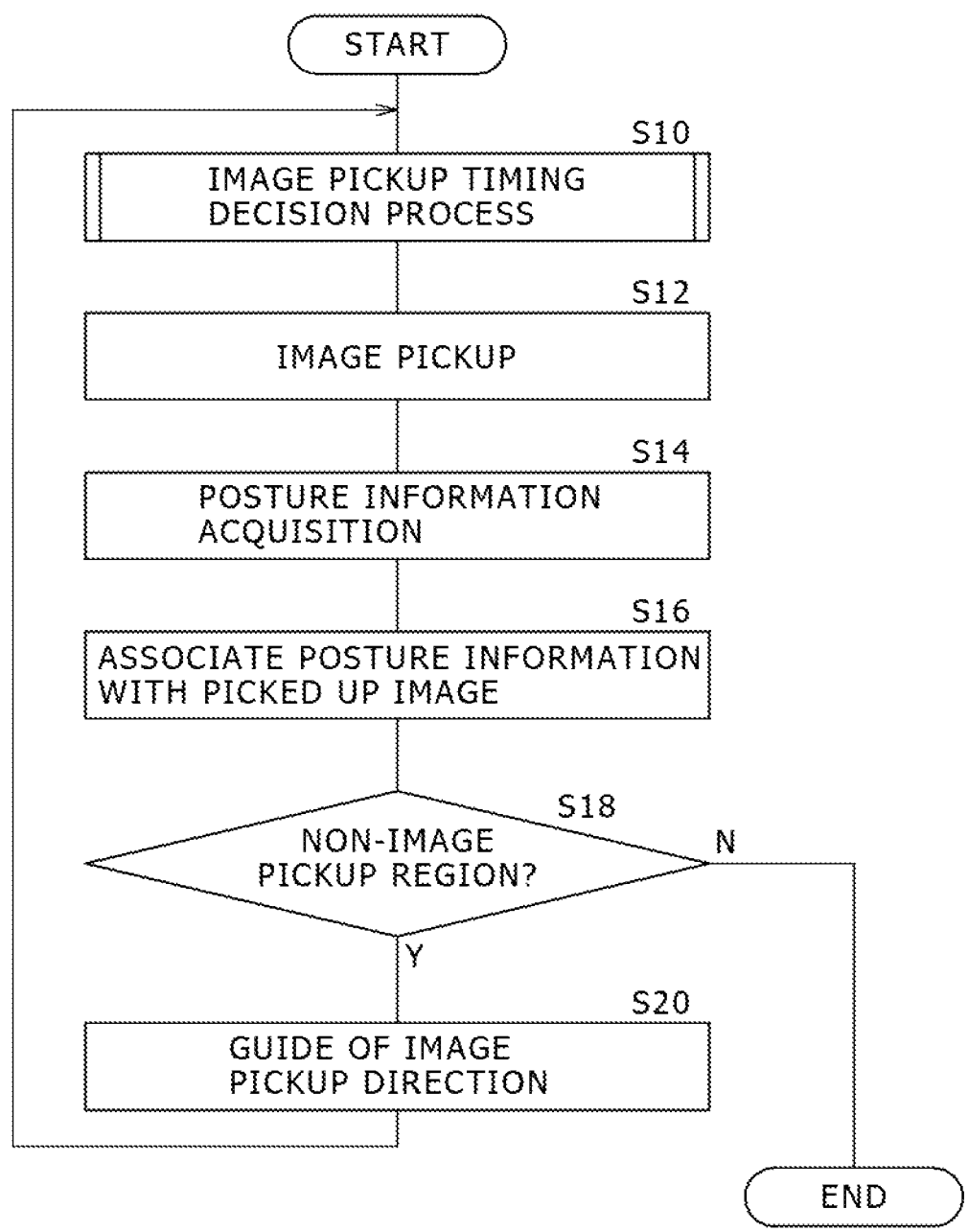
FIG. 10 is a flow chart illustrating a procedure of image pickup of a panoramic image.

FIG. 10 is a flow chart illustrating a procedure of image pickup of a panoramic image.

The image pickup timing decision unit 14 executes an image pickup timing decision process (S10). The image pickup unit 10 carries out image pickup at an image pickup timing designated by the image pickup timing decision unit 14 or an image pickup timing designated by the user and records the picked up image into the frame memory 12 (S12).

The posture detection unit 60 acquires posture information of the portable terminal 200, namely, a tilt angle, a roll angle and a pan angle (S14).

The component image generation unit 20 stores the posture information of the portable terminal 200 as a component image in an associated relationship with the picked up image into the component image storage unit 22 (S16). The posture information of the portable terminal 200 may be converted into a pan angle and an elevation angle of the rear side camera 212 and associated with the picked up image. In both cases, if a plurality of component images are stitched, then a panoramic image can be synthesized. The component images may be connected based on the posture information of the portable terminal 200 or the information of the pan angle and the elevation angle of the rear side camera 212.

The non-image pickup region decision unit 24 decides from the posture information or the information of the pan angle and the elevation angle of a plurality of picked up component images stored in the component image storage unit 22 whether or not there remains a region in which no image is picked up as yet and which is not enough to complete a final panoramic image (S18). If there remains no region in which no image is picked up as yet, then the image pickup is ended (N at S18).

If there remains a region in which no image is picked up as yet (Y at S18), then the image pickup guide portion 52 causes an arrow mark to be displayed on the screen or issue an audio guide in order to guide the user so that a component image which is not picked up as yet and neighbors with a component image picked up most recently is picked up next (S20).

Figure 11:
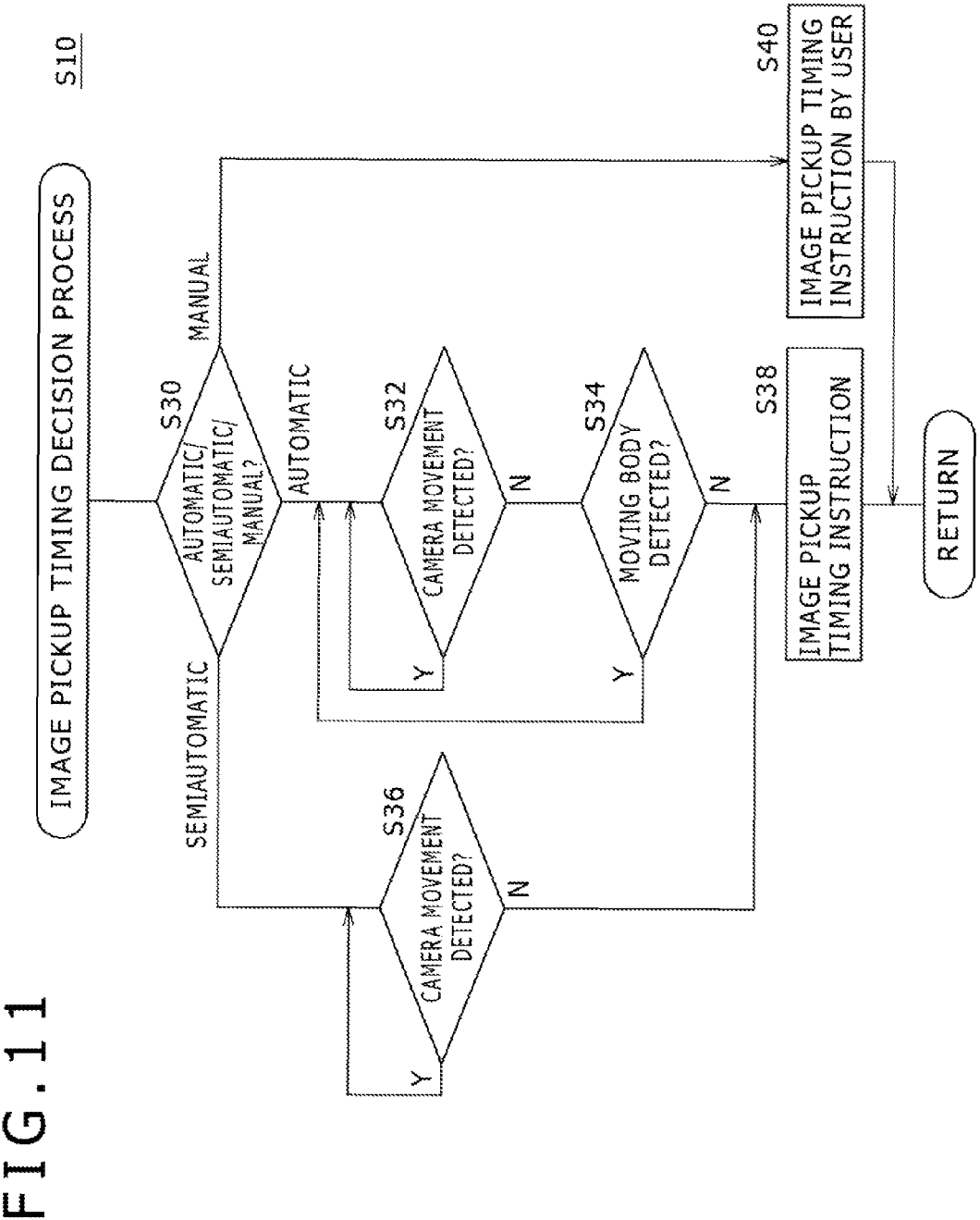
FIG. 11 is a flow chart illustrating a detailed procedure of an image pickup timing decision process of FIG. 10.

FIG. 11 is a flow chart illustrating a detailed procedure of the image pickup timing decision process at step S10 by the image pickup timing decision unit 14.

It is decided which one of the automatic, semiautomatic and manual modes the image pickup mode is (S30). If the image pickup mode is the manual image pickup mode, then the user would release the shutter to instruct the image pickup unit 10 of an image pickup timing (S40).

If the image pickup mode is the automatic image pickup mode, then a movement of the camera is detected based on outputs of the three-axis gyro sensor 62 and the three-axis acceleration sensor 64 (S32). Here, the "movement of the camera" includes vibration of the camera or camera shake when the image pickup angle is changed. If the time variation of the inclination data detected by the three-axis gyro sensor 62 is smaller than a threshold value TA and besides the time variation of the inclination data detected by the three-axis acceleration sensor 64 is smaller than a threshold value TB, then it is decided that there is no movement of the camera (N at S32), and the processing advances to step S34. In any other case, it is decided that there is a movement of the camera (Y at S32), and it is waited that the movement of the camera disappears.

Then, moving body detection is carried out (S34). If the absolute difference between frames is smaller than a threshold value TC, it is decided that no subject which is moving is caught in the image (N at S34), and the image pickup timing decision unit 14 instructs the image pickup unit 10 of this point of time as an image pickup timing (S38). If the absolute difference between the frames exceeds the threshold value TC (Y at S34), then the movement detection of the camera at step S32 and the moving body detection at step S34 are repeated.

The moving body detection process at step S34 is preferably configured such that, although a moving body such as a person who is walking at a remote place is permitted, a moving body in a near view is not permitted. This is because, if a moving body is in the near view, then this causes inconvenience in synthesis of a panoramic image. Therefore, when a region in which a movement is detected from an inter-frame difference is greater than a predetermined size, it may be decided that a moving body is caught, but in any other case, it may be decided that no moving body is caught.

If a moving body is detected, then permission to carry out image pickup may be sought to the user. For example, either a message such as, for example, "Something is moving. If image pickup is to be continued with this, then please depress the determination button." is displayed or outputted by voice, and if the user issues an image pickup instruction, then image pickup may be carried out even if a moving body is detected. If the user does not permit image pickup, then image pickup is carried out after it is waited that a moving body is not detected any more.

When the image pickup mode is the semiautomatic image pickup mode, the image pickup timing decision unit 14 carries out movement detection of the camera at step S32, but skips the moving body detection at step S34. The image pickup timing decision unit 14 instructs the image pickup unit 10 of the point of time at which it is decided that there is no movement of the camera as an image pickup timing (S38).

Figure 12:
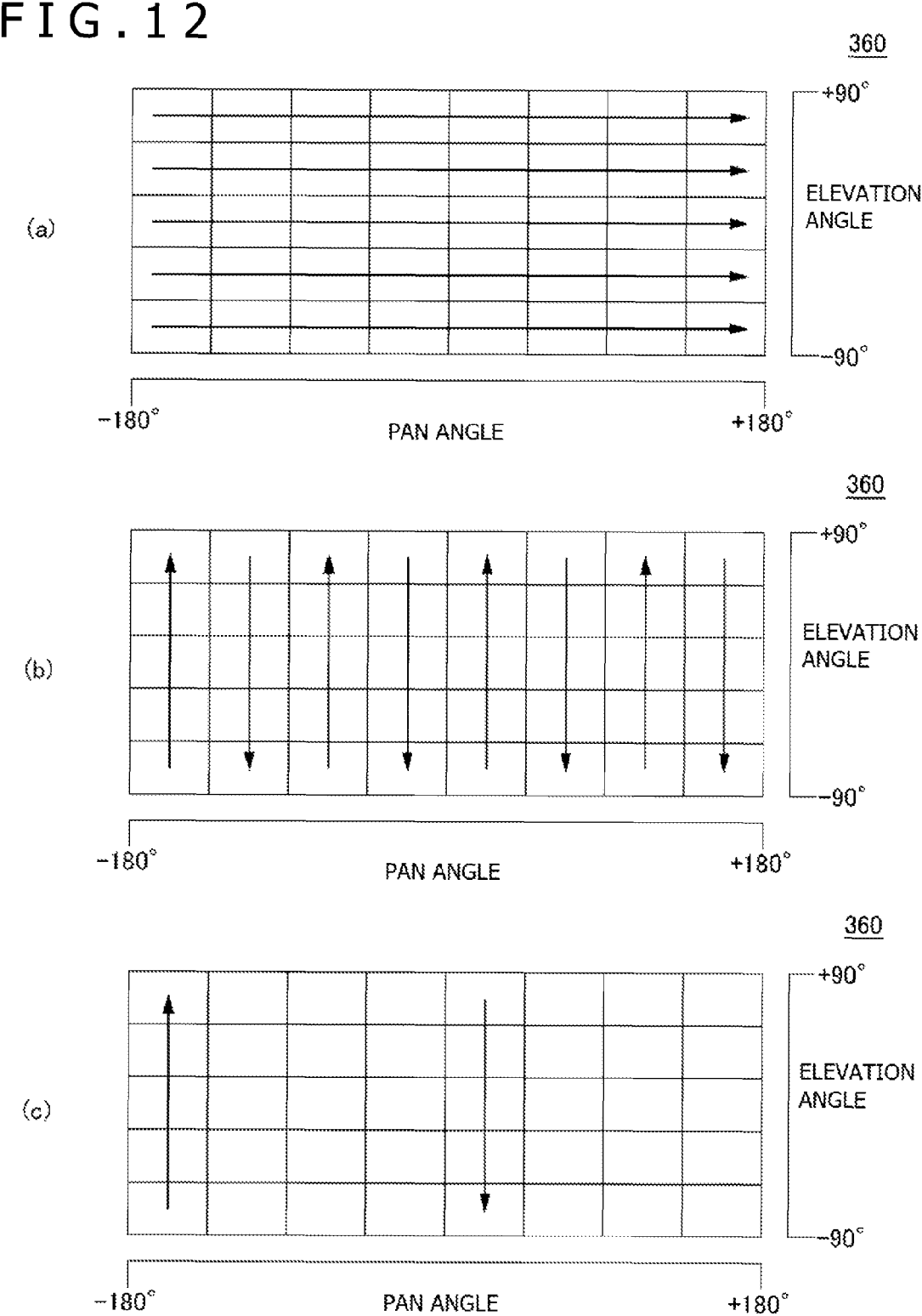
FIGS. 12(a) to 12(c) are views illustrating a panoramic image pickup guide by an image pickup guide portion.

FIGS. 12(*a*) to 12(*c*) are views illustrating panoramic image pickup guides by the image pickup guide portion 52.

The panoramic image 360 is formed from sectoral component images overlapping with each other as illustrated in FIGS. 8A and 8B. However, here the whole celestial sphere is simply divided into grid-like cells in accordance with the angle of view of the camera and component images are represented by the cells for simplified description.

FIG. 12(*a*) illustrates a method wherein pickup of a component image is carried out while the pan angle is successively changed within a range from approximately −180 degrees to approximately +180 degrees with the elevation angle of the camera kept fixed is repeated changing the elevation angle to pick up an image of the whole celestial sphere. In this image pickup method, since the yaw drift of the three-axis gyro sensor 62 is accumulated, errors accumulate in the image pickup direction.

In contrast, FIG. 12(*b*) illustrates another method wherein pickup of a component image is carried out while the elevation angle is successively changed within a range from approximately −90 degrees to approximately +90 degrees with the pan angle kept fixed is repeated changing the pan angle to pick up an image of the whole celestial sphere. After component images are picked up with the elevation angle changed from approximately −90 degrees to approximately +90 degrees at a certain pan angle, at a next pan angle, component images are picked up while the elevation angle is successively changed from approximately +90 degrees to approximately −90 degrees as indicated by arrow marks. By the method, the continuity of image pickup regions can be assured at a turn of the pan angle. If image pickup is carried out in the order of the arrow marks of FIG. 12(*b*), then since the pan angle merely makes one rotation, the drift error of the three-axis gyro sensor 62 is not accumulated, and an accurate image pickup direction can be detected.

Where both of the front side camera 210 and the rear side camera 212 are used, while the front side camera 210 picks up a component image while successively changing the elevation angle from approximately −90 degrees to approximately +90 degrees, the rear side camera 212 can pick up component images at pan angles different by 180 degrees successively changing the elevation angle from approximately +90 degrees to −90 degrees as indicated by arrow marks in FIG. 12(*c*).

FIGS. 13(*a*) and 13(*b*) are views illustrating an example of component images and a panoramic image. Also here, description is given assuming that component images are grid-like cells. FIG. 13(*a*) depicts an example of grid-like component images, and FIG. 13(*b*) depicts an example of a panoramic image synthesized by stitching the component images.

Figure 14:
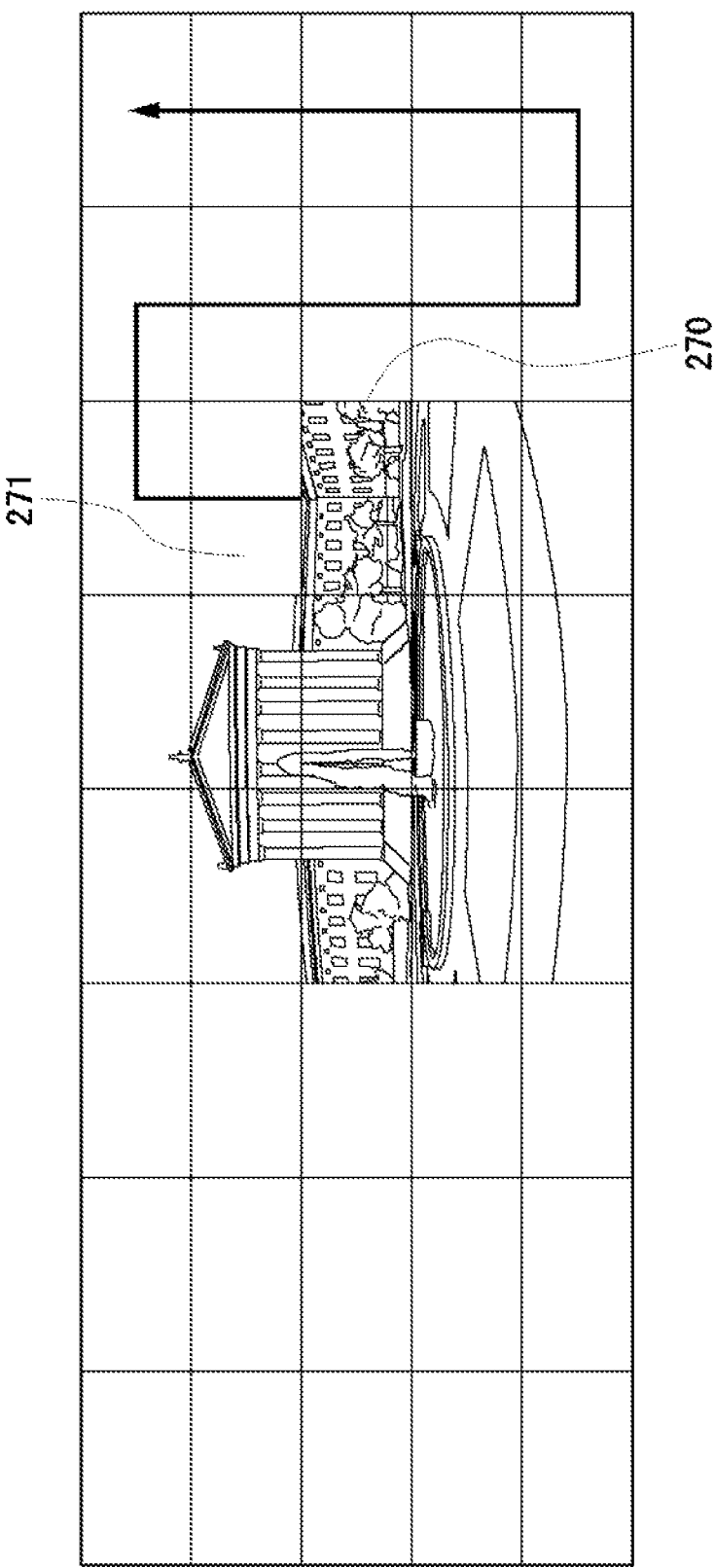
FIG. 14 is a view illustrating a panoramic image during image pickup.

FIG. 14 is a view illustrating the panoramic image during image pickup. Component images picked up already are displayed, and blank grids are regions for component images which are not picked up as yet. As a component image to be picked up next, a region 271 for a component image adjacent a component image 270 picked up most recently is selected from within a region which includes no picked up image. Since the order of component images to be picked up is preferably such that component images are picked up with the elevation angle successively changed while the pan angle is kept fixed as illustrated in FIG. 12(*b*), the guide for the image pickup order of component images is such as that indicated by an arrow mark.

Figure 15:
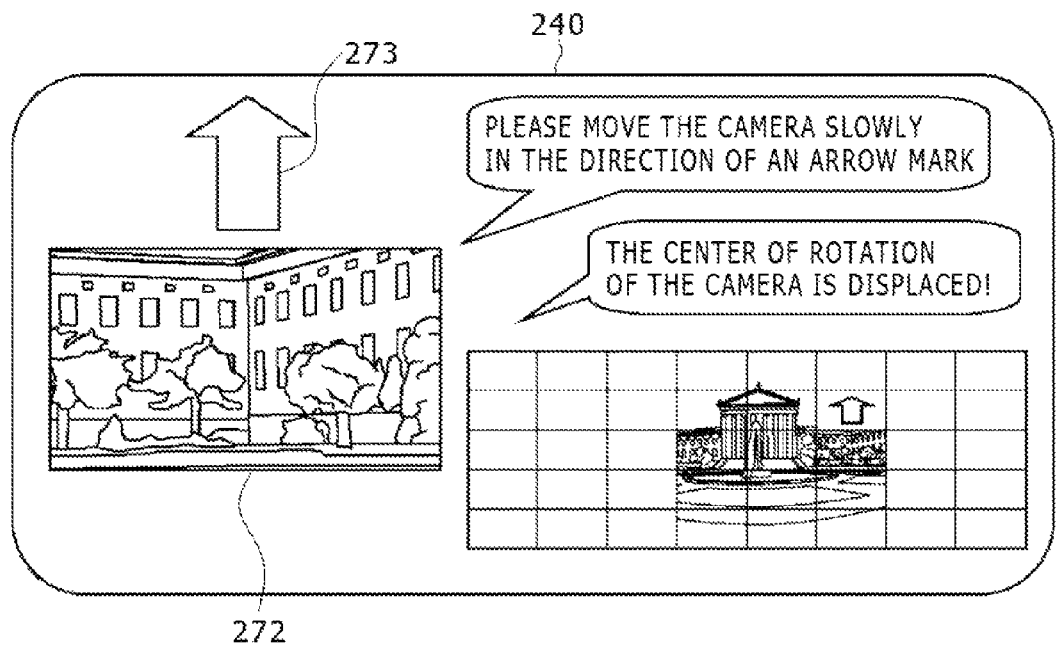
FIG. 15 is a view illustrating an example of a guide of an image pickup order of the panoramic image pickup.

FIG. 15 illustrates an example of the guide for an image pickup order of a panoramic image pick up. In a right lower region of the screen of the display 240, the panoramic image of FIG. 14 being picked up currently is displayed, and a region for a component image to be picked up next is indicated by an arrow mark. Consequently, the user can discriminate at which point the image pickup of the panoramic image arrives at present.

In a left region of the screen of the display 240, an image 272 being picked up at present by the camera is displayed and plays a role of a finder. A region to be picked up next is indicated by a large arrow mark 273. An image pickup timing is designated automatically or manually. After the image pickup ends, the user would pan or tilt the camera in the direction of the arrow mark to enter image pickup for a next component image.

Based on detection results of the moving direction and the moving speed by the three-axis gyro sensor 62 and/or the three-axis acceleration sensor 64, a message is displayed on the screen like "Please move the camera slowly in the direction of the arrow mark." The message may be outputted by voice. If the moving speed of the camera is excessively high, then the message or the arrow mark may be changed in color for the warning. On the other hand, if the position of the camera moves, then the center of rotation of the camera is displaced and causes an error. When a variation of the position of the camera is detected by self-position estimation as described in the description of an embodiment 2 hereinafter described, such a warning message as "The center of rotation of the camera has displaced!" is displayed.

Figure 16:
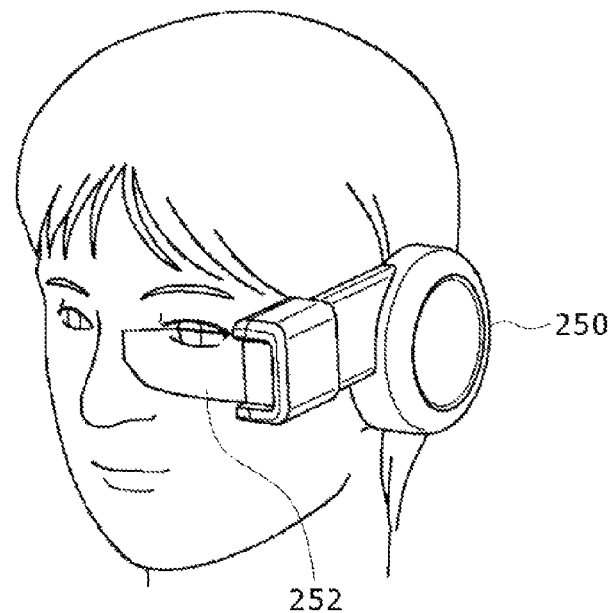
FIG. 16 is a schematic view of a see-through type head-mounted display.

FIG. 16 is a schematic view of a see-through type head-mounted display (HMD) 250. This is an application example wherein the functional configuration depicted in FIG. 9 is mounted in the see-through type HMD 250. The see-through type HMD 250 includes a camera, a three-axis gyro sensor and/or a three-axis acceleration sensor, a three-axis geomagnetic sensor, and a display 252. The user would wear the see-through type HMD 250 like an eyeglass and carry out panoramic image pickup while viewing an outside world which can be seen through the display 252 and an image displayed on the display 252.

FIGS. 17(a) and 17(b) are views illustrating examples of a screen image of the display 252 of the see-through type HMD 250. As shown in FIG. 17(a), an image pickup region 254 indicated by solid lines is located centrally of the display 252, and an image of the image pickup region 254 is picked up and stored as a component image with which a pan angle and an elevation angle of the camera are associated. A guide region 256 indicated by broken lines is a region in which an image is to be picked up next. A leftwardly directed arrow mark 258 is displayed on the screen so that the user may turn the head to the left and face in the direction of the guide region 256.

FIG. 17(b) depicts an example of a screen image of the display 252 when the user turns the head to the left. The image pickup region 254 indicated by solid lines and the guide region 256 indicated by broken lines are located centrally of the screen. The user would move the head so that the quadrangle (image pickup region 254) of solid lines indicated on the display 252 and the quadrangle (guide region 256) of broken lines may coincide with each other. When the guide region 256 and the image pickup region 254 almost overlap with each other, image pickup is carried out automatically and a component image is acquired. A plurality of component images picked up already may be displayed in a juxtaposed relationship in a corner of the display 252 so that the user can grasp to which degree the image pickup of a panoramic image has progressed.

As described above, with the panoramic image generation apparatus of the present embodiment, by stitching picked up images using a three-axis gyro sensor and/or a three-axis acceleration sensor, a panoramic image can be synthesized simply. If a three-axis geomagnetic sensor is used additionally, then an absolute orientation can be associated with the panoramic image. Consequently, even if an expensive pan-tilt camera with a camera platform is not used, a panoramic image can be picked simply at a low cost by the portable terminal 200 with a camera.

Since an existing synthesis method of a panoramic image uses image matching, when characteristic points of images cannot be associated with each other upon stitching, it is difficult to synthesize a panoramic image. Especially, in the case of a subject which does not include a characteristic point in an image like the sky or a white wall and does not allow association, stitching by image matching is impossible. In this regard, with the panoramic image generation apparatus of the present embodiment, even if an image does not have a characteristic point, since a pan angle and an elevation angle of the camera from the three-axis gyro sensor and/or the three-axis acceleration sensor can be associated with a picked up image, a panoramic image of the celestial sphere can be synthesized accurately.

However, since an error is involved in posture detection by the three-axis gyro sensor and/or the three-axis acceleration sensor, when a panoramic image is to be synthesized finally, if image matching is applied additionally, then a panoramic image of high picture quality can be generated.

Further, according to existing panorama synthesis by image matching, since time is required for image processing, it is difficult to decide a non-image pickup region of a panoramic image on the real time basis while image pickup is being carried out. In this regard, with the panoramic image generation apparatus of the present embodiment, even if image matching is not applied, since stitching of picked up images can be carried out based on posture information obtained from the three-axis gyro sensor and/or the three-axis acceleration sensor, it is possible to detect a non-image pickup region on the real time basis and guide a next image pickup region. Also it is possible to guide the user so that the user may move the portable terminal 200 slowly based on a moving speed detected by the three-axis gyro sensor and/or the three-dimensional acceleration sensor.

Conventionally, if it is tried to pick up a panoramic image while a camera of a portable terminal or the like is being panned and/or tilted, then it is difficult to generate an accurate panoramic image from a movement of the camera or displacement of the axis of rotation. However, with the panoramic image generation apparatus of the present embodiment, since a movement of the camera is detected by the three-axis gyro sensor and/or the three-axis acceleration sensor and the shutter is automatically released to pick up an image when there is no movement of the camera, even in panoramic image pickup by the portable terminal 200, a bad influence of a movement of the camera can be suppressed. Further, if also moving body detection is carried out additionally and image pickup is carried out at a timing at which no moving body is detected, then it is possible to acquire picked up images which include no moving person or body to generate a panoramic image.

Embodiment 2

Figure 18:
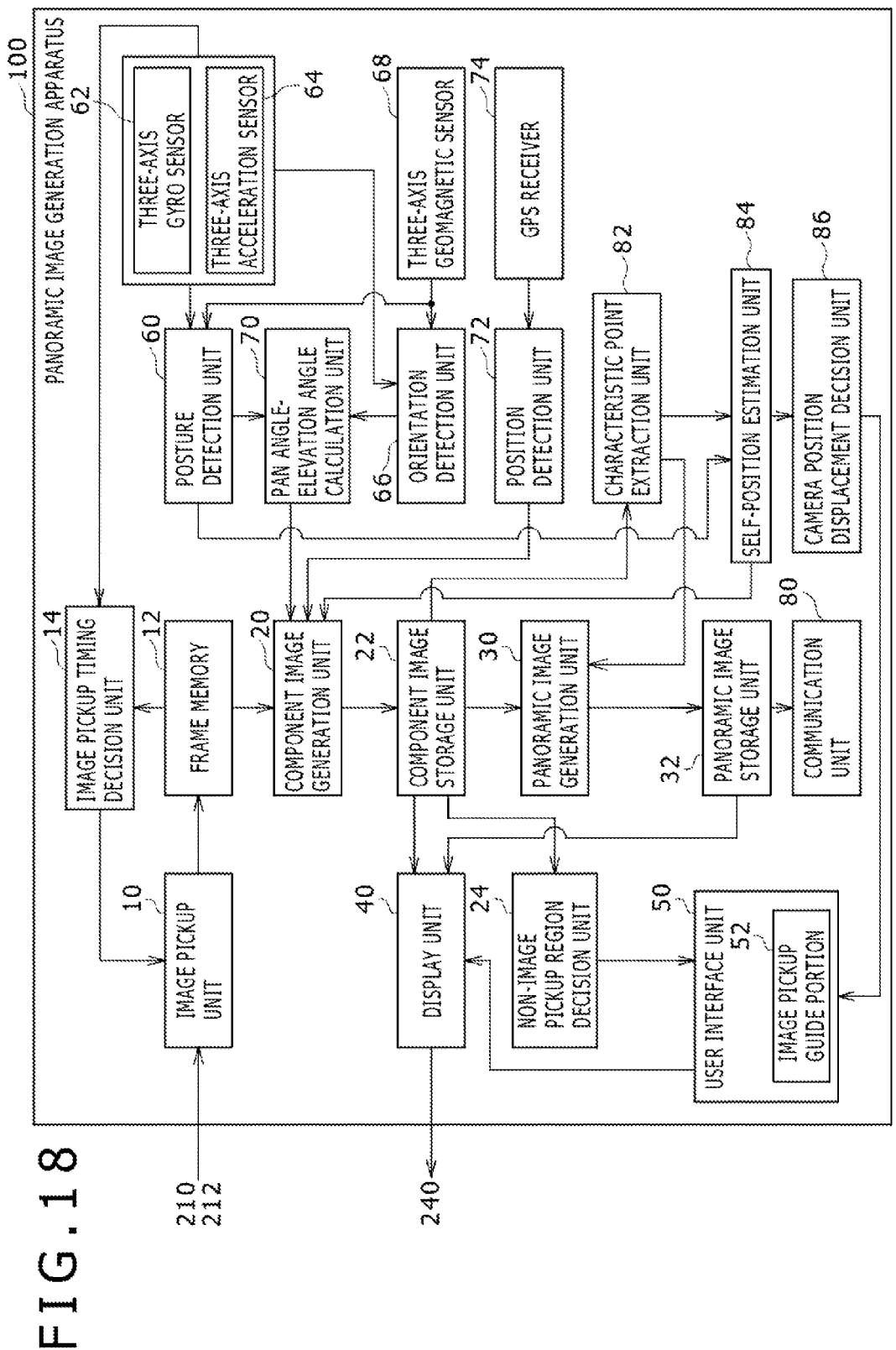
FIG. 18 is a functional block diagram of a panoramic image generation apparatus according to a different embodiment.

FIG. 18 is a functional block diagram of a panoramic image generation apparatus 100 according to an embodiment 2. The panoramic image generation apparatus 100 of the embodiment 2 includes, in addition to the components of the panoramic image generation apparatus 100 of the embodiment 1 described hereinabove, a characteristic point extraction unit 82, a self-position estimation unit 84 and a camera position displacement decision unit 86, and has a function of estimating the camera position of the portable terminal 200 to cause the user to adjust the displacement of the camera position. The other components and functions are same as those of the panoramic image generation apparatus 100 of the embodiment 1, and therefore, description of them is omitted herein.

The characteristic point extraction unit 82 extracts characteristic points between adjacent ones of a plurality of component images stored in the component image storage unit 22 and different in a pan angle or a tilt angle from each other to detect control points for associating the adjacent component images with each other. The characteristic point extraction unit 82 supplies information of the characteristic points associated with each other between adjacent component images to the self-position estimation unit 84. Further, the characteristic point extraction unit 82 supplies the detected control points to the panoramic image generation unit 30. The control points are all or some of the characteristic points associated with each other between adjacent component images.

Figure 21:
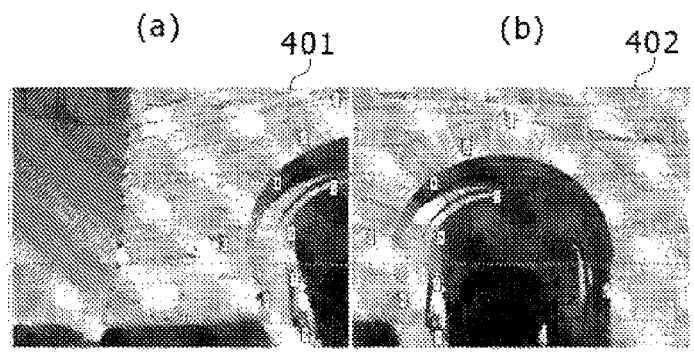
FIGS. 21(a) and 21(b) are views depicting a control point detected between two component images adjacent each other.

FIGS. 21(a) and 21(b) are views depicting control points detected between two adjacent component images 401 and 402. Here, nine control points are detected.

Figure 22:
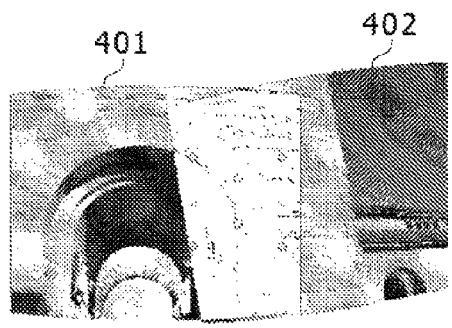
FIG. 22 is a view illustrating a manner in which the two adjacent component images are aligned and synthesized based on the control point.

FIG. 22 is a view illustrating a manner in which the two adjacent component images 401 and 402 are aligned and combined with each other based on the control points. The panoramic image generation unit 30 rotates the component image 402 with respect to the component image 401 to combine them so that the control points (indicated by round marks in FIG. 22) of the two images coincide with each other as far as possible in an overlapping region of the adjacent component images 401 and 402.

The self-position estimation unit 84 simultaneously estimates, based on the information of two-dimensional coordinates, on the two adjacent component images, of the characteristic points of the images, three-dimensional coordinates of the characteristic points and coordinates of the camera positions at which the individual component images are picked up. Since the camera positions when two component images are picked up are displaced from each other, the two component images are parallax images from different visual points. Therefore, the two component images include depth information in the form of a parallax, and by solving simultaneous equations which satisfy each characteristic point, three-dimensional coordinates of the characteristic point and three-dimensional coordinates (camera position) of the visual point of the component image can be determined simultaneously. As one of methods of simultaneously determining three-dimensional position information of a subject and a visual point position based on a plurality of parallax images whose visual point positions are different from each other, a technology called SLAM (Simultaneous Localization and Mapping) is available.

The SLAM is a technology of carrying out self-position estimation and environment mapping simultaneously based on information acquired from sensors and is applied to an autonomous mobile robot and so forth. The self-position estimation unit 84 estimates a three-dimensional position of a characteristic point of a subject and a three-dimensional position of a camera using the publicly known SLAM technology as an example. However, some other self-position estimation technology may be used. The SLAM is introduced, for example, in the following paper. Andrew J. Davison, "Real-Time Simultaneous Localisation and Mapping with a Single Camera," ICCV 2003.

The self-position estimation unit 84 supplies the information of the three-dimensional coordinate values of the characteristic points of the subject and the three-dimensional coordinate values of the camera positions obtained by the estimation to the component image generation unit 20. The component image generation unit 20 stores the posture information of the portable terminal 200, the three-dimensional position information of the characteristic points of the subject and the three-dimensional position information of the camera positions in an associated relationship with the component images into the component image storage unit 22.

Since a component image includes three-dimensional position information of a subject, if the panoramic image generation unit 30 combines a plurality of component images to synthesize a panoramic image, then a three-dimensional panoramic image having the three-dimensional position information of the subject is obtained. If the three-dimensional panoramic image is expanded on a three-dimensional coordinate system, then a simple three-dimensional model of the subject can be generated. Further, since depth information of the subject is obtained, also it is possible to generate a stereo panoramic image.

The camera position displacement decision unit 86 decides whether or not the camera position estimated by the self-position estimation unit 84 is displaced from the first position (origin). If the camera position is displaced, then an accurate synthesized panoramic image is not obtained. The Image pickup guide portion 52 causes a locus of movement of the camera position to be displayed on the display based on the three-dimensional coordinate values of the camera position estimated by the self-position estimation unit 84 so that the user can visually recognize the camera position at the timing of panoramic image pickup. Further, if it is decided by the camera position displacement decision unit 86 that the camera position is displaced, then the Image pickup guide portion 52 guides the user to adjust the camera position or instructs the user to retry image pickup.

However, even if the camera position is displaced a little, if the component image is corrected so that the camera position is returned to the origin, then a panoramic image can be synthesized. Therefore, when the panoramic image generation unit 30 combines component images, it uses the three-dimensional position information of the characteristic points associated with the component images and the three-dimensional position information of the camera positions to adjust the three-dimensional coordinate values of the characteristic points of the component images so that the displacement of the camera position from the origin may approach zero thereby to correct the component images. Then, the panoramic image generation unit 30 combines the corrected component images to generate a panoramic image.

Figure 19:
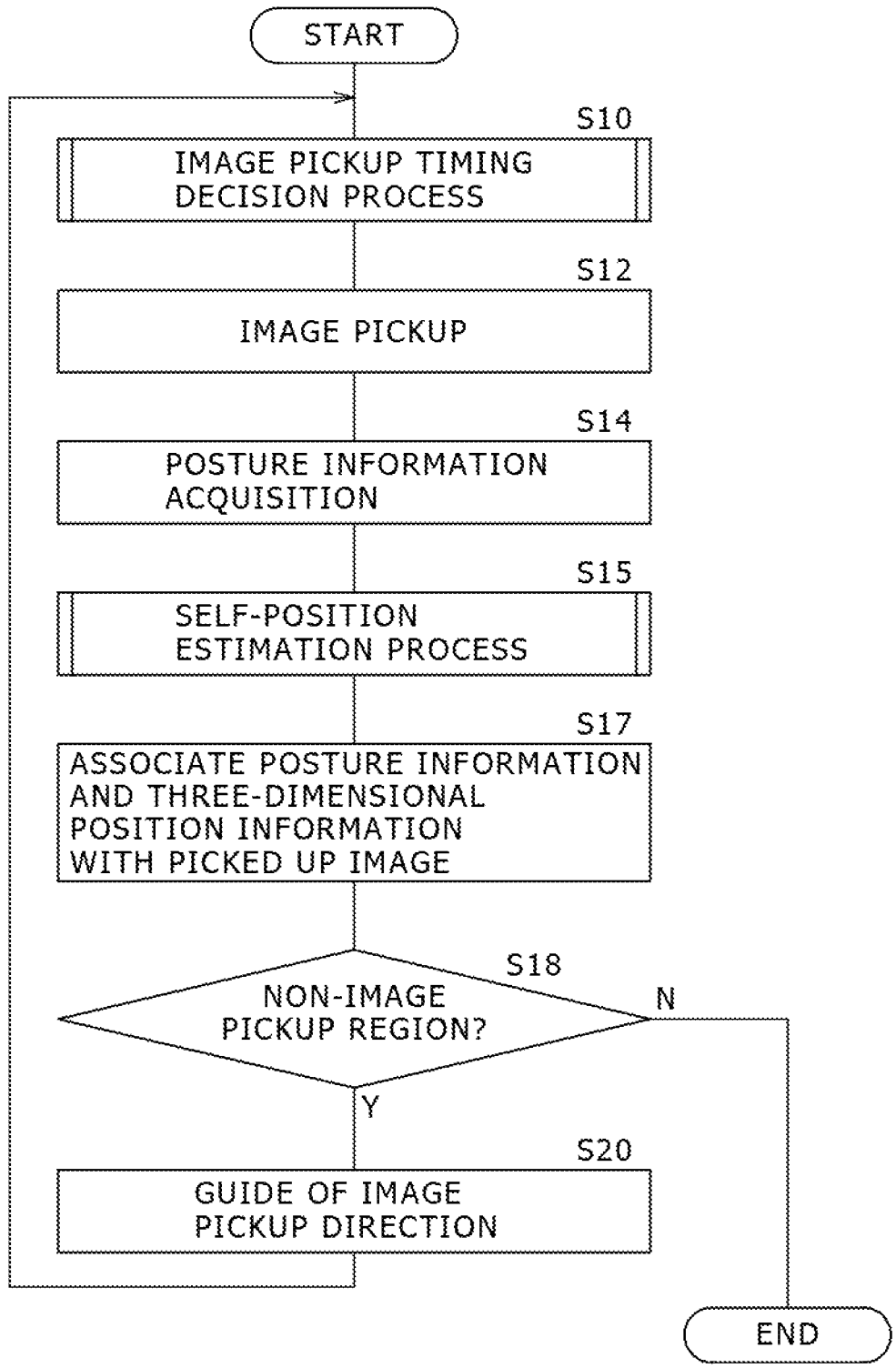
FIG. 19 is a flow chart illustrating a procedure of image pickup of a panoramic image according to the different embodiment.

FIG. 19 is a flow chart illustrating a procedure of image pickup of a panoramic image by the panoramic image generation apparatus 100 according to the embodiment 2. Processes at steps S10, S12, S14, S18 and S20 of FIG. 19 are same as the processes at steps S10, S12, S14, S18 and S20 by the panoramic image generation apparatus 100 according to the embodiment 1 depicted in FIG. 10, and therefore, a description of them is omitted herein.

After posture information of the portable terminal 200, namely, a tilt angle, a roll angle and a pan angle, is acquired at step S14, the information is used to carry out a self-position estimation process at step S15. Position information of the camera of the portable terminal 200 is obtained by the self-position estimation process, and adjustment of the camera position is carried out as occasion demands. Further, three-dimensional position information of the characteristic points of the subject is obtained by the self-position estimation process.

At step S17, the component image generation unit 20 stores the posture information of the portable terminal 200, the three-dimensional position information of the characteristic points of the subject and the three-dimensional position information of the camera position in an associated relationship with the picked up image as a component image into the component image storage unit 22.

Figure 20:
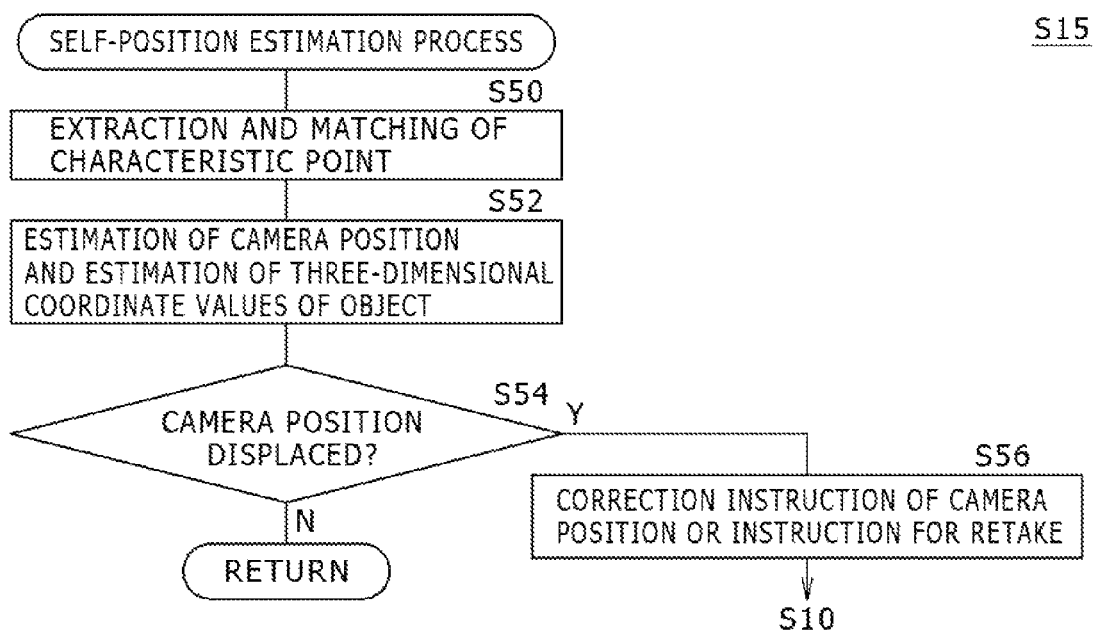
FIG. 20 is a flow chart illustrating a detailed procedure of a self-position estimation process of FIG. 19.

FIG. 20 is a flow chart illustrating a detailed procedure of the self-position estimation process at step S15 of FIG. 19.

The characteristic point extraction unit 82 extracts, in an overlapping region of two adjacent component images, characteristic points of the object whose image is picked up and carries out matching of them (S50). The self-position estimation unit 84 uses the SLAM to estimate three-dimensional coordinate values of the position of the camera at which each component image is picked up and three-dimensional coordinate values of the characteristic points of the object (S52).

The camera position displacement decision unit 86 decides whether or not the camera position upon image pickup is displaced exceeding a predetermined threshold value from the first position (S54). If the displacement of the camera position remains within the threshold value (N at S54), then the self-position estimation process is ended. Here, the user may be permitted to input an instruction indicating that which one of an image of a distant view and an image of a near view is to be picked up, and the threshold value for the decision of the displacement of the camera position may be changed over depending upon whether an image of a distant view or an image of a near view is to be picked up. In the case of image pickup of a distant view, the permissible range for the displacement of the camera position is greater in comparison with that in image pickup of a near view. Therefore, for image pickup of a distant view, the threshold value is set higher than the threshold value for image pickup of a near view.

If a displacement of the camera position exceeding the predetermined threshold value is detected (Y at S54), then the camera position displacement decision unit 86 instructs the image pickup guide portion 52 to adjust the camera position. The image pickup guide portion 52 either instructs the user to correct the camera position or invalidates some or all of component images picked up already and instructs the user to retry image pickup (S56). Thereafter, the processing returns to S10.

Figure 23:
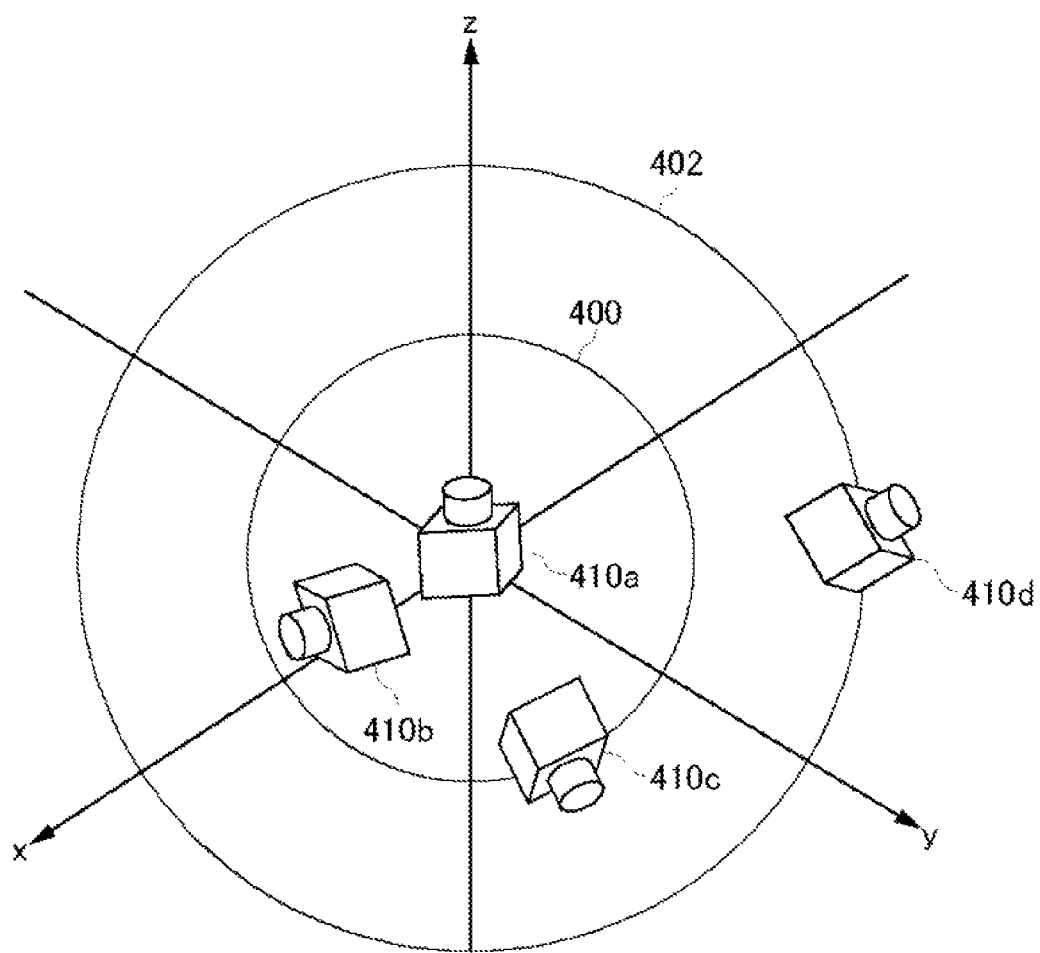
FIG. 23 is a view illustrating an example of a guide for urging to adjust a displacement of a camera position.

FIG. 23 is a view illustrating an example of a guide for urging the user to adjust the displacement of the camera position. The image pickup guide portion 52 three-dimensionally displays the camera position upon panoramic image pickup at a portion of the screen of the display. The image pickup guide portion 52 sets a first camera position 410a to the origin and displays histories 410b, 410c and 410d of the camera position in a three-dimensional coordinate system.

The user can view the camera position at present or the locus of movement of the camera position displayed on the display to confirm whether or not the camera position is displaced from the first position. In addition to graphical display of the three-dimensional position of the camera and the posture information of the portable terminal 200 on the display unit, the direction of movement of the camera position may be presented by voice or a text. Alternatively, the portable terminal 200 may be vibrated to notify the user that the camera position is displaced or is displaced exceeding a permissible range.

In this three-dimensional coordinate system, an inner side sphere 400 centered at the origin corresponds to a first threshold value Th1 for the displacement of the camera position, and an outer side sphere 402 centered at the origin corresponds to a second threshold value Th2 (>Th1) for the displacement of the camera position. The first threshold value Th1 is an upper limit to a permissible displacement amount within which component images can be stitched to generate a panoramic image without correction. The second threshold value Th2 is an upper limit to a permissible displacement amount within which, if component images are corrected, the component images after correction can be stitched to generate a panoramic image.

If the camera position at the time of starting of image pickup is represented by X0 and the camera position upon image pickup of an nth component image is represented by Xn, then when $|Xn-X0|<Th1$, a component image is picked up at the camera position. Here, $|Xn-X0|$ represents the distance from the camera position X0 upon starting of the image pickup to the camera position Xn upon image pickup of the nth component image. If this is described with reference to FIG. 23, then when the camera position at present is within the inner side sphere 400, a component image is picked up at the camera position, and a correction instruction for the camera position is not issued.

When $|Xn-X0|\geq Th1$ and $|Xn-X0|<Th2$, since a panoramic image can be synthesized by correction, a component image is picked up at the camera position. However, a notification that the camera position is displaced is issued to the user to urge the user to correct the camera position. In regard to FIG. 23, when the camera position at preset is between the inner side sphere 400 and the outer side sphere 402, a component image is picked up at the camera position, but a correction instruction for the camera position is issued. At this time, the panoramic image generation unit 30 corrects the component image based on the displacement of the camera position and then combines the corrected component image to generate a panoramic image.

When $|Xn-X0|\geq Th2$, since synthesis of a panoramic image is impossible anymore even if correction is carried out, image pickup is not carried out at the camera position, and the user is urged to move the camera position. Then, if the camera position enters back into the range in which image pickup is possible, then image pickup is started. Even if a predetermined period of time elapses, if the camera position does not enter back into the region in which image pickup is possible, then the panoramic image pickup till then is canceled, and the user is instructed to retry panoramic image pickup.

The threshold values Th1 and Th2 for defining the range within which image pickup is possible are preferably made variable in response to the distance from the point of view to the subject. The distance from the point of view to the subject can be determined from three-dimensional coordinate values of the characteristic points of the subject and the three-dimensional coordinate values of the camera position estimated by the self-position estimation unit 84. If the subject is a distant view, then even if the displacement of the camera position is great, the positional displacement of the subject on the image is not great, and therefore, the error when a panoramic image is synthesized is small. However, if the subject is a near view, then since a great amount of positional displacement of the subject on the image arises from a small amount of displacement of the camera position, the error when a panoramic image is synthesized is great. Therefore, the threshold values Th1 and Th2 when the subject is a distant view can be set greater than the threshold values Th1 and Th2 when the subject is a near view. The camera position displacement decision unit 86 may adjust the threshold values Th1 and Th2 in response to the distance from the camera position to the subject.

While, in the foregoing description, the camera position is estimated by the SLAM, the camera position may be acquired using position information detected by the GPS receiver 74.

As described above, with the panoramic image generation apparatus of the present embodiment, it is possible to estimate a camera position and a three-dimensional position of a subject whose image is picked up using a technology such as the SLAM and notify a user of displacement of the camera position. Where it is decided in response to the distance to the subject whether or not the displacement of the camera position is within the permissible range and the displacement of the camera position exceeds the permissible range, it is possible to urge the user to move the camera position.

Even if the three-axis gyro sensor 62 or the three-axis acceleration sensor 64 can detect a posture of the portable terminal 200, it is difficult to detect displacement of the camera position. In this regard, with the present embodiment, a camera position and a three-dimensional position of a subject can be estimated simultaneously using the fact that, if the camera position is displaced, then a parallax appears between picked up component images. Therefore, it is possible to detect displacement of the camera position and urge the user to adjust the camera position or correct the image based on the displacement of the camera position.

Embodiment 3

Figure 24:
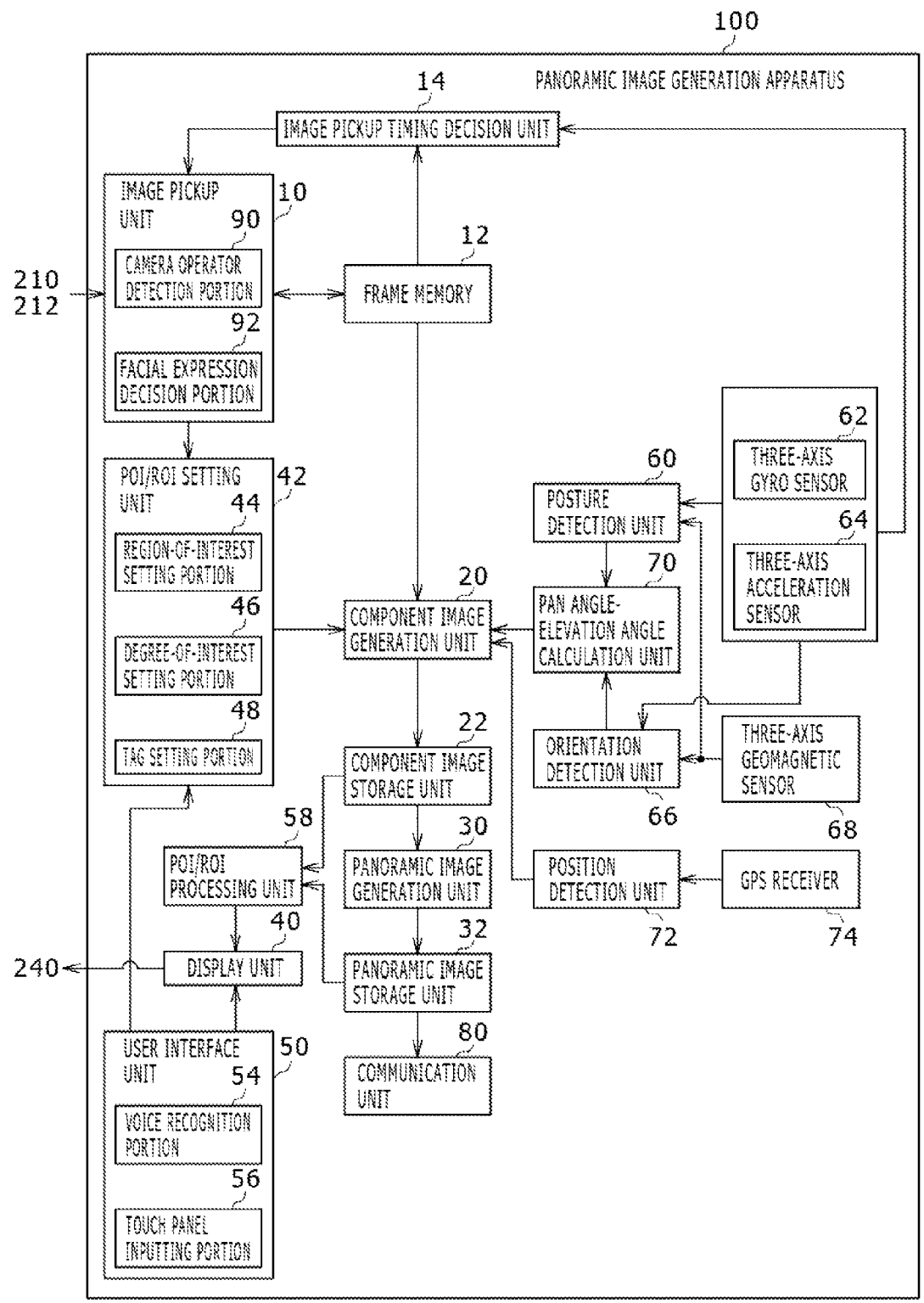
FIG. 24 is a functional block diagram of a panoramic image generation apparatus according to a further different embodiment.

FIG. 24 is a functional block diagram of a panoramic image generation apparatus 100 according to an embodiment 3. The panoramic image generation apparatus 100 of the present embodiment has a function of setting a region of interest during panoramic image pickup. Components common to those of the panoramic image generation apparatus 100 of the embodiment 1 are denoted by like reference numerals and the description of them is omitted herein.

A POI/ROI setting unit 42 includes a region-of-interest setting portion 44, a degree-of-interest setting portion 46 and a tag setting portion 48. The POI/ROI setting unit 42 sets a point POI (point of interest) of interest or a region ROI (region of interest) of interest to an image picked up by the image pickup unit 10, gives a degree of interest and a tag to a region of interest, and supplies region-of-interest information including coordinate information, a degree of interest and tag information of the region of interest to the component image generation unit 20. The component image generation unit 20 stores the region-of-interest information in an associated relationship with the picked up image into the component image storage unit 22.

The region-of-interest setting portion 44 sets a region designated by a camera operator detection portion 90 of the image pickup unit 10 or a region designated by a touch panel inputting portion 56 of the user interface unit 50 as a region of interest. The degree-of-interest setting portion 46 sets a degree of interest designated by a facial expression decision portion 92 of the image pickup unit 10 as a degree of interest in the region of interest set by the region-of-interest setting portion 44. The tag setting portion 48 sets a text designated by a voice recognition portion 54 of the user interface unit 50 as a tag to the region of interest set by the region-of-interest setting portion 44.

A POI/ROI processing unit 58 reads out a component image from the component image storage unit 22 and reads out a synthesized panoramic image from the panoramic image storage unit 32. Then, the POI/ROI processing unit 58 carries out an image process such as emphasis, blurring, zooming or changing of the picture quality for the region of interest set to the component image or the panoramic image. Where a degree of interest is set to the region of interest, image processing in accordance with the degree of interest is carried out. For example, the degree of emphasis is changed or the picture quality is changed in response to the degree of interest.

Further, the POI/ROI processing unit 58 may protect a region of interest when a panoramic image is processed. For example, when an artificial object such as an airship or a person is to be combined into a panoramic image, the POI/ROI processing unit 58 protects the region of interest by disposing the artificial object behind the region of interest or by not disposing the artificial object in the region of interest so that the region of interest may not be hidden by such artificial object.

The display unit 40 displays a component image or a panoramic image in which image processing is carried out for a region of interest by the POI/ROI processing unit 58. Further, when the display unit 40 displays a panoramic image, it may scroll and display the panoramic image so that the region of interest may come to the center of the screen of the display 240.

Further, when the display unit 40 changes over the display image from one panoramic image to another panoramic image, it may scroll and display the panoramic image after the changeover so that the region of interest after the changeover may come to the center of the screen of the display 240.

Specifically, it is assumed that a marker representative of a particular object such as a building is set to a particular orientation of a first panoramic image and a panorama viewer is configured such that, if the marker is selected, then the display image is changed over to a second panoramic image which includes the particular object. Also on the second panoramic image, the particular object is frequently set to a region of interest. Accordingly, upon changeover of a panoramic image, if the changeover is controlled such that a region of interest always comes to the center of the screen, then also on the panoramic image of the destination of the changeover, the object designated by the marker can be viewed from the beginning. For example, if the Osaka Castle is included in the first panoramic image and a marker is set to the Osaka Castle, then even if the marker is selected to change over the display to the second panoramic image, the Osaka Castle can be viewed on the second panoramic image. Since a panoramic image is a picked up image of a landscape within a wide range, if a panoramic image is changed over, then the direction is sometimes lost sight of. However, if the region of interest is displayed preferentially on a panoramic image after changeover, then such a problem as described just above can be avoided.

Where a plurality of regions of interest/points of interest are set to a panoramic image, when the panoramic image is scrolled and displayed, the regions of interest may be displayed, for example, in a priority order of a free region and a rectangular region. Alternatively, the regions of interest may be displayed in a priority order of the magnitude of the area or in a priority order of the degree of interest. Alternatively, a region of interest may be displayed preferentially to a point of interest. Further, when a marker of a first panoramic image is designated to change over the display image to a second panoramic image associated with the marker, the regions of interest/points of interest may be displayed in order preferentially from that region or interest/point of interest which is nearer to the direction of the marker of the first panoramic image.

The image pickup unit 10 includes the camera operator detection portion 90 and the facial expression decision portion 92.

The camera operator detection portion 90 decides whether or not the camera operator is caught in an image picked up by the image pickup unit 10, and supplies, if the camera operator is caught, information for designating the region in which the camera operator is caught to the region-of-interest setting portion 44 of the POI/ROI setting unit 42. The camera operator detection portion 90 can detect the camera operator by regarding a person caught in a great size in the picked up image as the camera operator. The region-of-interest setting portion 44 sets the region in which the camera operator is caught as a region of interest. The POI/ROI processing unit 58 carries out a process for blurring the region in which the camera operator is caught or fills the region with a surrounding texture to erase the region in which the camera operator is caught.

In panoramic image pickup, when the portable terminal 200 is panned to pick up an image, the camera operator is frequently caught. Further, when, while an image of the front is picked up by the rear side camera 212 of the portable terminal 200, the front side camera 210 is used to simultaneously pick up an image also on the opposite side different by 180 degrees, the camera operator is frequently caught by the front side camera 210. In such cases, by detecting the region in which the camera operator is caught and setting the region as a region of interest, an unintended image of the camera operator can be erased from the panoramic image. Alternatively, when the camera operator is caught intentionally, the region in which the camera operator is caught may be set as a region of interest such that, when the POI/ROI processing unit 58 carries out an image process for emphasizing the region of interest or when the display unit 40 displays a panoramic image, the display position of the panoramic image may be adjusted so that the region of interest may be displayed at the center of the display unit.

The facial expression decision portion 92 decides the facial expression of the camera operator whose image is picked up by the front side camera 210 during panoramic image pickup by the rear side camera 212. A publicly known facial expression recognition technology may be used for the decision of the facial expression. If it is decided that the camera operator has such an affirmative facial expression upon panoramic image pickup that the camera operator smiles or gazes to the subject, the facial expression decision portion 92 determines a degree of interest of a value, for example, from 0 to 100 in response to the facial expression and supplies the degree of interest to the degree-of-interest setting portion 46 of the POI/ROI setting unit 42. When a region of interest is already set by the region-of-interest setting portion 44, the degree-of-interest setting portion 46 sets the degree of interest supplied thereto from the facial expression decision portion 92 to the region of interest. However, when a region of interest is not set as yet, the degree-of-interest setting portion 46 treats an entire picked up image or an object in the proximity of the center of a picked up image as a region of interest and sets a degree of interest. The POI/ROI processing unit 58 executes a process in accordance with the degree of interest for the region of interest of the picked up image. For example, the picture quality is raised as the degree of interest increases.

The user interface unit 50 includes the voice recognition portion 54 and the touch panel inputting portion 56 and supports the user to set a region of interest or set a tag to a picked up image.

The voice recognition portion 54 acquires voice of the user during panoramic image pickup from a microphone built in the portable terminal 200, converts the voice into a text by a voice recognition process and supplies the text to the tag setting portion 48. The tag setting portion 48 sets the text as a tag to the region of interest. A tag may be set to the region of interest while the voice is kept as it is without conversion into a text. The degree of interest may be set in response to the magnitude of the sound volume. If a region of interest is not set, then the entire picked up image or an object in the proximity of the center of the picked up image is treated as a region of interest, and a tag is set to the region of interest. Consequently, the user can add tag information such as a name to the subject in which the user is interested during panoramic image pickup.

The touch panel inputting portion 56 receives information for designating a region of interest of a picked up image from the user on a touch panel provided on the display 240 and supplies the information for designating the region of interest to the region-of-interest setting portion 44.

Figure 25:
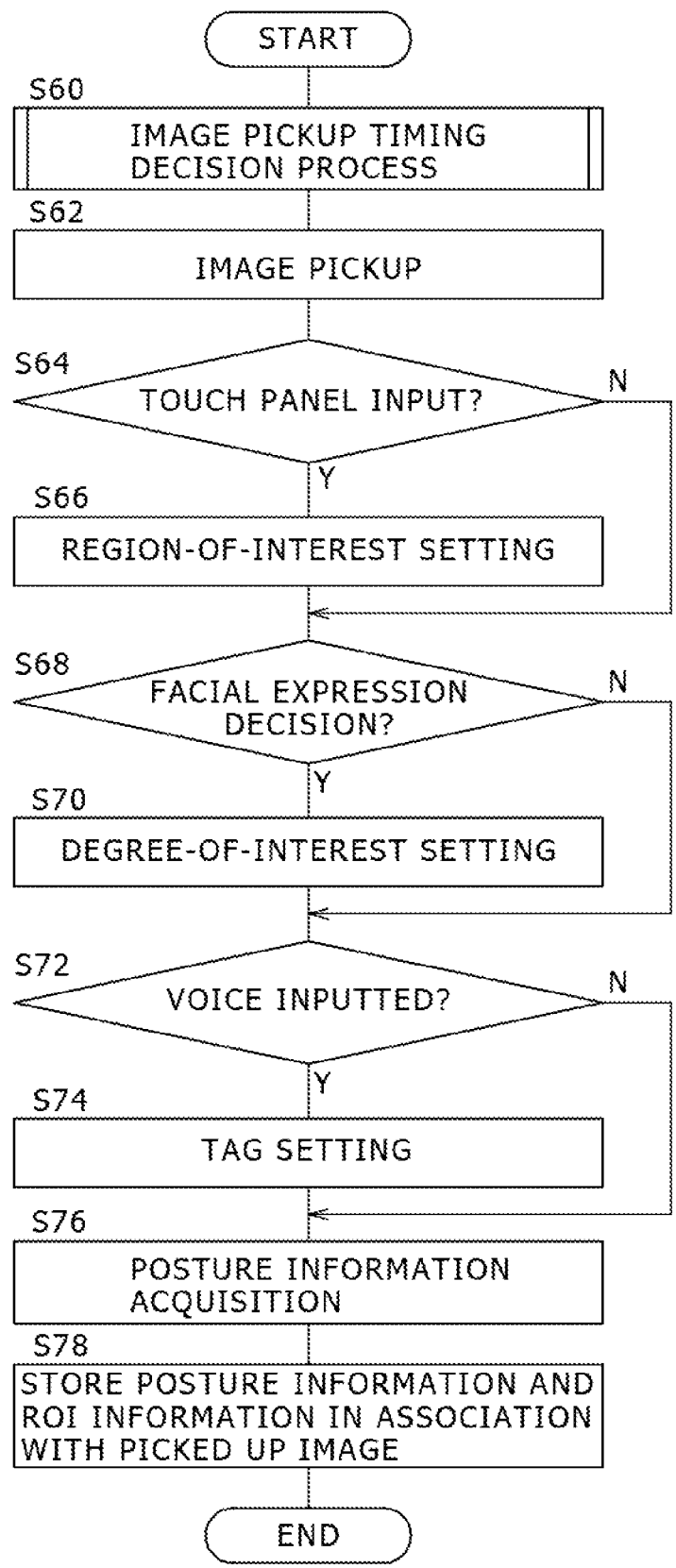
FIG. 25 is a flow chart illustrating a procedure of image pickup of a panoramic image according to the further different embodiment.

FIG. 25 is a flow chart illustrating a procedure of image pickup of a panoramic image by the panoramic image generation apparatus 100 according to the embodiment 3.

The image pickup timing decision unit 14 executes an image pickup timing decision process (S60). The image pickup unit 10 picks up an image at the image pickup timing designated by the image pickup timing decision unit 14 or at an image timing designated by the user and supplies the picked up image to the frame memory 12 (S62). The processes at steps S60 and S62 are same as the processes at steps S10 and S12, respectively, by the panoramic image generation apparatus 100 in the embodiment 1 depicted in FIG. 10.

The touch panel inputting portion 56 detects whether or not there is an input which designates a region of interest from the user to the touch panel of the display 240 on which the picked up image is displayed (S64). If there is a touch panel input which designates a region of interest (Y at S64), then the region-of-interest setting portion 44 sets a region of interest to the picked up image (S66). If there is no touch panel input which designates a region of interest (N at S64), then the processing advances to step S68.

The facial expression decision portion 92 decides the facial expression of the camera operation caught in the picked up image of the front side camera 210 (S68). If the facial expression is an affirmative one like a smiling face (Y at S68), then the degree-of-interest setting portion 46 sets a degree of interest to the region of interest in response to the affirmative degree of the facial expression (S70). If a region of interest is not set as yet, then the facial expression decision portion 92 sets, as a region of interest, for example, an object located at the center of the picked up image or an object which occupies a greater area than any other object in the image pickup image, and then sets a degree of interest to the region of interest. If the facial expression is not an affirmative one like a smiling face (N at S68), the processing advances to step S72.

The voice recognition portion 54 decides whether or not there is a voice input from the user during image pickup (S72). If there is a voice input (Y at S72), then the voice recognition portion 54 converts the inputted voice into a text by a voice recognition process, and the tag setting portion 48 sets the text as a tag to the region of interest (S74). If no region of interest is set as yet, then the voice recognition portion 54 sets, for example, an object located at the center of the picked up image or an object which occupies a greater area than any other object in the picked up image to the region of interest, and sets the tag to the region of interest. If there is no voice input (N at S72), then the processing advances to step S76.

The posture detection unit 60 acquires posture information of the portable terminal 200, namely, a tilt angle, a roll angle and a pan angle (S76). The component image generation unit 20 stores the posture information of the portable terminal 200 and the region-of-interest information set by the POI/ROI setting unit 42 in an associated relationship with the picked up image as a component image into the component image storage unit 22 (S78).

Figure 26:
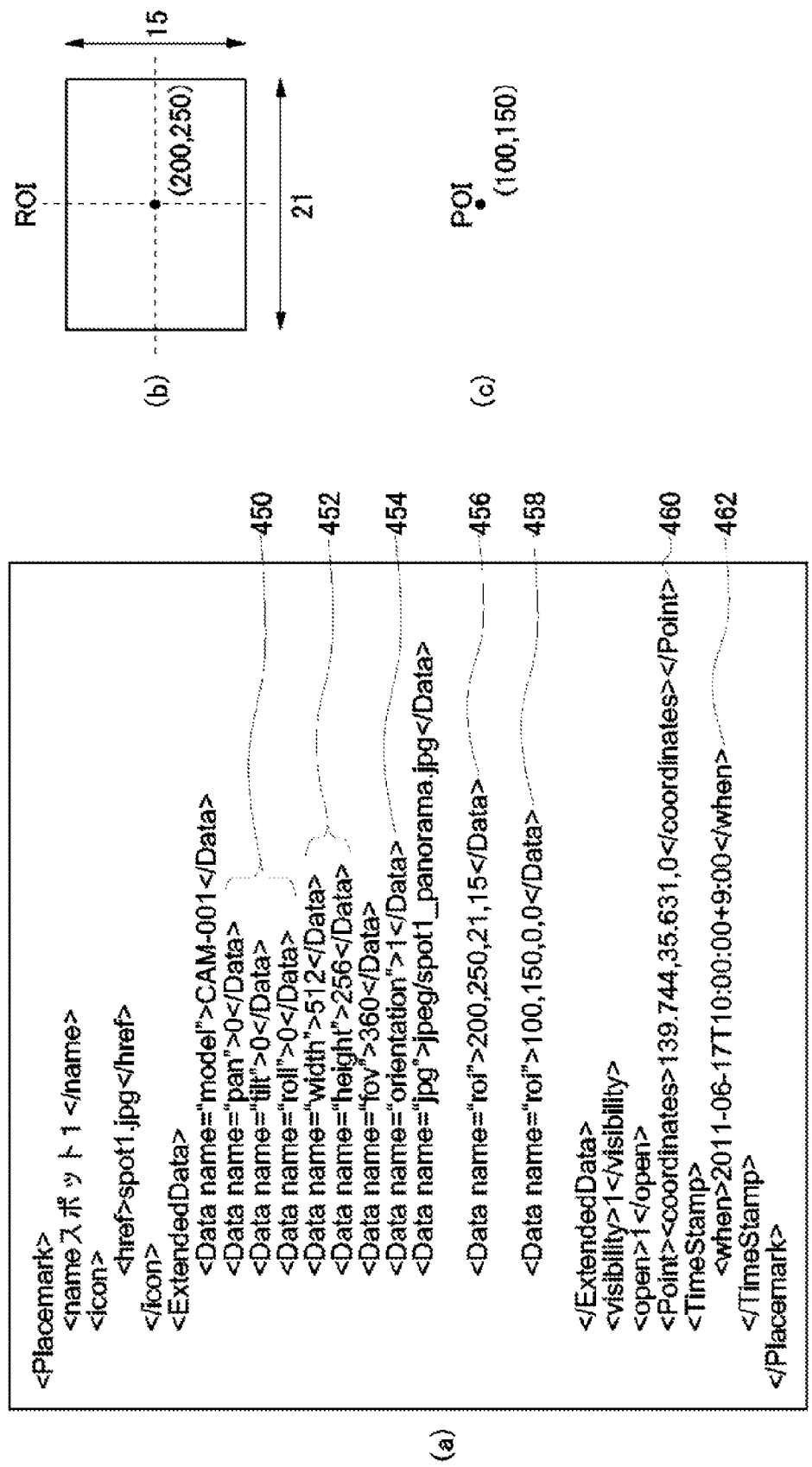
FIGS. 26(a) to 26(c) are views illustrating an example of a format of a picked up image to which an attention region is set.

FIGS. 26(*a*) to 26(*c*) are views illustrating an example of a format of a picked up image to which a region of interest is set.

The information of a point of interest or a region of interest of a rectangle is recorded into a geographical information tag data file called KML (Keyhole Markup Language) file depicted as an example in FIG. 26(a). Reference numeral 450 describes information of a pan angle, a tilt angle and a roll angle of a camera. Reference numeral 452 describes an image size. Reference numeral 454 describes whether the direction of the image is that of a landscape format or that of a portrait format.

Reference numeral 456 describes information for designating a rectangular region of interest and designates coordinates of the central point and an image size of the region of interest. Here, coordinates (200, 250) of the center of the region of interest and a width of 21 and a height of 15 of the image are designated. FIG. 26(b) depicts the region of interest described by the reference numeral 456.

When a point of interest is designated, coordinates of a point of interest are designated and the image size is designated as zero as indicated by reference numeral 458. Here, coordinates (100, 150) of a point of interest and a width of 0 and a height of 0 of the image are designated. FIG. 26(c) depicts a point of interest described by reference numeral 458.

Reference numeral 460 describes latitude and longitude information obtained from the GPS receiver 74. Reference numeral 462 describes image pickup date and time.

If the region of interest is not a rectangular region but a free region, then since the region of interest cannot be designated by coordinates, a mask image is set to an α plane or a layer for exclusive use to be overlapped with a panoramic image.

FIGS. 27(a) to 27(f) are views illustrating methods in which a user sets a region of interest on the touch panel.

Since, in panoramic image pickup, an image of a landscape over a wide range is picked up as depicted in FIG. 27(a), it is not easy to recognize from a synthesized panoramic image in which one of subjects the user is interested. Therefore, the user is caused to designate a region of interest on the touch panel in a picked up image displayed on the display 240 during panoramic image pickup depicted in FIG. 27(b).

FIG. 27(c) illustrates an example wherein an object in a picked up image on the touch panel is set as a region of interest by tapping or double-tapping (reference numeral 430) the object. At this time, a region including the object is automatically extracted from within the picked up image and set as a region of interest.

FIG. 27(d) illustrates an example wherein an object is surrounded as denoted by reference numeral 432 to designate a region of interest. A polygon 434 proximate to a free curve denoted by reference numeral 432 is set as a region of interest or a rectangular region 436 circumscribing the polygon 434 is set as a region of interest.

FIG. 27(e) illustrates an example wherein a region of interest is set by placing an oblique line into an object as denoted by reference numeral 438. A rectangular region 440 having a diagonal line as the oblique line is set as a region of interest.

FIG. 27(f) illustrates an example wherein a region of interest is set by pinching an object with two fingers as denoted by reference symbols 442a and 442b. A rectangular region 444 having a diagonal line coincident with a line segment interconnecting start points of the pinch of the two fingers is set as a region of interest.

Figure 28:
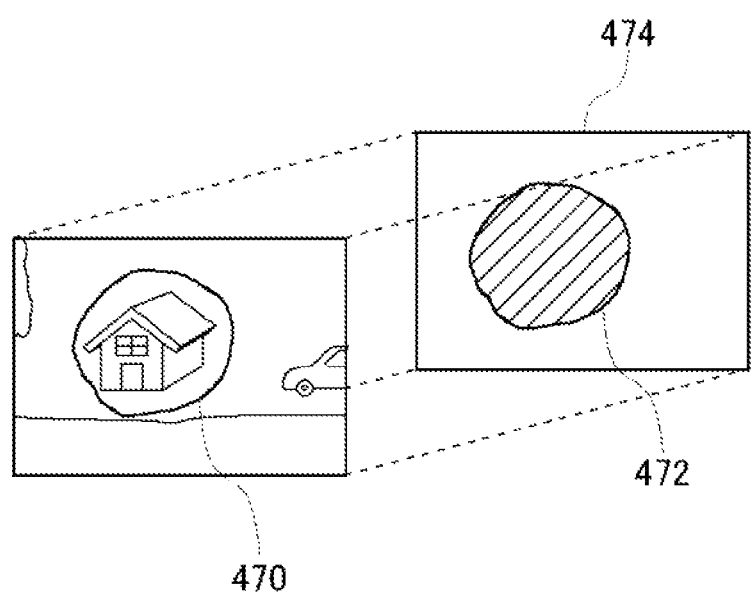
FIG. 28 is a view illustrating an attention region set to an α plane or a layer for exclusive use to be overlapped with a panoramic image.

FIG. 28 is a view illustrating a region of interest set to an α plane or a layer for exclusive use to be overlapped with a panoramic image. When a region of interest is designated by a free curve denoted by reference numeral 470 on a picked up image, the region of interest is set as a mask region 472 on the α plane or the layer for exclusive use denoted by reference numeral 474. A degree of interest can be recorded with binary values such that it is 1 in a masked region and it is 0 in a non-masked region. Further, in the case of the α plane, also it is possible to record a degree of interest in multiple values depending upon the α value of the masked region.

With the panoramic image generation apparatus of the present embodiment, a region of interest can be set during panoramic image pickup. Different from ordinary image pickup wherein a subject of interest is focused to release the shutter, in panoramic image pickup, an image of subjects over a wide range is picked up, and therefore, it is frequently unknown in which one of subjects the user is interested to carry out image pickup. In this regard, in the present embodiment, since a region of interest is designated during panoramic image pickup, a region in which the user is interested in a synthesized panoramic image can be grasped. Further, the labor for setting a region of interest in a panoramic image after synthesis can be omitted. Further, although, in the case of a panoramic image after synthesis, a region in which the user wants to be interested cannot be displayed without scrolling on the screen image, during image pickup, it is possible to designate a region of interest simply on the picked up image at present. Further, it is possible to automatically set an object in which the user is interested in response to the facial expression of the user during image pickup as a region of interest and associate the degree of interest or tag information by voice with the region of interest.

Embodiment 4

Figure 29:
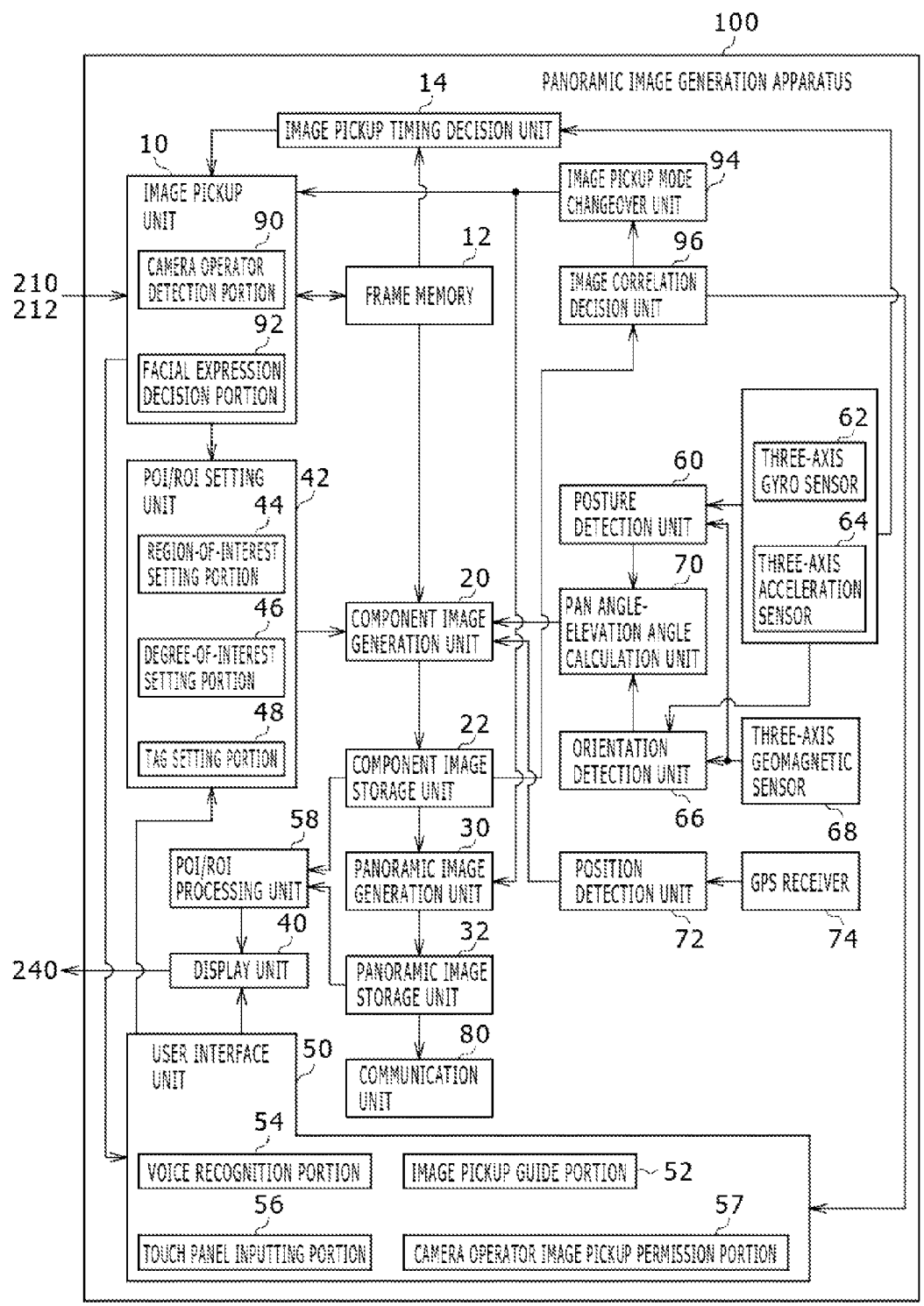
FIG. 29 is a functional block diagram of a panoramic image generation apparatus according to a still further different embodiment.

FIG. 29 is a functional block diagram of a panoramic image generation apparatus 100 according to an embodiment 4. The panoramic image generation apparatus 100 of the present embodiment has a function of picking up a panoramic image using both of a front side camera 210 and a rear side camera 212 of a portable terminal 200. Those components which are common to those of the panoramic image generation apparatus 100 having the region-of-interest setting function of the embodiment 3 described hereinabove with reference to FIG. 24 are denoted by like reference numerals and overlapping description of them is omitted herein.

In the present embodiment, as the mode for panoramic image pickup, the following three modes are available.

(1) A "double-sided panoramic image pickup mode" in which a panoramic image of one half circumference picked up by the front side camera 210 and another panoramic image of one half circumference picked up by the rear side camera 212 are connected to each other to pick up a panoramic image of the whole circumference.

(2) A "panoramic image pickup mode with POI/ROI" in which a panoramic image is picked up by the rear side camera 212 while the front side camera 210 is used to pick up an image of the face of the camera operator to set a point of interest or a region of interest.

(3) A "single-sided panoramic image pickup mode" in which a panoramic image of the whole circumference is picked up by each of the front side camera 210 and the rear side camera 212. In this instance, two whole circumference panoramic images are obtained. However, after the image pickup, the user would determine whether the whole circumference panoramic image picked up by one of the cameras, specifically by the front side camera 210 by which the camera operator is caught with a high degree of possibility, is to be discarded or the two whole circumference panoramic images are to be utilized as a stereo panoramic image or as panoramic images of a near view/distant view.

An image pickup mode changeover unit 94 carries out changeover to one of the above-mentioned panoramic image pickup modes. The user may manually set a panoramic image pickup mode on a setting screen image or the like such that the image pickup mode changeover unit 94 carries out changeover to the image pickup mode set by the user. Alternatively, the image pickup mode changeover unit 94 may automatically carry out changeover to an appropriate panoramic image pickup mode in response to an image pickup situation of a panoramic image.

Alternatively, changeover among the image pickup modes may be carried out in the following manner. In particular, at the point of time of starting of image pickup, a panoramic image is picked up by each of the front side camera 210 and the rear side camera 212 without distinguishing the double-sided panoramic image pickup mode of (1) and the single-sided panoramic image pickup mode of (3). Then, at a point of time at which image pickup for one half circumference is completed, in the case in which the consistency on the image boundary between the front side panoramic image of the one half circumference picked up by the front side camera 210 and the rear side panoramic image of the one half circumference picked up by the rear side camera 212 is good, the image pickup mode is determined to the double-sided panoramic image pickup mode of (1), but in the case in which the consistency is not good, the image pickup mode is determined to the single-sided panoramic image pickup mode of (3). The case in which the consistency is not good is a case in which the camera operator is caught unintentionally (without the object of setting a region of interest) in the front side panoramic image, another case in which a horizontal parallax between the front side camera 210 and the rear side camera 212 gives rise to a parallax between the front side panoramic image and the rear side panoramic image, or a like case.

The image pickup mode changeover unit 94 notifies the image pickup unit 10 and the panoramic image generation unit 30 of the panoramic image mode set as described above. The image pickup unit 10 picks up an image of a subject using the front side camera 210 and the rear side camera 212 in accordance with the designated panoramic image pickup mode. The panoramic image generation unit 30 combines the component images picked up by the image pickup unit 10 in accordance with the designated panoramic image pickup mode to generate a panoramic image.

When the image pickup mode is the double-sided panoramic image pickup mode, the panoramic image generation unit 30 connects the rear side panoramic image of the one half circumference obtained by combination of the rear side component images picked up by the rear side camera 212 and the front side panoramic image of the one half circumference on the opposite side different by 180 degrees which image is obtained by combination of the front side component images picked up by the front side camera 210 to each other to generate a whole circumference panoramic image.

When the image pickup mode is the single-sided panoramic image pickup mode, the panoramic image generation unit 30 discards the front side component images of the whole circumference picked up by the front side camera 210 and combines the rear side component images of the whole circumference picked up by the rear side camera 212 to generate a whole circumference panoramic image. Although this is because the camera operator is frequently caught unintentionally in the picked up images by the front side camera 210, depending upon an image pickup situation, the rear side component images picked up by the rear side camera 212 may be discarded while the front side component images picked up by the front side camera 210 are combined to generate a whole circumference panoramic image. Alternatively, the panoramic image generation unit 30 may synthesize, without discarding the component images picked up by one of the cameras, whole circumference panoramic images from the component images picked up by both cameras and use the whole circumference panoramic images as a stereo panoramic image or as panoramic images of a near view/distant view.

After the portable terminal 200 is panned over one half circumference to allow each of the front side camera 210 and the rear side camera 212 to pick up a panoramic image for one half circumference, when the front side panoramic image picked up by the front side camera 210 and the rear side panoramic image picked up by the rear side camera 212 are connected to each other to generate a panoramic image for the whole circumference, an image correlation decision unit 96 calculates a correlation between the front side panoramic image and the rear side panoramic image in a region in the proximity of the boundary of the connection and decides whether or not the two images have a fixed consistency therebetween.

If the front side panoramic image and the rear side panoramic image have a correlation equal to or higher than a predetermined threshold value, then the image correlation decision unit 96 notifies the image pickup mode changeover unit 94 and the image pickup guide portion 52 that the front side panoramic image and the rear side panoramic image have a consistency therebetween. However, if the front side panoramic image and the rear side panoramic image have a correlation lower than the predetermined threshold value, then the image correlation decision unit 96 notifies the image pickup mode changeover unit 94 and the image pickup guide portion 52 that the front side panoramic image and the rear side panoramic image have no consistency therebetween.

If the front side panoramic image and the rear side panoramic image have a consistency therebetween, then the image pickup mode changeover unit 94 sets the panoramic image pickup mode to the double-sided panoramic image pickup mode. However, if the front side panoramic image and the rear side panoramic image have no consistency therebetween, then the image pickup mode changeover unit 94 sets the panoramic image pickup mode to the single-sided panoramic image pickup mode.

If the front side panoramic image and the rear side panoramic image have a consistency therebetween, then the image pickup guide portion 52 of the user interface unit 50 notifies the user that panoramic image pickup is completed by the panning over the one half circumference of the portable terminal 200. Further, when the front side panoramic image and the rear side panoramic image have a consistency therebetween, the user is guided by a dialog or the like so that panning is carried out over another one half circumference to carry out whole circumference panoramic image pickup.

The camera operator detection portion 90 of the image pickup unit 10 detects whether or not the camera operator is caught in the images picked up by the front side camera 210 and notifies, if the camera operator is caught, a camera operator image pickup permission portion 57 of the user interface unit 50 of the fact. The camera operator image pickup permission portion 57 displays such a dialog as "Your face is caught. OK?" and allows the user to issue an instruction regarding whether or not the user permits image pickup of the face of the user itself by the front side camera 210. If the user permits image pickup of the face thereof, then the image pickup mode changeover unit 94 sets the panoramic image pickup mode to the panoramic image pickup mode with POI/ROI, and image pickup by the front side camera 210 is executed directly. If the user does not permit image pickup of the face thereof, then the images in which the camera operator is caught are discarded, and at a point of time at which the camera operator is not caught any more, image pickup by the front side camera 210 is resumed. The images in which the camera operator is caught by the front side camera 210 are used when the POI/ROI setting unit 42 sets a region of interest or sets a degree of interest as described hereinabove in the description of the embodiment 3.

FIGS. 30(*a*) to 30(*c*) are views illustrating disposition of and a parallax between the front side camera 210 and the rear side camera 212 of the portable terminal 200.

If the front side camera 210 and the rear side camera 212 are disposed at positions different in a horizontal direction from each other as depicted in FIG. 30(*a*), then both camera have a horizontal parallax (parallax) HP therebetween. If the front side camera 210 and the rear side camera 212 are disposed at positions different also in the vertical direction from each other, then both cameras have a vertical parallax VP therebetween. Here, for the convenience of description, it is assumed that the vertical parallax VP is zero or so small that it can be ignored while attention is paid to the horizontal parallax HP.

It is assumed that the front side camera 210 and the rear side camera 212 individually have a horizontal view angle of 75 degrees as depicted in FIG. 30(*b*). Since the front side camera 210 and the rear side camera 212 have the horizontal parallax HP therebetween, a displacement by the parallax occurs between a front side panoramic image picked up by the front side camera 210 and a rear side panoramic image picked up by the rear side camera 212. Specifically, when an image of a near view is picked up, the displacement by the parallax which appears between the front side panoramic image and the rear side panoramic image cannot be ignored.

However, when an image of a distant view is picked up, the displacement by the parallax which appears between a front side panoramic image picked up by the front side camera 210 and a rear side panoramic image picked up by the rear side camera 212 can be ignored. FIG. 30(*c*) depicts disposition of and an angle of view between the front side camera 210 and the rear side camera 212 when the displacement by the parallax can be ignored. When the displacement by the parallax can be ignored, the front side camera 210 and the rear side camera 212 can be treated such that they are disposed at the same position in a horizontal direction as depicted in FIG. 30(*c*). If it is assumed that the horizontal angle of view of both cameras is 75 degrees, then if, from a result of the calculation of 90 degrees-(75 degrees/2)=52.5 degrees, the portable terminal 200 is rotated by 52.5 degrees to the left and right as indicated by broken lines of FIG. 30(*c*), then the front side camera 210 can pick up a front side panoramic image for 180 degrees of one half circumference while the rear side camera 212 can pick up a planar panoramic image for 180 degrees of one half circumference. Thus, if the front side panoramic image of the one half circumference and the rear side panoramic image of the one half circumference are connected to each other, then a whole circumference panoramic image can be obtained. With such a rotational angle as 52.5 degrees, the user can carry out panoramic image pickup while watching the display 240 as a finder.

When an image of a near view is to be picked up, since the front side panoramic image by the front side camera 210 and the rear side panoramic image by the rear side camera 212 have a displacement by a parallax therebetween, even if the front side panoramic image of one half circumference and the rear side panoramic image of the other half circumference are connected to each other, a sufficient consistency cannot be obtained and an accurate whole circumference panoramic image may not be able to be generated. Therefore, when an image of a near view is to be picked up, rotation by a further one half circumference is carried out such that a whole circumference panoramic image is picked up by each of the front side camera 210 and the rear side camera 212. In this case, since two whole circumference panoramic images having a parallax therebetween are obtained, they may be used as a stereo panoramic image to display a three-dimensional panoramic image. Further, since depth information is obtained, also it is possible to generate a three-dimensional mode of a subject.

In the case of near view image pickup, the image pickup guide portion 52 may urge the user to carry out whole circumference image pickup so that each of the front side camera 210 and the rear side camera 212 can pick up a whole circumference panoramic image. However, in the case of distant view image pickup, the image pickup guide portion 52 may notify the user that, at a point of time at which each of the front side camera 210 and the rear side camera 212 picks up a panoramic image for one half circumference, whole circumference panoramic image pickup is completed. The user may designate whether an image of a near view is to be picked up or an image of a distant view is to be picked up. For example, the image pickup may be automatically set such that, when the camera is set to wide angle side image pickup, it is set to near view image pickup, but when the camera is set to telephoto side image pickup, it is set to distant view image pickup.

Figure 31:
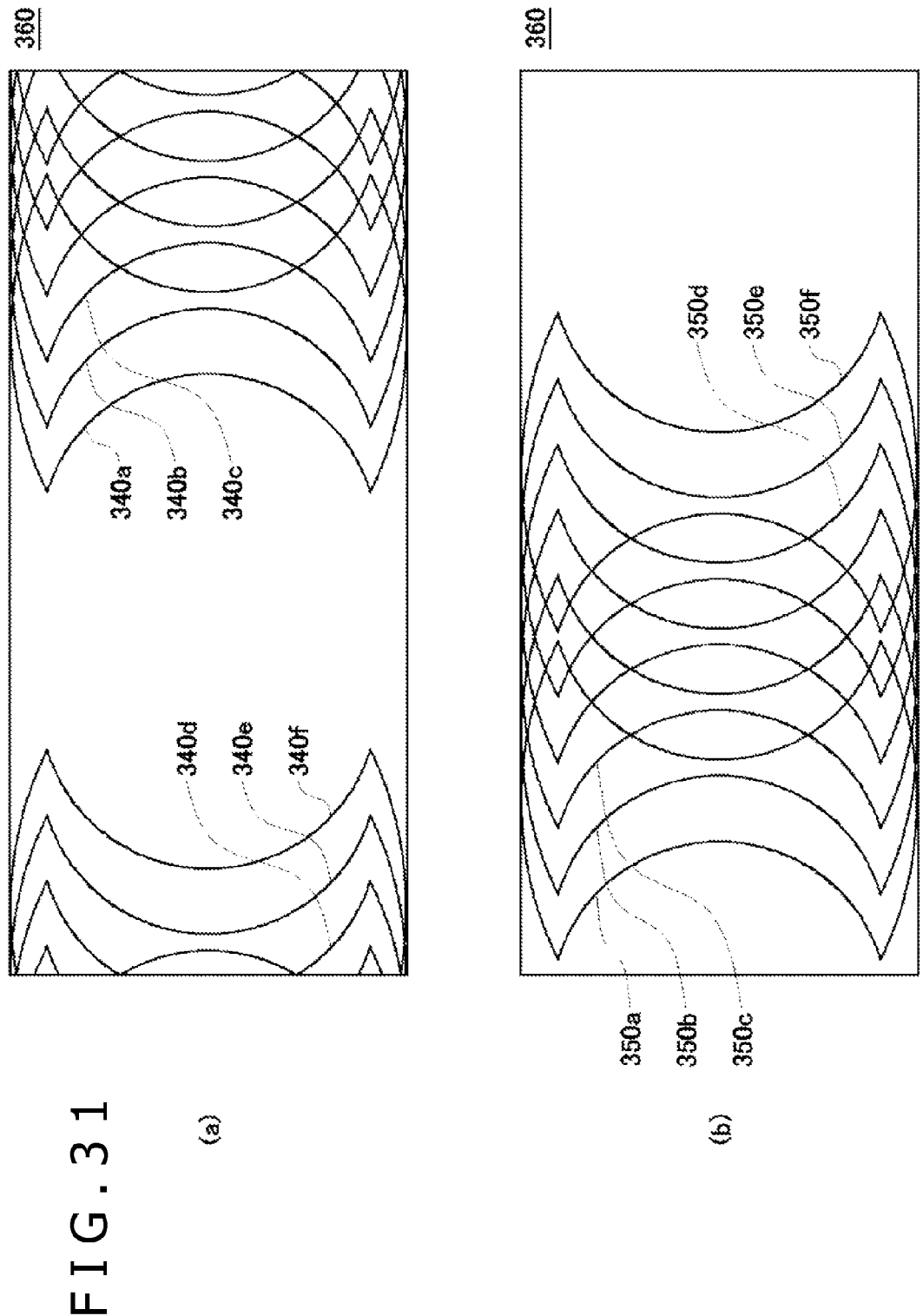
FIG. 31(a) is a view illustrating cylindrical images picked up by the rear side camera and FIG. 31(b) is a view illustrating cylindrical images picked up by the front side camera.
Figure 32:
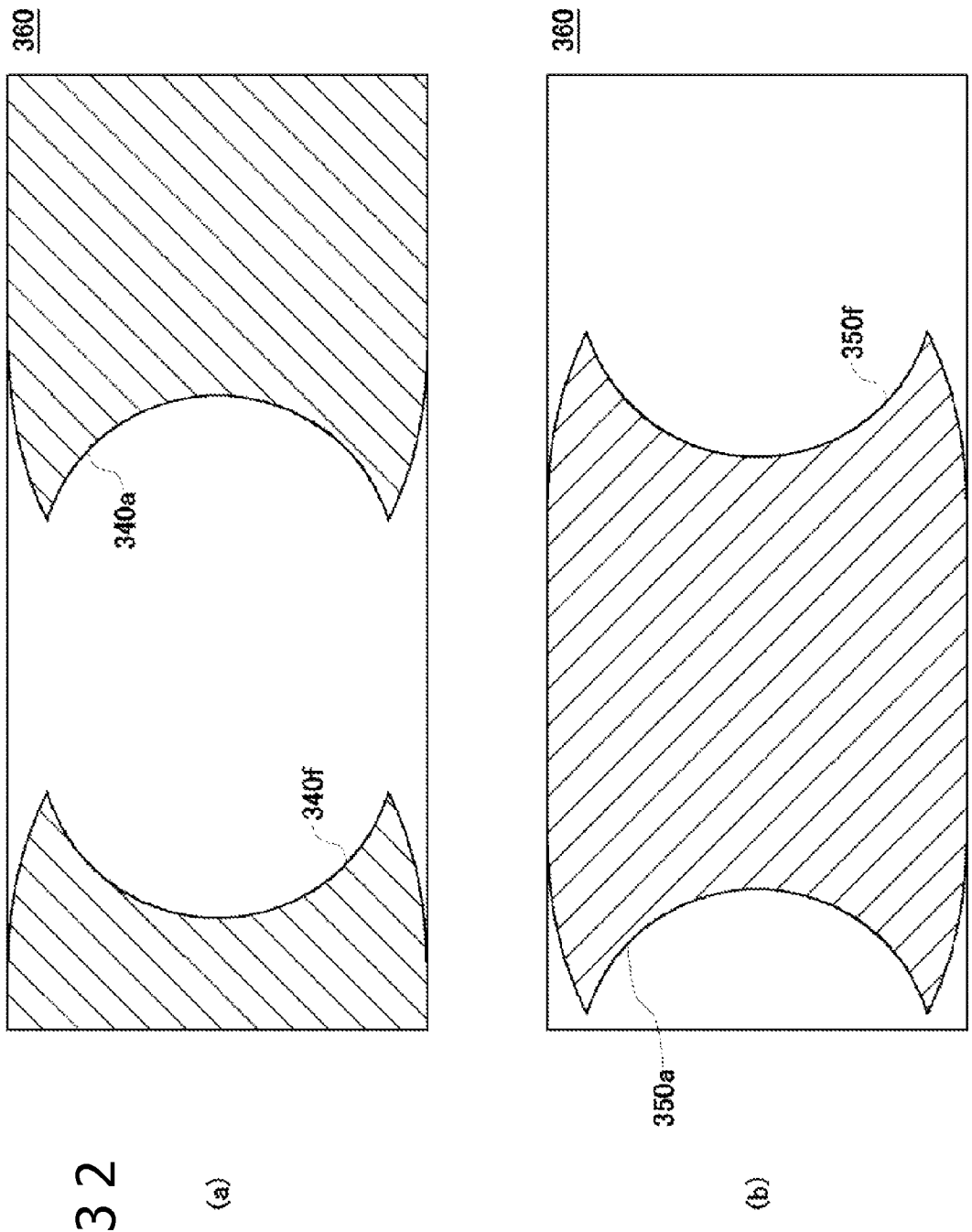
FIG. 32(a) is a view illustrating a rear side panoramic image picked up by the rear side camera and FIG. 32(b) is a view illustrating a front side panoramic image picked up by the front side camera.

FIG. 31(*a*) is a view illustrating cylindrical images 340*a* to 340*f* picked up by the rear side camera 212. Although they are similar to the images described hereinabove in connection with FIG. 8B, it is assumed here that, if the images 340*a* to 340*f* are combined, then a rear side panoramic image for one half circumference is obtained as depicted in FIG. 32(*a*). FIG. 31(*b*) is a view illustrating cylindrical images 350*a* to 350*f* picked up by the front side camera 210. If the images 350*a* to 350*f* are combined, then a front side panoramic image for one half circumference is obtained as depicted in FIG. 32(*b*).

Figure 33:
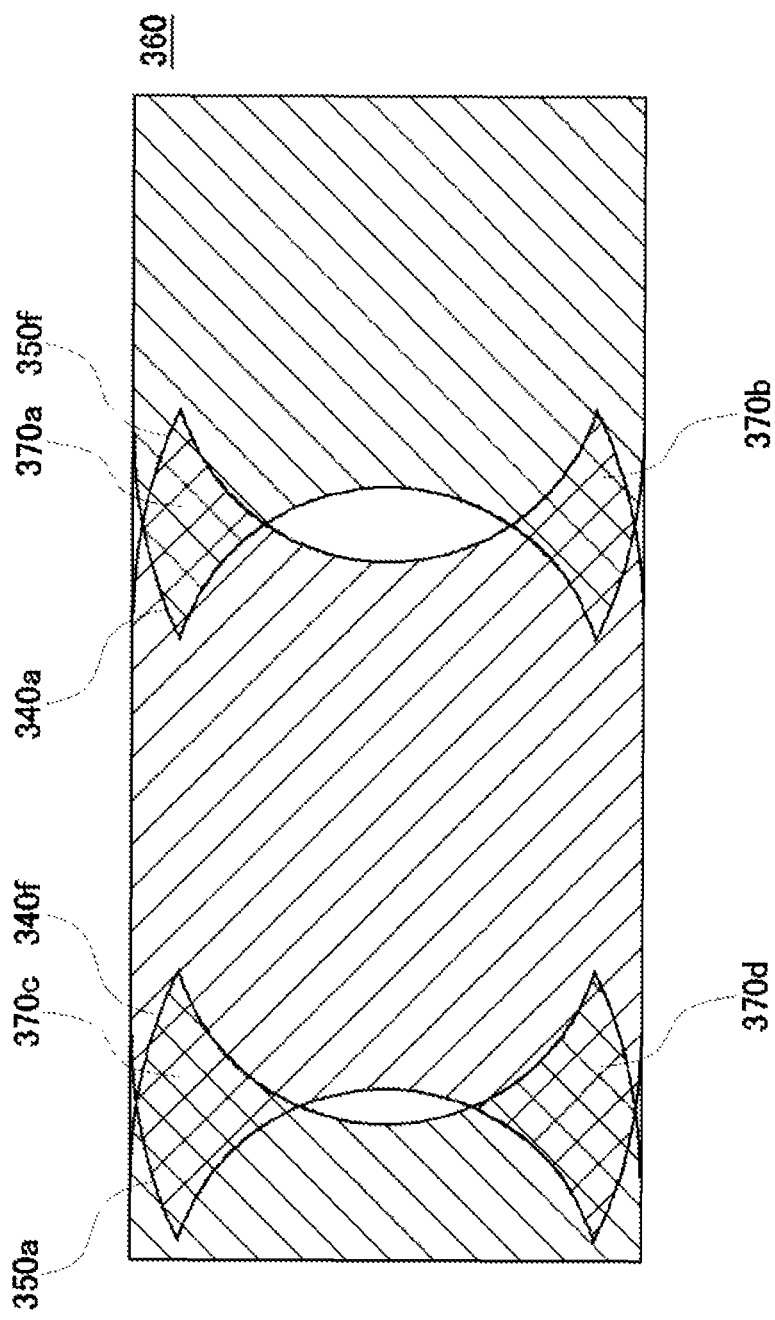
FIG. 33 is a view illustrating a state in which a rear side panoramic image picked up by the rear side camera and a front side panoramic image picked up by the front side camera are connected to each other.

FIG. 32(*a*) is a view illustrating a rear side panoramic image picked up by the rear side camera 212. FIG. 32(*b*) is a view illustrating a front side panoramic image picked up by the front side camera 210. FIG. 33 is a view illustrating a state in which the rear side panoramic image picked up by the rear side camera 212 and the front side panoramic image picked up by the front side camera 210 are connected to each other. In regions 370*a* to 370*d* in the proximity of boundaries of the connection at which the rear side panoramic image and the front side panoramic image overlap with each other, the image correlation decision unit 96 calculates a correlation between the rear side panoramic image and the front side panoramic image. When the correlation is high, namely, when the number of pixels having pixel values coincide with or near to each other is great, in a region in which the two images overlap with each other, the image correlation decision unit 96 decides that the two images have a fixed consistency. However, when the two images are low in correlation, namely, when the number of pixels having pixel values coincident with or near to each other is small, in the overlapping regions thereof, the image correlation decision unit 96 decides that the two images have no consistency therebetween.

Figure 34:
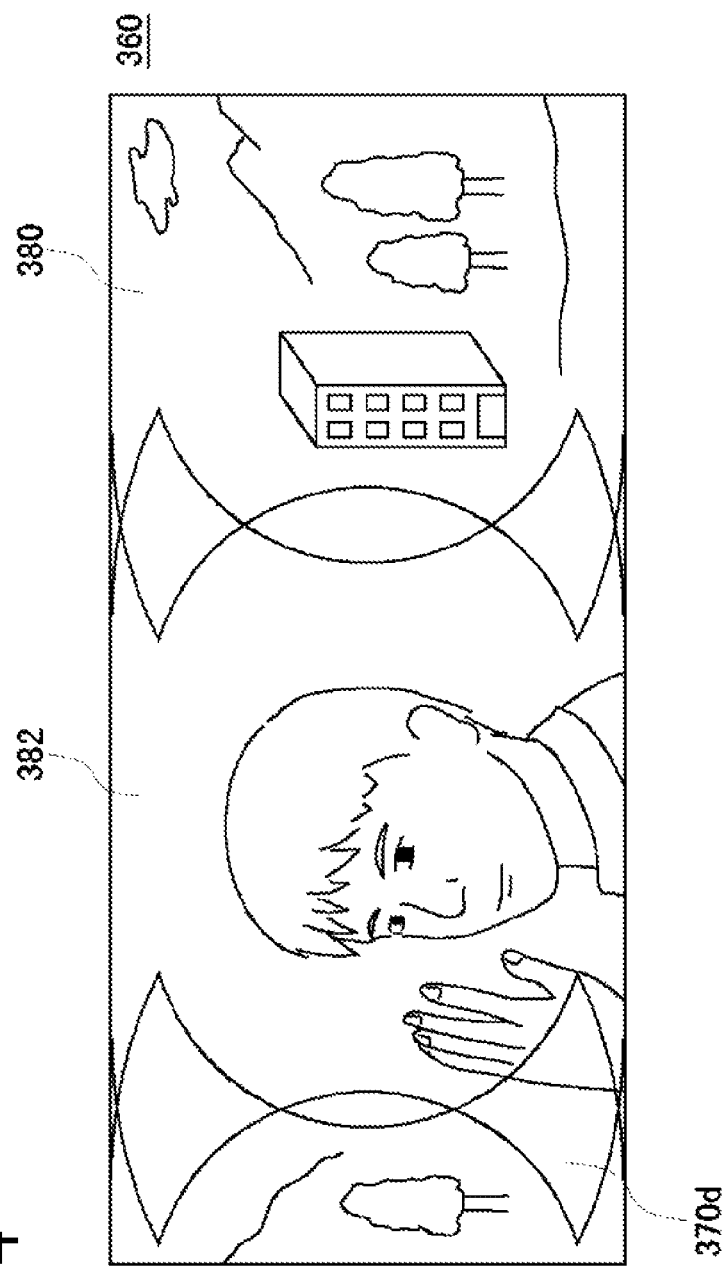
FIG. 34 is a view illustrating an example of a front side panoramic image picked up by the front side camera and a rear side panoramic image picked up by the rear side camera.

FIG. 34 is a view illustrating an example of a front side panoramic image 382 picked up by the front side camera 210 and a rear side panoramic image 380 picked up by the rear side camera 212. The camera operator is caught large in the front side panoramic image 382, and in a region 370*d* in the proximity of a boundary along which the front side panoramic image 382 and the rear side panoramic image 380 are connected to each other, a hand of the camera operator is caught. Therefore, the correlation between the two images is low. In this case, the image correlation decision unit 96 decides that the consistency between the front side panoramic image 382 and the rear side panoramic image 380 is low. Consequently, the image pickup mode changeover unit 94 changes over the panoramic image pickup mode to the single-sided panoramic image pickup mode in which panoramic image pickup is carried out only by the rear side camera 212, and the image pickup guide portion 52 guides the user so as to further pan the camera over one half circumference to pick up a rear side panoramic image of the whole circumference.

Figure 35:
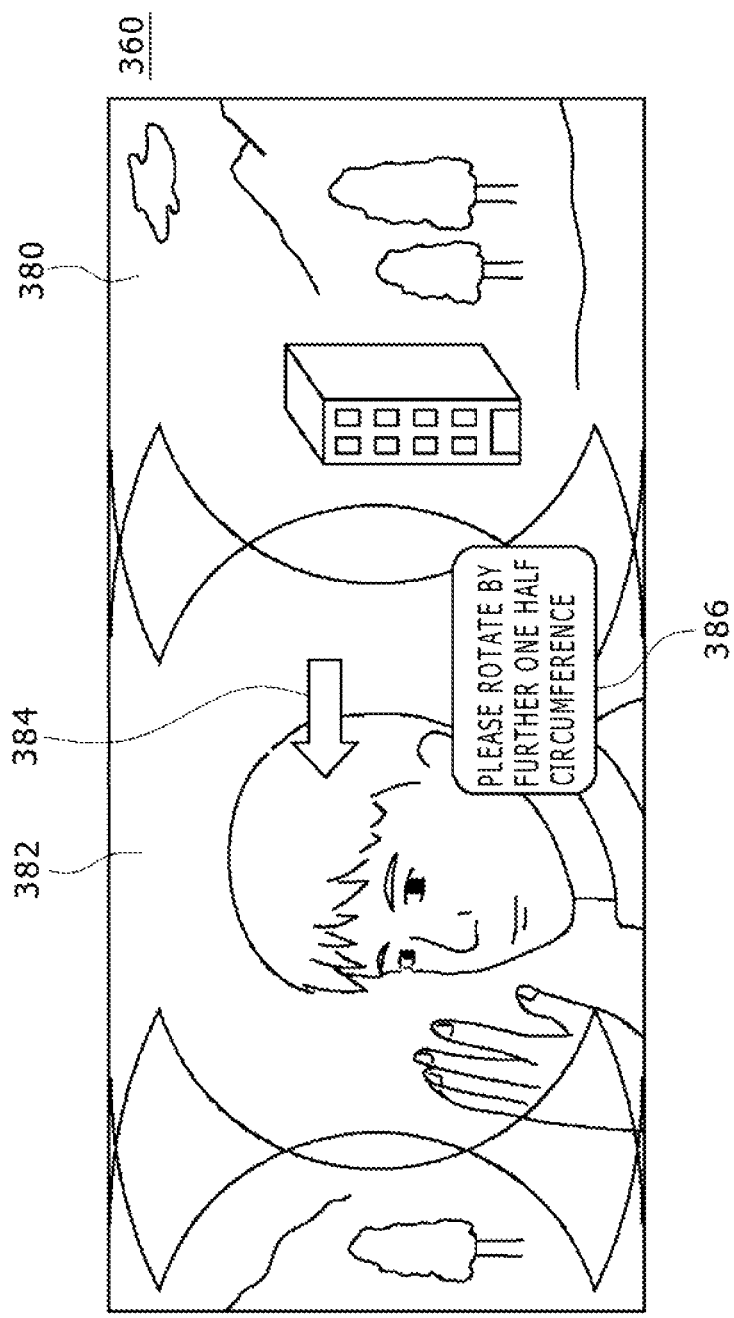
FIG. 35 is a view illustrating an example of a guide when the consistency between a front side panoramic image and a rear side panoramic image is low.

FIG. 35 is a view illustrating an example of a guide where the consistency between the front side panoramic image 382 and the rear side panoramic image 380 is low. If the image correlation decision unit 96 decides at a point of time at which the front side panoramic image 382 and the rear side panoramic image 380 are each picked up over one half circumference that the front side panoramic image 382 and the rear side panoramic image 380 do not have a fixed consistency therebetween, then the image pickup guide portion 52 causes the screen to display a dialog 386 "Please rotate over further one half circumference" and indicates the image pickup direction by an arrow mark 384. Consequently, when the user picks up the rear side panoramic image 380 for one half circumference, the user does not stop the image pickup but can pan the rear side camera 212 for further one half circumference thereby to pick up a rear side panoramic image for the whole periphery.

Figure 36:
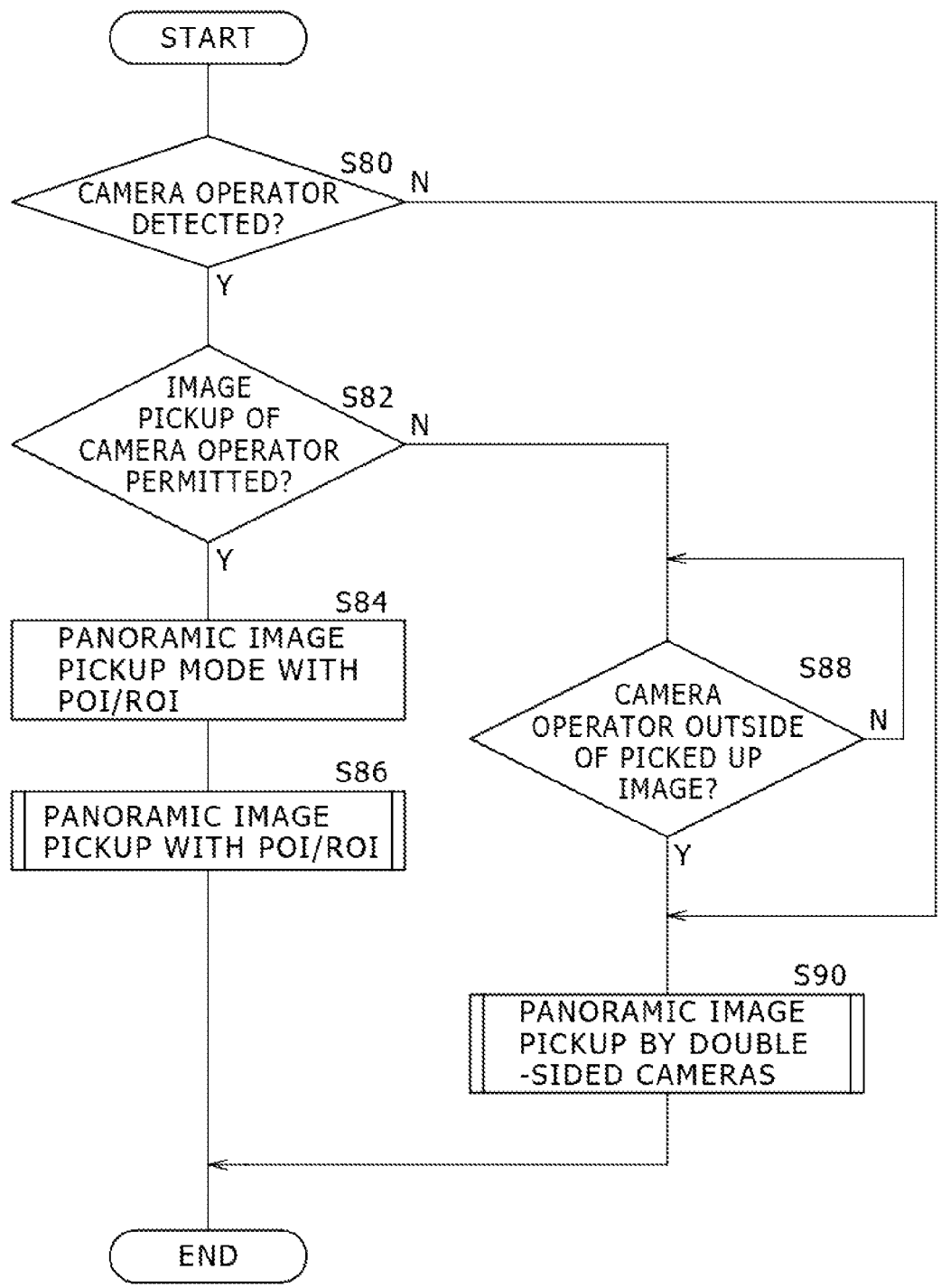
FIG. 36 is a flow chart illustrating a procedure of image pickup of a panoramic image according to a yet further different embodiment.

FIG. 36 is a flow chart illustrating a procedure of image pickup of a panoramic image by the panoramic image generation apparatus 100 according to the embodiment 4.

The camera operator detection portion 90 detects whether or not the camera operator itself is caught in an image picked up by the front side camera 210 (S80). If the camera operator is caught (Y at S80), then the camera operator image pickup permission portion 57 asks the user about whether or not an image of the user itself should be picked up by displaying a dialog or by outputting sound (S82). If the user permits image pickup of the user itself (Y at S82), then the image pickup mode changeover unit 94 sets the panoramic image pickup mode to the panoramic image pickup mode with POI/ROI (S84) and then carries out panoramic image pickup with POI/ROI (S86). The panoramic image pickup process with POI/ROI at step S86 is similar to the image pickup procedure of a panoramic image of the embodiment 3 described hereinabove with reference to FIG. 25. In particular, an image of the facial expression of the user is picked up by the front side camera 210, and a region of interest and a degree of interest are set based on the facial expression. Further, panoramic image pickup is carried out by the rear side camera 212 to generate a panoramic image with POI/ROI.

If the user does not permit image pickup of the user itself at step S82 (N at step S82), then the panoramic image pickup is interrupted while the camera operator remains caught in a picked up image by the front side camera 210 (N at S88). After it is waited that the camera operator is not caught any more (Y at S88), a panoramic image pickup process by the double-sided cameras is carried out (S90).

Also when the camera operator is not detected in an image picked up by the front side camera 210 at step S80 (N at step S80), a panoramic image pickup process by the double-sided cameras is started (S90).

Figure 37:
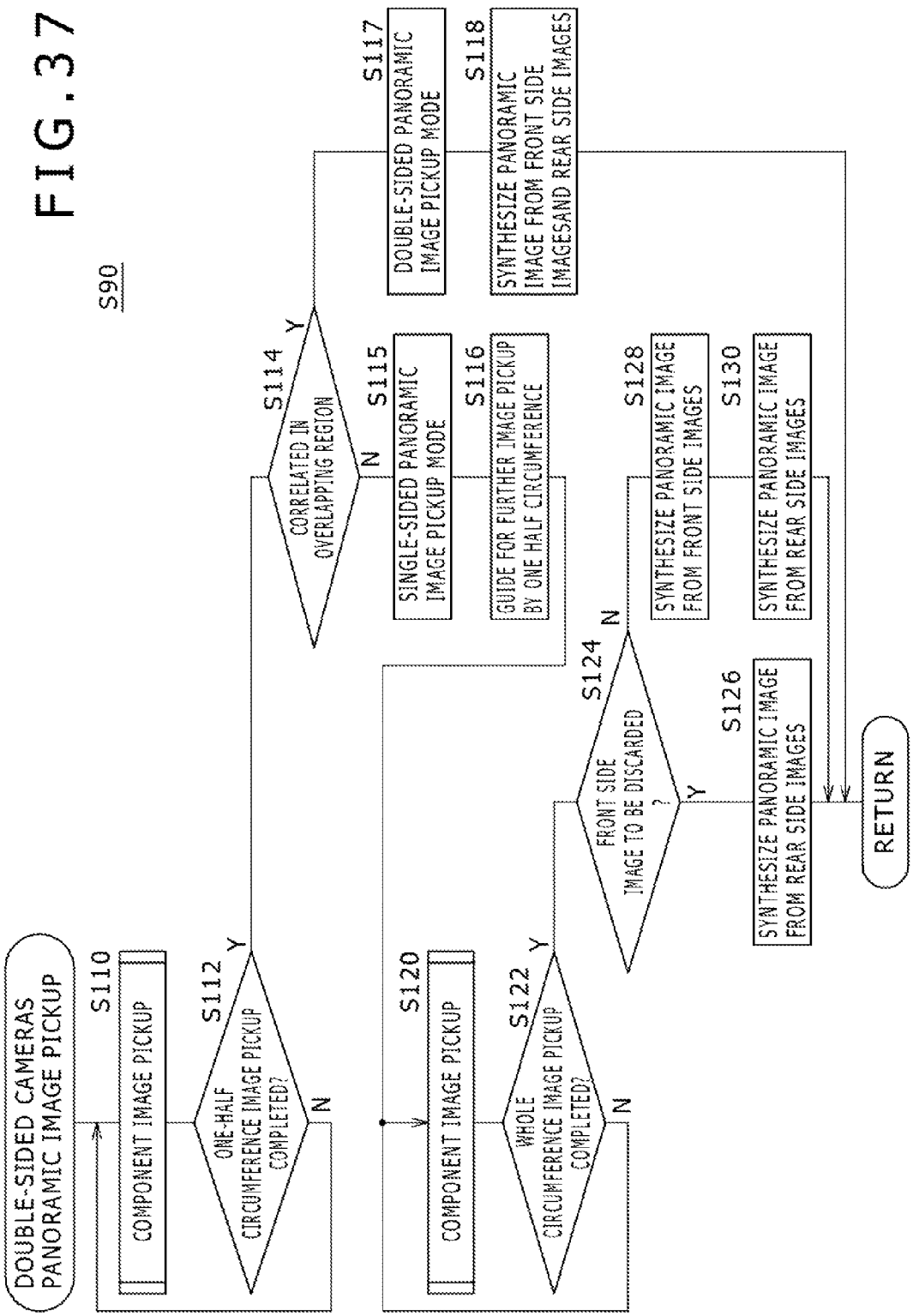
FIG. 37 is a flow chart illustrating a detailed procedure of a panoramic image pickup process by double-sided cameras of FIG. 36.

FIG. 37 is a flow chart illustrating a detailed procedure of the panoramic image pickup process by the double-sided cameras at step S90 of FIG. 36.

In the panoramic image pickup process by the double-sided cameras, at a point of time of starting of image pickup, whether the panoramic image pickup mode is the double-sided panoramic image pickup mode or the single-sided panoramic image pickup mode is not determined except a case in which a panoramic image pickup mode is set manually. To which one of the double-sided panoramic image pickup mode and the single-sided panoramic image pickup mode the panoramic image pickup mode is to be determined is not known until panoramic image pickup for one half circumference is completed and the consistency is decided between the front side panoramic image for one half circumference and the rear side panoramic image for one half circumference.

A component image pickup process (S110) executes the image pickup timing decision process (S10), image pickup (S12), posture information acquisition process (S14) and process for associating posture information with a picked up image (S16) of the embodiment 1 described hereinabove with reference to FIG. 10.

If the panoramic image pickup for one half circumference by the front side camera 210 and the rear side camera 212 is not completed (N at S112), then the processing returns to step S110 to repeat the component image pickup process.

If the panoramic image pickup for one half circumference by the front side camera 210 and the rear side camera 212 is completed (Y at S112), then the image correlation decision unit 96 decides a degree of correlation between the front side component image for one half circumference picked up by the front side camera 210 and the rear side component image for one half circumference picked up by the rear side camera 212 in an overlapping region in the proximity of a boundary along which the two images are connected to each other (S114). If the degree of correlation of the overlapping region is equal to or higher than a predetermined threshold value (Y at S114), then the image pickup mode changeover unit 94 sets the panoramic image pickup mode to the double-sided panoramic image pickup mode (S117) and the panoramic image generation unit 30 combines front side component images for one half circumference and rear side component images for one half circumference to generate a whole circumference panoramic image (S118). If the degree of correlation of the overlapping region is lower than the predetermined threshold value (N at S114), then the image pickup mode changeover unit 94 sets the panoramic image pickup mode to the single-sided panoramic image pickup mode (S115) and the image pickup guide portion 52 guides the user so as to further carry out image pickup for one half circumference (S116). Thereafter, the processing advances to a component image pickup process at step S120.

The component image pickup process at step S120 is same as the component image pickup process at step S110. If the panoramic image pickup for the whole circumference by the front side camera 210 and the rear side camera 212 is not completed (N at S122), then the processing returns to step S110 to repeat the component image pickup process.

If the panoramic image pickup for the whole circumference by the front side camera 210 and the rear side camera 212 is completed (Y at S122), then an inquiry about whether or not the front side component images for the whole circumference are to be discarded is issued to the user (S124). For example, if the user is caught in the front side component images, then the front side component images are discarded. When the front side component images for the whole circumference are to be discarded (Y at S124), the panoramic image generation unit 30 synthesizes a whole circumference panoramic image from the rear side component images for the whole circumference (S126).

If the front side component images for the whole circumference are not to be discarded (N at S124), then the panoramic image generation unit 30 synthesizes a whole circumference front side panoramic image from the front side component images for the whole circumference (S128) and synthesizes a whole circumference rear side panoramic image from the rear side component images for the whole circumference (S130). In this case, the whole circumference front side panoramic image and the whole circumference rear side panoramic image are used to obtain a stereo panoramic image. Further, the whole circumference front side panoramic image may be utilized as a panoramic image of a near view while the whole circumference rear side panoramic image is utilized as a panoramic image of a distant view. Alternatively, if the zoom ratios of the front side camera 210 and the rear side camera 212 are made different from each other, then also it is possible to obtain two panoramic images of different zoom ratios.

With the panoramic image generation apparatus of the present embodiment, panoramic image pickup can be carried out using both of the front side camera 210 and the rear side camera 212 of the portable terminal 200. Where the mounting positions of the two cameras are displaced from each other, a parallax appears between panoramic images picked up by the cameras, and therefore, a stereo panoramic image can be acquired. Also it is possible to pick up a near view panoramic image by the front side camera 210 and pick up a distant view panoramic image by the rear side camera 212.

Further, if the double-sided cameras are utilized, then even if the portable terminal 200 is not rotated over 360 degrees, a panoramic image for the whole circumference can be picked up only by rotating the portable terminal 200 by 90 degrees−θ/2 with respect to the horizontal angle θ of view of the camera. Therefore, it is facilitated to carry out whole circumference panoramic image pickup simply while the display of the portable terminal 200 is viewed as a finder.

While, in the example described above, panoramic image pickup where the front side camera 210 and the rear side camera 212 are incorporated in the portable terminal 200 is described, three or more cameras may be incorporated in the portable terminal 200. Further, the positions of the optical axes of a plurality of cameras may be different in the horizontal or vertical direction, and the directions of the optical axes of the plural cameras may be different from each other. The difference between the directions of the optical axes is not limited to that between the opposite directions different by 180 degrees from each other. In the following, variations of the cameras built in the portable terminal 200 are exemplified.

Figure 38:
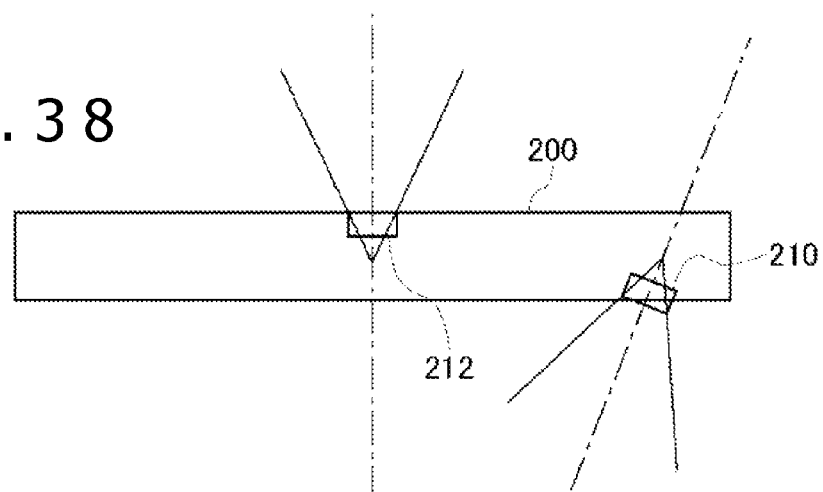
FIG. 38 is a view illustrating a portable terminal in which two cameras having optical axes which are different in the position and the direction from each other are incorporated.

FIG. 38 is a view illustrating a portable terminal 200 in which two cameras having optical axes whose positions and directions are different from each other are incorporated. While, in FIG. 30(*b*), the positions of the optical axes of the front side camera 210 and the rear side camera 212 are different from each other in the horizontal direction, the front side camera 210 and the rear side camera 212 in FIG. 38 are different not only in the position of the optical axis but also in the direction of the optical axis, and the front side camera 210 is directed obliquely.

Figure 39:
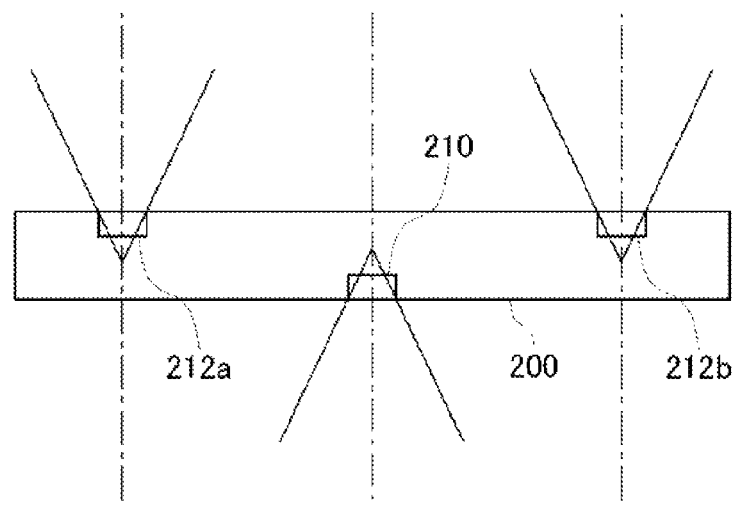
FIG. 39 is a view illustrating a portable terminal in which three cameras having optical axes which are different in the position from each other are incorporated.

FIG. 39 is a view illustrating a portable terminal 200 in which three cameras having optical axes whose positions are different from one another are incorporated. Two rear side cameras 212*a* and 212*b* and one front side camera 210 are incorporated in the portable terminal 200. The positions of the optical axes of the three cameras 212*a*, 212*b* and 210 are different from one another. A stereo panoramic image can be picked up by the two rear side cameras 212*a* and 212*b*.

Figure 40:
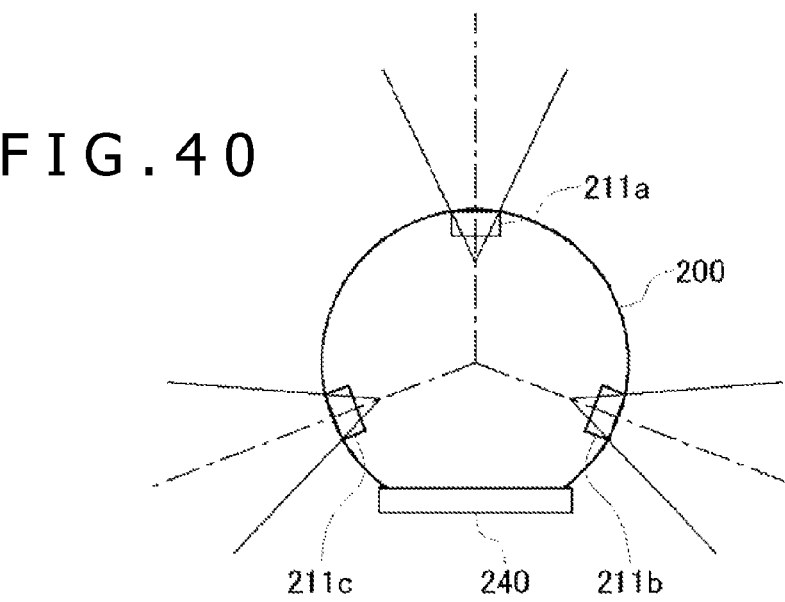
FIG. 40 is a view illustrating a portable terminal in which three cameras having optical axes which are different in the direction from each other are incorporated.

FIG. 40 is a view illustrating a portable terminal 200 in which three cameras having optical axes whose orientations are different from one another are incorporated. The portable terminal 200 has such a shape as, for example, a cylindrical shape, and has a display 240 on the front face thereof. When the portable terminal 200 is viewed from above, the three cameras 211*a*, 211*b* and 211*c* are disposed substantially uniformly on a circle. The orientations of the optical axes of the three cameras 211*a*, 211*b* and 211*c* are different from one another. A panoramic image of the whole circumference can be picked up by rotating the portable terminal 200.

Figure 41:
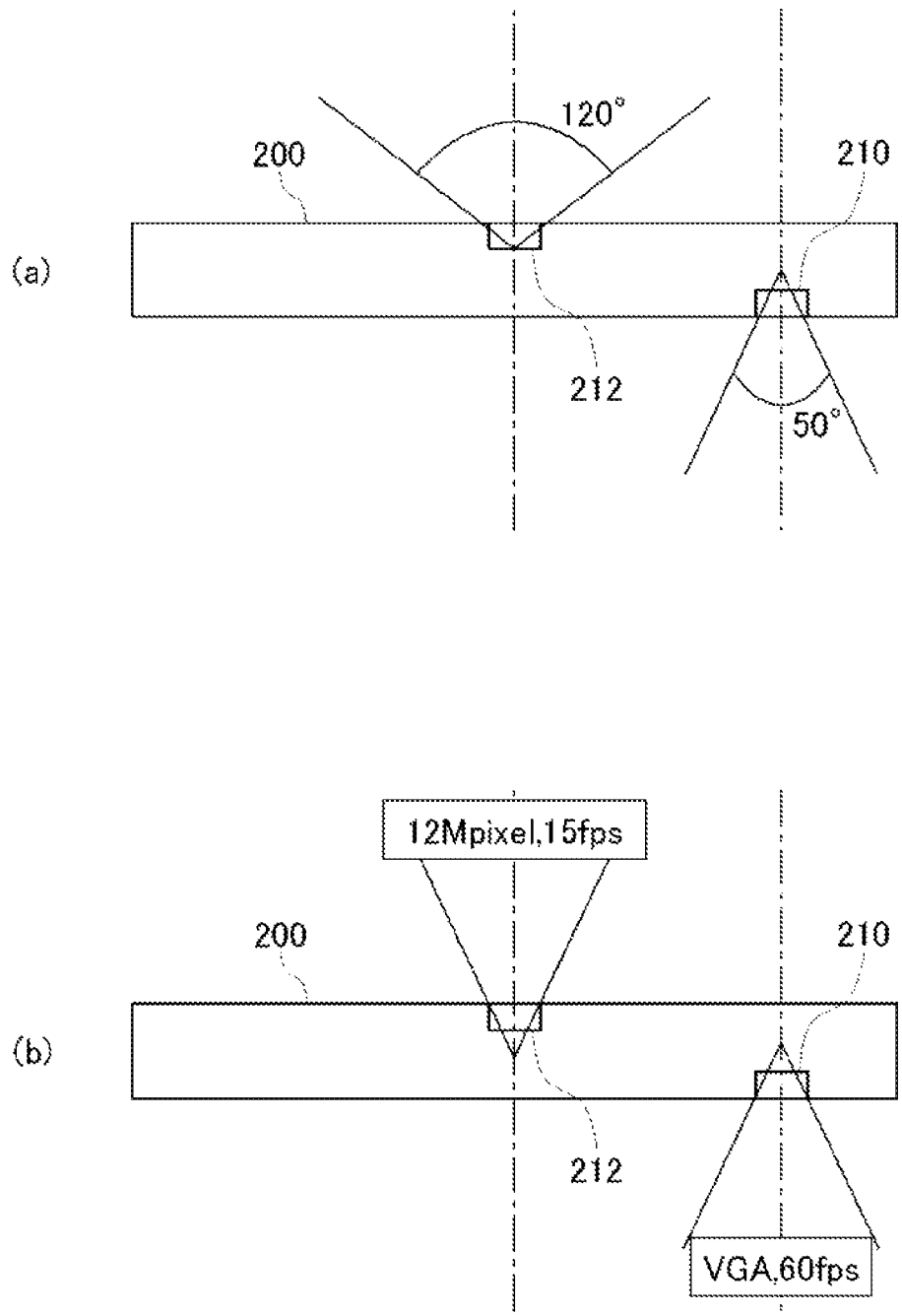
FIGS. 41(a) and 41(b) are views illustrating a portable terminal in which two cameras having natures different from each other are incorporated.

FIGS. 41(*a*) and 41(*b*) are views illustrating portable terminals 200 in which two cameras having different performances from each other are incorporated. In FIG. 41(*a*), while the horizontal angle of view of the front side camera 210 is 50 degrees, the horizontal angle of view of the rear side camera 212 is 120 degrees. In this manner, a plurality of cameras having different angles of view from each other may be incorporated in the portable terminal 200.

In FIG. 41(*b*), while the front side camera 210 has a resolution of VGA and a frame rate of 60 fps (frames per second), the rear side camera 212 has a resolution of 12 mega pixels and a frame rate of 15 fps. While the front side camera 210 has a low resolution, it has a high frame rate and is advantageous in image pickup of a moving body. While the rear side camera 212 has a high resolution, it has a low frame rate and is unsuitable for image pickup of a moving body. However, the rear side camera 212 is advantageous in image pickup of a stationary body. In this manner, a plurality of cameras which are different in performance such as a resolution or a frame rate may be incorporated in the portable terminal 200.

Figure 42:
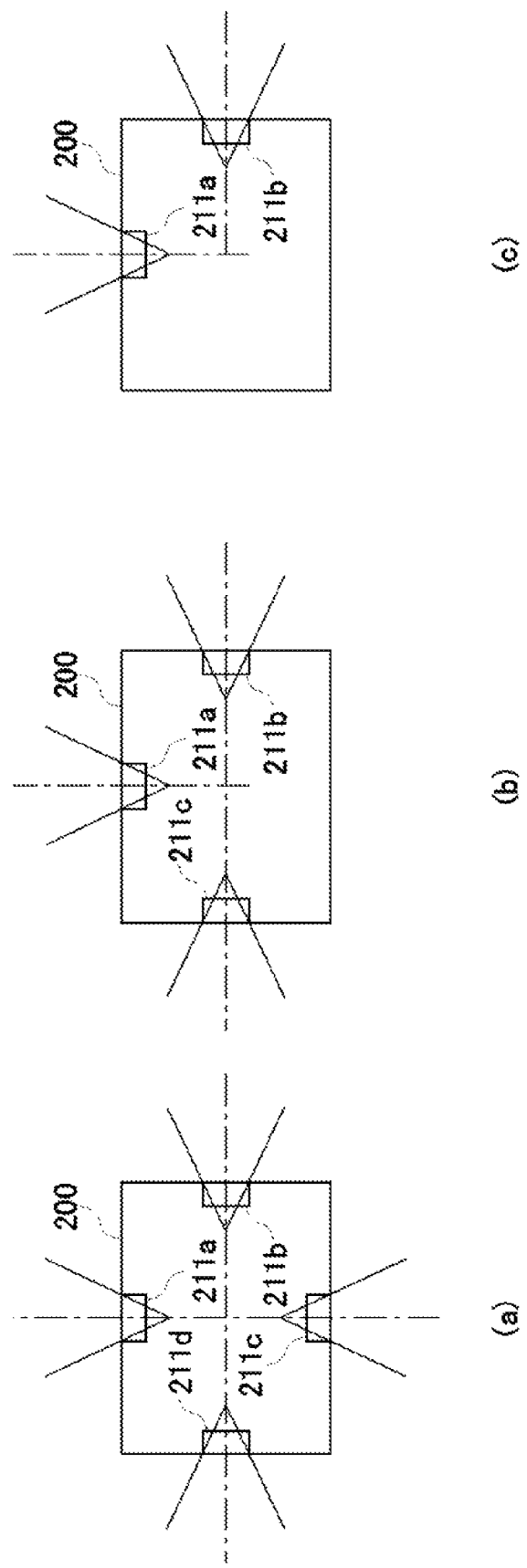
FIGS. 42(a) to 42(c) are views illustrating variations of the number of and the direction of cameras incorporated in a portable terminal.

FIGS. 42(*a*) to 42(*c*) are views illustrating variations of the number and the orientation of cameras mounted on the portable terminal 200. FIG. 42(*a*) depicts an example wherein a camera 211*c* is mounted on a front face, another camera 211*a* on a rear face, a further camera 211*d* on a left side face and a still further camera 211*b* on a right side face of the portable terminal 200. FIG. 42(*b*) depicts an example wherein a camera 211*a* is mounted on a rear face, another camera 211*c* on a left side face and a further camera 211*b* on a right side face of the portable terminal 200. FIG. 42(*c*) depicts an example wherein a camera 211*a* is mounted on a rear face and another camera 211*b* is mounted on a right side face of the portable terminal 200. While the description here is given of examples of the portable terminal 200, the cameras may be vehicle-carried cameras. Especially, in the case of vehicle-carried cameras, the orientations of the cameras can be set to the leftward and rightward orientations in addition to the forward and rearward orientations.

Figure 43:
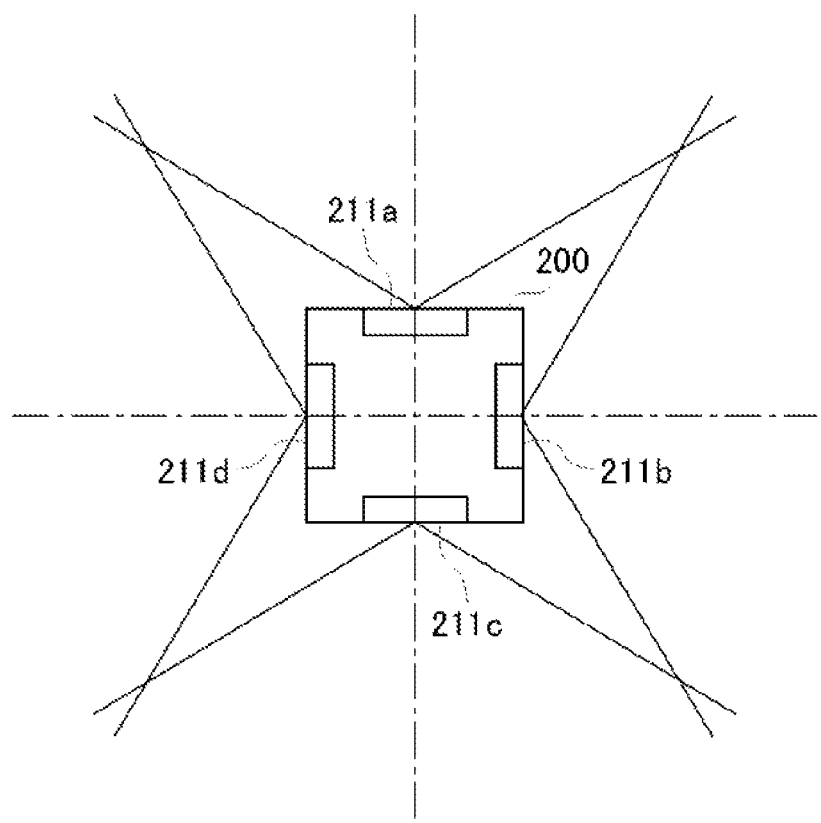
FIG. 43 is a view illustrating a portable terminal in which four cameras are incorporated.

FIG. 43 is a view illustrating a portable terminal 200 in which four cameras are incorporated. A camera 211*c* is mounted on a front face, another camera 211*a* on a rear face, a further camera 211*d* on a left side face and a still further camera 211b on a right side face of the portable terminal 200. Since the cameras have a sufficiently large horizontal angle of view, even if the portable terminal 200 is not rotated in a panning direction, an omnidirectional panoramic image can be picked up by the four cameras 211a to 211d. However, where omnidirectional image pickup cannot be carried out in a tilting direction, a panoramic image for the celestial sphere can be picked up by rotating the portable terminal 200 in the tilting direction.

Figure 44:
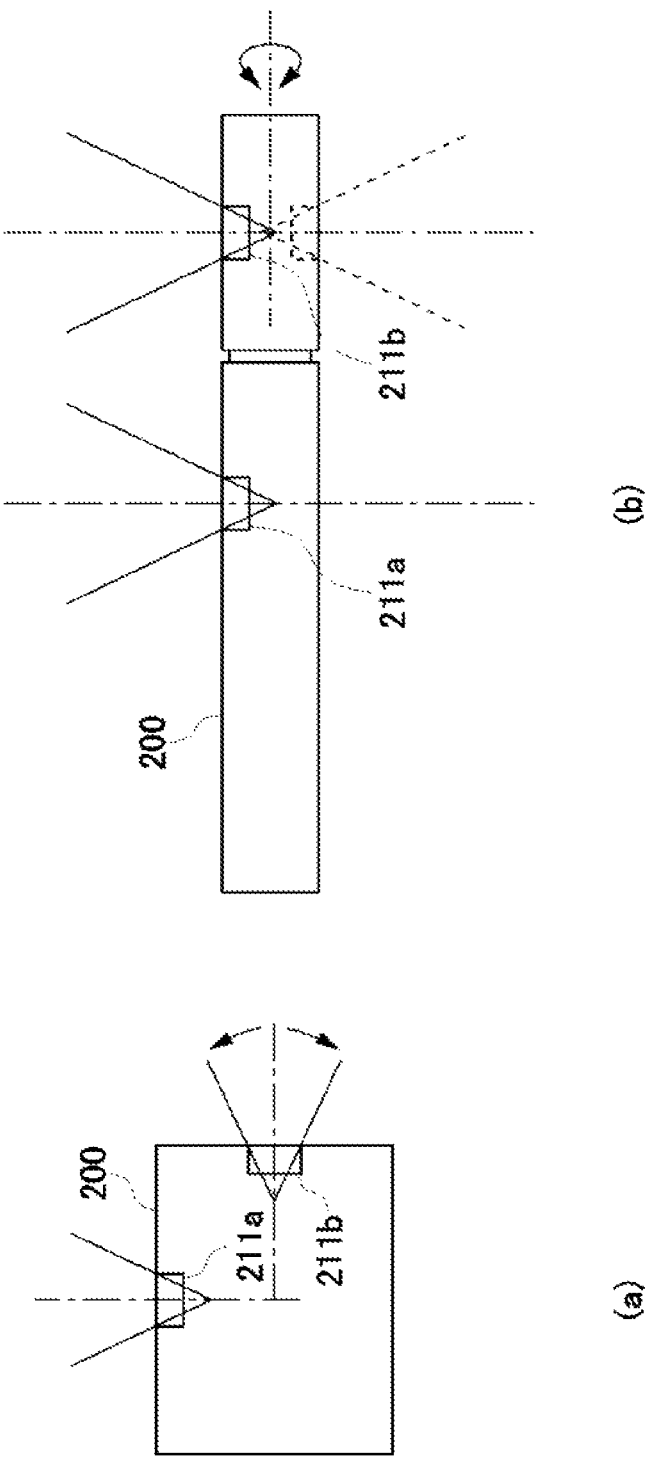
FIGS. 44(a) and 44(b) are views illustrating a portable terminal in which a movable camera whose direction can be adjusted is incorporated.

FIGS. 44(a) and 44(b) are views illustrating portable terminals 200 in which movable cameras whose orientation can be adjusted are incorporated. In FIG. 44(a), while a camera 211a mounted on a rear face of the portable terminal 200 is a fixed camera, another camera 211b mounted on a right side face of the portable terminal 200 is a movable camera and has an orientation which can be adjusted manually or automatically. In FIG. 44(b), while a first camera 211a mounted on a rear face of the portable terminal 200 is a fixed camera, a second camera 211b is a movable camera whose orientation can be reversed forwardly and rearwardly. Therefore, if the orientation of the camera 211b is reversed, then the camera 211b can serve as a rear side camera and also as a front side camera. The orientation of the movable camera can be detected automatically by the portable terminal 200.

The variations of the camera incorporated in the portable terminal 200 described above are absolutely illustrative, and various other combinations of cameras may be available.

By incorporating a plurality of cameras which are different at least in one of the position and the orientation of the optical axis therebetween or thereamong in this manner, images picked up using the cameras are combined to synthesize an omnidirectional panoramic image.

The image pickup mode changeover unit 94 changes over the panoramic image pickup mode between a compound eye panoramic image pickup mode in which one "compound eye panoramic image" formed by connecting panoramic images picked by the plural cameras incorporated in the portable terminal 200 is picked up and a single eye panoramic image pickup mode in which a "single eye panoramic image" is picked up by each of the plural cameras.

When the panoramic image pickup mode is the compound eye panoramic image pickup mode, the panoramic image generation unit 30 combines a plurality of component images picked up by the cameras to generate a single eye panoramic image, and then connects the single eye panoramic images by the cameras to each other to generate a compound eye panoramic image. In the case of the single eye panoramic image pickup mode, the panoramic image generation unit 30 combines a plurality of component images picked up by each camera to generate a single eye panoramic image and then combines the single eye panoramic images by the cameras to generate and output a stereo panoramic image or a plurality of panoramic images which are different from each other in the sense of distance such as those of a near view and a distant view.

The image correlation decision unit 96 decides, in a boundary region in which single eye panoramic images by the cameras are connected to each other, a correlation degree between the single eye panoramic images to be connected to each other. When the correlation degree is equal to or higher than a predetermined threshold value, the panoramic image generation unit 30 connects the single eye panoramic images by the cameras to each other to generate a compound eye panoramic image. Although the plural cameras incorporated in the portable terminal 200 cannot carry out omnidirectional panoramic image pickup where they remain at the individually fixed positions, if they are rotated in a pan direction or a tilt direction, then the fields of view in which image pickup of the cameras can be carried out come to overlap with each other. By evaluating the correlation between the single eye panoramic images to be connected to each other in the overlapping regions, it can be decided whether the single eye panoramic images by the cameras may be connected to each other by a stitching process, whether the single eye panoramic images by the cameras should be outputted as separate images from each other or whether the images by one of the cameras should be discarded.

The present invention has been described above in connection with the embodiments thereof. The embodiments are exemplary, and it is to be recognized by those skilled in the art that various modifications are possible to the combinations of the components and/or the processes of the embodiments and that also such modifications are included in the scope of the present invention.

While the embodiments have been described taking a celestial sphere panoramic image as an example of a panoramic image, the panoramic image need not be a celestial sphere panoramic image but may be an image formed by combining a plurality of images picked up by a camera while the image pickup direction is successively changed.

It is to be noted that the "panoramic image" in the present specification is not limited to a "panoramic image in a narrow sense, namely, an image of a landscape format or a portrait format, a full view image over 360 degrees and the like, but merely is an image whose target is a wide range. Further, while, in the description of the embodiments, an example wherein a panoramic image is generated as a synthesis image, the synthesis image to be outputted need not be a so-called panoramic image, but the present invention can be applied also where the synthesis image is an ordinary image of an arbitrary size. Alternatively, the synthetic image to be outputted may be an image wherein a plurality of images having different resolutions from each other are hierarchized. Such a hierarchized image may be configured such that, if some region of the image is expanded, then the expanded region is replaced by an image of a higher resolution.

REFERENCE SIGNS LIST

10 Image pickup unit, 12 Frame memory, 14 Image pickup timing decision unit, 20 Component image generation unit, 22 Component image storage unit, 24 Non-image pickup region decision unit, 30 Panoramic image generation unit, 32 Panoramic image storage unit, 40 Display unit, 42 POI/ROI setting unit, 44 Region-of-interest setting portion 44, 46 Degree-of-interest setting portion 46, 48 Tag setting portion 48, 50 User interface unit, 52 Image pickup guide portion, 54 Voice recognition portion, 56 Touch panel inputting portion, 57 Camera operator image pickup permission portion 57, 58 POI/ROI processing unit, 60 Posture detection unit, 62 Three-axis gyro sensor, 64 Three-axis acceleration sensor, 66 Orientation detection unit, 68 Three-axis geomagnetic sensor, 70 Pan angle-elevation angle calculation unit, 72 Position detection unit, 74 GPS receiver, 80 Communication unit, 82 Characteristic point extraction unit, 84 Self-position estimation unit, 86 Camera position displacement decision unit, 90 Camera operator detection portion, 92 Facial expression decision portion, 94 Image pickup mode changeover unit, 96 Image correlation decision unit, 100 Panoramic image generation apparatus, 200 Portable terminal, 210 Front side camera, 212 Rear side camera, 240 Display unit.

INDUSTRIAL APPLICABILITY

The present invention can be utilized for a technology for generating a synthesis image.

The invention claimed is:
1. An image generation apparatus, comprising:
a characteristic point extraction circuit configured to extract a plurality of characteristic points in an overlapping region of a plurality of component images, the plurality component images obtained by capturing a plurality of respective sequential images using a camera built in portable equipment, where each of the plurality of component images have a different pan angle or elevation angle relating to the respective sequential image, and a respective posture information being a three-axis inclination of the portable equipment relating to the respective sequential image;
a self-position estimation circuit configured to estimate, for each of two sequential component images in which camera positions are displaced from one another, a plurality of respective three-dimensional coordinate values of the respective characteristic points in the overlapping region and respective three-dimensional coordinate value of the camera position;
a component image generation circuit configured to associate, for each of the two sequential component images, the posture information, the plurality of respective three-dimensional coordinate values of the respective characteristic points and the three-dimensional coordinate values of the camera positions;
a synthesis image generation circuit configured to adjust, based on the estimated three-dimensional coordinate values of the camera positions, the plurality of respective three-dimensional coordinate values of the respective characteristic points of the component images to correct the component images and to combine the two component images to generate a panoramic image; and
an image pickup guide portion configured to display a locus of movement of the camera position based on the respective three-dimensional coordinate values of the camera position estimated by the self-position estimation circuit.

2. The image generation apparatus according to claim 1, further comprising
a camera position displacement decision circuit configured to decide whether or not the displacement of the camera position is within a permissible range based on the respective three-dimensional coordinate values of the camera position estimated by the self-position estimation circuit;
when the displacement of the camera position exceeds the permissible range, the image pickup guide portion instructing a user to correct the camera position.

3. The image generation apparatus according to claim 2, wherein the camera position displacement decision circuit sets a threshold value for deciding whether or not the displacement of the camera position is within the permissible range and sets the threshold value such that the threshold value has a higher value as a distance to a subject determined from the plurality of respective three-dimensional coordinate values of the respective characteristic points estimated by the self-position estimation circuit and the respective three-dimensional coordinate values of the camera position increases.

4. The image generation apparatus according to claim 3, wherein the camera position displacement decision circuit sets, as the threshold value, a first threshold value and a second threshold value higher than the first threshold value; and
the image pickup guide portion:
(a) does not instruct, when it is decided that the displacement of the camera position is lower than the first threshold value, the user to correct the camera position but permits pickup of a component image at the camera position,
(b) instructs, when it is decided that the displacement of the camera position is equal to or higher than the first threshold value but is lower than the second threshold value, the user to correct the camera position and permits pickup of a component image at the camera position, and
(c) instructs, when the displacement of the camera position is equal to or higher than the second threshold value, the user to correct the camera position but does not permit pickup of a component image at the camera position until the camera position becomes at least lower than the second threshold value.

5. The image generation apparatus according to claim 4, wherein the first threshold value is an upper limit to a permissible displacement amount for the camera position with which the component images can be combined to generate a synthesis image even if the component images are not corrected, and the second threshold value is an upper limit to a permissible displacement amount for the camera position with which, if the component images are corrected, then the component images after the correction can be combined to generate a synthesis image; and
the synthesis image generation circuit corrects and combines, when it is decided by the camera position displacement decision circuit that the displacement of the camera position is equal to or higher than the first threshold value but is lower than the second threshold value, the component images to generate a synthesis image.

6. An image generation method, comprising:
extracting a plurality of characteristic points in an overlapping region of a plurality of component images, the plurality component images obtained by capturing a plurality of respective sequential images using a camera built in portable equipment, where each of the plurality of component images have a different pan angle or elevation angle relating to the respective sequential image, and a respective posture information being a three-axis inclination of the portable equipment relating to the respective sequential image;
estimating, for each of two sequential component images in which camera positions are displaced from one another, a plurality of respective three-dimensional coordinate values of the respective characteristic points in the overlapping region and respective three-dimensional coordinate value of the camera position;
associating, for each of the two sequential component images, the posture information, the plurality of respective three-dimensional coordinate values of the respective characteristic points and the three-dimensional coordinate values of the camera positions;
adjusting, based on the estimated three-dimensional coordinate values of the camera positions, the plurality of respective three-dimensional coordinate values of the respective characteristic points of the component images to correct the component images and to combine the two component images to generate a panoramic image; and displaying a locus of movement of the camera position based on the respective three-dimensional coordinate values of the camera position estimated by the self-position estimation circuit.

7. A non-transitory, computer-readable recording medium storing a program, the program causing a computer to carry out actions, comprising:

extracting a plurality of characteristic points in an overlapping region of a plurality of component images, the plurality component images obtained by capturing a plurality of respective sequential images using a camera built in portable equipment, where each of the plurality of component images have a different pan angle or elevation angle relating to the respective sequential image, and a respective posture information being a three-axis inclination of the portable equipment relating to the respective sequential image;

estimating, for each of two sequential component images in which camera positions are displaced from one another, a plurality of respective three-dimensional coordinate values of the respective characteristic points in the overlapping region and respective three-dimensional coordinate value of the camera position;

associating, for each of the two sequential component images, the posture information, the plurality of respective three-dimensional coordinate values of the respective characteristic points and the three-dimensional coordinate values of the camera positions;

adjusting, based on the estimated three-dimensional coordinate values of the camera positions, the plurality of respective three-dimensional coordinate values of the respective characteristic points of the component images to correct the component images and to combine the two component images to generate a panoramic image; and displaying a locus of movement of the camera position based on the respective three-dimensional coordinate values of the camera position estimated by the self-position estimation circuit.

\* \* \* \* \*